United States Patent
Miyashita et al.

(10) Patent No.: US 8,953,426 B2
(45) Date of Patent: Feb. 10, 2015

(54) INFORMATION REPRODUCING APPARATUS AND INFORMATION REPRODUCING METHOD

(71) Applicant: Panasonic Intellectual Property Management Co., Ltd., Osaka (JP)

(72) Inventors: Harumitsu Miyashita, Nara (JP); Kohei Nakata, Nara (JP); Yasumori Hino, Nara (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 0 days.

(21) Appl. No.: 14/362,473

(22) PCT Filed: Sep. 25, 2013

(86) PCT No.: PCT/JP2013/005686
§ 371 (c)(1),
(2) Date: Jun. 3, 2014

(87) PCT Pub. No.: WO2014/054246
PCT Pub. Date: Apr. 10, 2014

(65) Prior Publication Data
US 2014/0341006 A1 Nov. 20, 2014

(30) Foreign Application Priority Data

Oct. 5, 2012 (JP) ................................ 2012-223142

(51) Int. Cl.
*G11B 7/0045* (2006.01)
*G11B 20/10* (2006.01)
(Continued)

(52) U.S. Cl.
CPC .......... *G11B 20/10046* (2013.01); *G11B 7/005* (2013.01); *G11B 7/135* (2013.01); *G11B 20/12* (2013.01); *G11B 2020/1267* (2013.01)
USPC ..................................... 369/59.11

(58) Field of Classification Search
None
See application file for complete search history.

(56) References Cited

U.S. PATENT DOCUMENTS 5,602,813 A 2/1997 Furumiya
5,696,756 A * 12/1997 Fujimoto et al. ........... 369/275.4
(Continued)

FOREIGN PATENT DOCUMENTS

JP 3-156729 7/1991
JP 5-36083 2/1993
(Continued)

OTHER PUBLICATIONS

International Search Report issued Oct. 29, 2013 in International (PCT) Application No. PCT/JP2013/005686.

*Primary Examiner* — Brenda Bernardi
(74) *Attorney, Agent, or Firm* — Wenderoth, Lind & Ponack, L.L.P.

(57) ABSTRACT

An information reproducing apparatus includes a photodetector (200A) divided by a dividing line parallel to a recording track scanning direction into a first light-receiving section (202, 203) that receives reflected light of a center section of a recording track and a second light-receiving section (201, 204) that receives reflected light of a portion adjacent, in a radial direction of an optical disc, with respect to the center section, a first adaptive equalization filter (107) that performs waveform equalization of an output signal from the first light-receiving section (202, 203), a second adaptive equalization filter (120) that performs waveform equalization of an output signal from the second light-receiving section (201, 204), and a data decoder (108) that decodes reproduction data based on an output waveform from the first adaptive equalization filter (107) and an output waveform from the second adaptive equalization filter (120).

5 Claims, 27 Drawing Sheets

(51) Int. Cl.
*G11B 7/005* (2006.01)
*G11B 7/135* (2012.01)
*G11B 20/12* (2006.01)

(56) References Cited

U.S. PATENT DOCUMENTS

| | | | |
|---|---|---|---|
| 5,835,467 A * | 11/1998 | Tomita et al. | 369/53.33 |
| 5,859,820 A | 1/1999 | Nagasawa et al. | |
| 6,584,049 B1 * | 6/2003 | Ma et al. | 369/44.41 |
| 7,349,321 B2 * | 3/2008 | Kudo et al. | 369/124.03 |
| 2003/0112725 A1 | 6/2003 | Kobayashi et al. | |
| 2006/0256683 A1 | 11/2006 | Kobayashi et al. | |
| 2008/0291794 A1 | 11/2008 | Kobayashi et al. | |
| 2011/0216637 A1 | 9/2011 | Kobayashi et al. | |
| 2012/0082201 A1 | 4/2012 | Shiraishi | |
| 2012/0257485 A1 | 10/2012 | Kobayashi et al. | |

FOREIGN PATENT DOCUMENTS

| | | |
|---|---|---|
| JP | 7-6391 | 1/1995 |
| JP | 2710709 | 2/1998 |
| JP | 3059026 | 7/2000 |
| JP | 3225611 | 11/2001 |
| JP | 2003-323733 | 11/2003 |
| JP | 3560410 | 9/2004 |
| JP | 4534387 | 9/2010 |
| JP | 2012-79385 | 4/2012 |

* cited by examiner

TRACK SCANNING DIRECTION →

TRACK SCANNING DIRECTION →

INFORMATION REPRODUCING APPARATUS AND INFORMATION REPRODUCING METHOD

TECHNICAL FIELD

The present invention provides an information reproducing apparatus and an information reproducing method in which one optical laser spot is formed on one recording track with respect to an information recording medium recording data on a plurality of adjacent recording tracks and the data is reproduced based on reflected light from the optical laser spot.

BACKGROUND ART

Currently, many types of optical discs such as DVD and Blu-ray (registered trademark) disc (hereinafter referred to as BD) are used as an information recording medium that stores video, data, or the like. These optical discs are higher in storage reliability compared to a hard disk device (hereinafter referred to as HDD) or magnetic tape. Therefore, the application of optical disc is expanding from the conventional application of recording audio video (AV) data such as video or sound to application of long-term storage of data.

However, the volume of data that can be stored per volume of an optical disc is only approximately one third compared to that of an HDD or magnetic tape. Therefore, in terms of space efficiency at the time of storage, technical development to improve the volume of data that can be stored per volume without increasing the cost of an optical disc has been desired, and intensive research and development has been ongoing. Recently, out of BDs, BDXL (with a recording density of about 33.4 GB per layer) has been on the market as an optical disc with the highest recording density.

The storage reliability of these optical discs is 50 years or longer. In terms of long-term storage of data, the storage reliability is 10 times or greater compared to the life of approximately five years for an HDD. Therefore, by migrating data for long-term storage from an HDD to an optical disc, it is possible to achieve both long-term storage reliability and reduction in storage cost. Particularly, in contrast to an HDD that consumes electric power at the time of data storage, an optical disc that does not require electric power at the time of data storage can reduce the amount of carbon-dioxide emissions as a green storage and leads to the reduction of power consumption at data centers that has become a major issue in recent years.

However, even with BDXL with the highest recording density among optical discs, the volume of data that can be stored per volume is approximately one third that of HDD. Therefore, the required storage space for an optical disc at the time of data storage is greater than for an HDD, and an improvement in recording density per volume of an optical disc has been desired particularly for applications where the cost requirements with respect to storage space are demanding such as in data centers.

As a technique for improving the recording density per volume of an optical disc, there is a land (inter-groove) groove recording and reproducing technique that can improve the recording density of a track. This is a technique used in DVD-RAMs that improve the recording density of a track by recording data that has conventionally been recorded only in groove or land in both groove and land.

Normally, when the recording density of a track of an optical disc is improved, diffracted light from a groove that is necessary for trace control of a groove as a track by an optical beam decreases, and the optical beam cannot trace the track. When an interval L for grooves or lands is less than $\lambda/NA \times 0.6$ where $\lambda$ is the wavelength of an optical beam with which an optical disc is irradiated and NA is the numerical aperture of a lens that forms the optical beam, diffracted light from a groove cannot be detected, and control for tracing a track is impossible. With a DVD in which the numerical aperture NA is 0.6 and the wavelength $\lambda$ of an optical beam is 650 nm, the limit of the track interval L with which diffracted light is detectable is 650 nm. In a DVD-RAM, the track density is improved through realization of a track pitch of 615 nm by recording data in both land and groove (for example, see Patent Literature 1).

With such an optical disc that records data in both land and groove, there needs to be a special measure regarding an address recorded on the optical disc particularly in order to access the position in which data is recorded. This is because addresses need to be arranged with high density in order for data to be recorded in both land and groove. As a conventional address arrangement technique, there is complementary allocated pit address (CAPA) used in DVD-RAMs (for example, see Patent Literature 2) or a technique of causing a wobble only at a groove wall on one side to record address information.

Also, there is a method used in BDs in which only groove is used as a recording track (for example, see Patent Literature 3). Using FIG. 31, the relationship of the address structure and the recording data structure for a BD with a wobble in a track will be described briefly. FIG. 31 is a diagram for illustrating the format of a different conventional optical disc.

In FIG. 31, a recording track 1502 is formed by a groove on an optical disc 1501. In a data recording region 1503, data is recorded. In address information regions 1504, 1505, and 1506, address information for accessing the data recording region 1503 is recorded. The address information is arranged in the same region as recording data. The recording data is superimposed and recorded on the address information. One piece of recording data is recorded in a region configured of three pieces of address information AD1 (Z05), AD2 (Z06), and AD3 (Z07), and a region configured of the three pieces of address information is the data recording region 1503 that is a recording unit for data. An integral multiple of the length of the data recording region 1503 configured of the three pieces of address information does not match the length of the circumference of a track. Therefore, as shown in FIG. 31, the positions of the data recording region 1503 on the circumference are arranged with a displacement between adjacent recording tracks for every circumference of the optical disc.

In the recording track 1502, one bit of the address information AD1, AD2, or AD3 is recorded by partially changing the waveform of a groove with a wobble of certain cycles. A region 1507 shown in enlargement in the lower section of FIG. 31 is a portion corresponding to an address bit that is subjected to modulation called minimum-shift keying (MSK). Since an integral multiple of the wobble cycle and the length of one circumference of a recording track do not match as shown in the lower section of FIG. 31, the phase of a wobble differs by a certain amount between adjacent recording tracks.

In an optical disc configured in this manner, the position of a track in which data is to be recorded is identified to start recording of data or the position of a track in which data has been recorded is identified to start reproduction of data, with the address information AD1, AD2, or AD3 as the reference.

Using FIG. 32, a configuration example of an information recording and reproducing apparatus that achieves recording and reproduction of data with respect to an optical disc shown in FIG. 31 will be described. FIG. 32 is a diagram showing the configuration of the conventional information recording and reproducing apparatus.

In FIG. 32, an optical disc 101 includes a track with a wobble as shown in FIG. 31. On the track, information is recorded. An optical head 103 irradiates the optical disc 101 with an optical beam and outputs an electrical signal according to the amount of reflected light from the optical disc 101. A photodetector of the optical head 103 generates a wobble signal, a data signal, and a servo error signal. The photodetector will be described later. A spindle motor 102 causes the optical disc 101 to spin. Based on a servo error signal, a servo controller 104 controls the position in which the optical head 103 irradiates a track of the optical disc 101 with an optical beam and the rotation speed of the spindle motor 102.

With respect to a data signal from the optical head 103, an analog processing unit 105 performs predetermined high-pass filter (HPF) processing in which DC fluctuation is reduced, low-pass filter (LPF) processing in which high-pass noise unnecessary for data reproduction is removed, automatic gain control (AGC) processing in which amplitude fluctuation of a data signal is reduced, and AD conversion processing in which an analog signal is converted to a digital signal using a clock signal supplied from a data phase-locked loop (PLL) circuit 106. From a data signal processed in the analog processing unit 105, the data PLL circuit 106 generates a clock signal in synchronization with a reproduction signal.

An adaptive equalization filter 107 is configured of, for example, a finite impulse response (FIR) filter and adaptively updates the coefficient of a filter such that a data signal processed in the analog processing unit 105 is provided with intended partial response (PR) characteristics. A data decoder 108 decodes the output of the adaptive equalization filter 107 to binary digital data. Although not shown in the drawing, recorded data is reproduced by performing demodulation processing and error correction processing with respect to a result of decoding by the data decoder 108. For a PR method, it suffices to select an optimum method depending on the recording code and the track recording density. As the PR method, there is the PR1221 method or PR 12221 method, for example.

A PR equalization error detector 109 generates a PR equalization error signal from the difference of an intended PR expected value waveform generated from binary digital data decoded by the data decoder 108 and the output waveform of the adaptive equalization filter 107. The adaptive equalization filter 107 changes the coefficient of a filter such that the PR equalization error signal generated by the PR equalization error detector 109 is reduced.

With respect to a wobble signal from the optical head 103, an analog processing unit 111 performs predetermined HPF processing in which DC fluctuation is reduced, LPF processing in which high-pass noise unnecessary for reproduction of the wobble signal is removed, AGC processing in which amplitude fluctuation of the wobble signal is reduced, and AD conversion processing in which an analog signal is converted to a digital signal using a clock signal supplied from a wobble PLL circuit 113. A band-pass filter (BPF) 112 extracts a signal in a predetermined frequency band from the wobble signal. The wobble PLL circuit 113 generates a clock signal in synchronization with the wobble signal from the BPF 112 processed by the BPF 112. An address demodulator 114 demodulates address information from a wobble signal sampled with the clock signal generated by the wobble PLL circuit 113 as the reference.

A system controller 115 performs overall control of respective blocks and controls communication with a host. A recording data modulator 116 modulates user data into a recording data pattern that can be recorded in the optical disc 101. With a laser driver 117, the recording data pattern that has been modulated by the recording data modulator 116 is converted to a light pulse for forming a mark accurately on the optical disc 101 and output to the optical head 103. A laser light source of the optical head 103 emits laser light according to the light pulse. A host interface (I/F) 118 performs exchange of recording data and reproduction data with a host.

Using FIG. 33 and FIG. 34, the data signal and the wobble signal generated by the photodetector embedded in the optical head 103 shown in FIG. 32 will be described.

FIG. 33 is a diagram showing a laser irradiation spot scanning a recording track. In FIG. 33, a recording mark 1704 and a space 1705 are formed on three recording tracks 1701, 1702, and 1703, and a laser irradiation spot 1706 is scanning along the direction of the arrow on the recording track 1702 in the middle.

FIG. 34 is a diagram showing the configuration of a conventional photodetector 1800 for reproducing recording data. The photodetector 1800 includes four-divided light-receiving sections 1801, 1802, 1803, and 1804, amplifiers 1805, 1806, 1807, and 1808 that amplify an output signal from the light-receiving sections 1801, 1802, 1803, and 1804, and an adder 1809 that adds all of an A signal, a B signal, a C signal, and a D signal output from the amplifiers 1805, 1806, 1807, and 1808. Based on the output from the adder 1809, a reproduction data signal is generated.

Although not shown in the drawing, a wobble signal that is a reproduction signal of wobble data of a track is detected in the light-receiving sections 1801, 1802, 1803, and 1804 of the photodetector 1800 as a balance signal for the left and right with respect to the track scanning direction. Therefore, a wobble signal is detected not by adding all of the A signal, the B signal, the C signal, and the D signal output from the four amplifiers 1805, 1806, 1807, and 1808, but by subtracting the C signal from the amplifier 1807 and the D signal from the amplifier 1808 from an added value of the A signal from the amplifier 1805 and the B signal from the amplifier 1806. By causing the recording track as shown in FIG. 33 to be irradiated with laser light and scanned with the laser light in the arrow direction shown in the drawing and receiving reflected light with the photodetector as shown in FIG. 34, a data signal and a wobble signal are reproduced.

Next, using FIG. 32, an example of a recording operation of the information recording and reproducing apparatus in which data is recorded with respect to the optical disc shown in FIG. 31 will be described. The host I/F 118 receives a recording request, recording data, and a logical address from the host. The system controller 115 starts the recording operation of the information recording and reproducing apparatus. The system controller 115 converts the logical address to a physical address on the optical disc 101 and controls the spindle motor 102 and the servo controller 104 to move the optical head 103 to the vicinity of a designated address. The address demodulator 114 demodulates physical address information of the vicinity the designated address from a wobble signal. The system controller 115 checks the position of the optical head 103 based on the physical address information demodulated by the address demodulator 114.

The system controller 115 calculates the difference of the demodulated physical address and the designated address and moves the optical head 103 through a track jump. The system controller 115 causes a track jump to an address slightly before the designated address so that recording can be started from the designated address, and moves the optical head 103 along a track up to the designated address in that state to start the recording from the designated address. The system controller 115 causes the recording data modulator 116 to modulate the recording data from the host, sets the optimum recording power and recording pulse information in the laser driver 117, causes laser to be emitted from the designated address position to start recording, and executes recording of designated recording data.

Next, using FIG. 32, an example of a reproduction operation of the information recording and reproducing apparatus in which data is reproduced with respect to the optical disc shown in FIG. 31 will be described. The host I/F 118 receives a reproduction request and a logical address from the host. The system controller 115 starts the reproduction operation of the information recording and reproducing apparatus. The system controller 115 converts the logical address to a physical address on the optical disc 101 and controls the spindle motor 102 and the servo controller 104 to move the optical head 103 to the vicinity of a designated address. The address demodulator 114 demodulates physical address information of the vicinity the designated address from. The system controller 115 checks the position of the optical head 103 based on the physical address information demodulated by the address demodulator 114. In the case where address information superimposed on recorded data is reproduced by the data decoder 108 at this time, the address information reproduced by the data decoder 108 may be the reference.

The system controller 115 calculates the difference of the demodulated physical address and the designated address and moves the optical head 103 through a track jump. The system controller 115 causes a track jump to an address slightly before the designated address so that reproduction can be started from the designated address, and moves the optical head 103 along a track up to the designated address in that state to start the reproduction from the designated address. The system controller 115 processes a data signal in the analog processing unit 105, the adaptive equalization filter 107, and the data decoder 108, reproduces recording data, and transfers reproduction data to the host via the host I/F 118.

In the case where a beam spot diameter of read laser light at the time of reproduction is not sufficiently small, reducing the track interval in order to improve the recording density per volume as described above increases leakage (crosstalk) of a signal from an adjacent track. In the case where a recorded signal is reproduced, there is a problem that the reproduction quality deteriorates.

In order to solve this problem, Patent Literature 4, for example, discloses a technique in which a memory or delay element is used in a constant angular velocity (CAV) method such that reproduction signals of three tracks that are in synchronization in the radial direction of an optical disc (i.e., a reproduction signal of a reproduction track and a reproduction signal of a track adjacent to the reproduction track) are multiplied by an appropriate coefficient and added to reduce crosstalk between tracks.

In Patent Literature 5, a light-receiving region of a photodetector is divided into three with respect to the direction of scanning by an optical spot on a recording track. Reflected light from a recording track irradiated with the optical spot is received by a main light-receiving region, and reflected light from a track adjacent to the recording track is received by two sub light-receiving regions. A signal processing unit performs waveform equalization of an output signal from the main light-receiving region so as to not cause correlation with an output signal from the sub light-receiving region. Since the output signal from the main light-receiving region is not interfered by the output signal from the sub light-receiving region as a result, the influence of crosstalk can be removed.

In Patent Literature 6, a data detection apparatus includes a plurality of adaptive equalizer units in order to perform crosstalk cancel signal processing ((1) synchronization of reproduction signals of adjacent tracks with channel clock precision and (2) reproduction of frequency characteristics of crosstalk from an adjacent track to a main reproduction track). As a reproduction information signal read from a recording medium, a reproduction information signal from a target track that is a data detection target and a reproduction information signal from a neighboring track near the target track that is a crosstalk component with respect to the reproduction information signal are respectively input to the respective adaptive equalizer units.

The data detection apparatus includes a multi-input adaptive equalizer unit that outputs an equalization signal through operation of the output of each adaptive equalizer unit, a binarization unit that performs binarization processing for the equalization signal output from the multi-input adaptive equalizer unit to obtain binary data, and an equalization error arithmetic unit that obtains an equalization error from an equalization target signal obtained based on a binary detection result of the binarization unit and the equalization signal output from the multi-input adaptive equalizer unit and supplies the equalization error as a tap coefficient control signal for adaptive equalization to each adaptive equalizer unit.

The data detection apparatus includes a memory unit that stores a reproduction information signal read from a recording medium. With a memory controller, a reproduction information signal from a target track and a reproduction information signal from a neighboring track are read at each time point from the memory unit and supplied to each of the plurality of equalizer units. The data detection apparatus further includes a phase difference detection unit that detects the phase difference of respective reproduction information signals read from the memory unit and input to a plurality of the adaptive equalizer units and outputs a correction signal for correction of a read timing of each reproduction information signal from the memory unit based on the detected phase difference.

The multi-input adaptive equalizer unit includes three adaptive equalizer units. The three respective adaptive equalizer units are each input with a reproduction information signal from a target track, a reproduction information signal from a neighboring track adjacent on one side of the target track, and a reproduction information signal from a neighboring track adjacent on the other side of the target track. The multi-input adaptive equalizer unit performs partial response equalization processing for the reproduction information signal from the target track. The binarization unit performs maximum-likelihood decoding processing as the binarization processing for the equalization signal of the multi-input adaptive equalizer unit. The equalization error arithmetic unit obtains the equalization error by operation using the equalization target signal obtained through convolution processing with a binary detection result from maximum-likelihood decoding and the equalization signal output from the multi-input adaptive equalizer unit.

When the track pitch is narrowed in order to improve the recording capacity, a reproduction signal at the time of target track reproduction deteriorates due to crosstalk from an adjacent track. The reproduction signal includes a reproduction signal (RF signal) in which recorded information is reproduced and an address signal for which a wobble is caused in a track with a predetermined method and added as address information.

In order to solve the crosstalk problem with respect to an RF signal, crosstalk cancel signal processing has been proposed (for example, see Patent Literature 4, Patent Literature 5, and Patent Literature 6). The point in performance improvement of the crosstalk cancel signal processing is cancel processing in consideration of (1) synchronization of reproduction signals of adjacent tracks with channel clock precision and (2) reproduction of the frequency characteristics of crosstalk that influences a main reproduction track from an adjacent track. This is because a sufficient performance improvement cannot be obtained with simple subtraction processing since the crosstalk amount from an adjacent track differs depending on the recording mark length.

With the crosstalk cancel signal processing proposed in Patent Literature 4, realization of synchronization of reproduction signals of adjacent tracks described above in (1) can presumably be achieved relatively easily, since the CAV recording method is assumed. However, with this recording method, the recording capacity cannot be improved.

With the crosstalk cancel signal processing proposed in Patent Literature 5, a reproduction signal recorded in a target track and a crosstalk signal from an adjacent track can be detected simultaneously, since a photodetector in which the light-receiving region is divided into three with respect to the direction of scanning an optical spot on a recording track is used. Therefore, with Patent Literature 5, the problem of synchronization of reproduction signals of adjacent tracks described above in (1) does not occur. However, with Patent Literature 5, a sufficient crosstalk cancelling effect may not be obtained since (2) described above is not taken into consideration.

The crosstalk cancel signal processing proposed in Patent Literature 6 is cancel processing in consideration of (1) synchronization of reproduction signals of adjacent tracks with channel clock precision and (2) reproduction of the frequency characteristics of crosstalk that influences a main reproduction track from an adjacent track. In order to perform the synchronization of reproduction signals of adjacent tracks described above in (1), reproduction signals of adjacent tracks are held in a memory at a predetermined timing in Patent Literature 6. Due to such a configuration, there are roughly four problems below in Patent Literature 6.

Problem 1: In order to remove the influence of an adjacent track, a reproduction signal of a reproduction track and a reproduction signal of the adjacent track are necessary. Therefore, at the time of a first read, crosstalk cancel processing cannot be carried out until the reproduction signal of the adjacent track is held in a memory, and the reproduction performance stays deteriorated. That is, with Patent Literature 6, it is always impossible to obtain the effect of the crosstalk cancel processing.

Problem 2: Since a reproduction signal of an adjacent track needs to be secured in a memory, the amount of information that needs to be secured in a memory increases toward the outer circumference side of an optical disc. This leads to an increased circuit scale.

Problem 3: In the case of an optical disc having a double spiral configuration as an optical disc in which data is record in both land and groove instead of an optical disc having a single spiral configuration provided with a CAPA address in an intermediate section between land and groove as an optical disc in which data is record in both land and groove such as a RAM disc, a track jump or a configuration including a plurality of optical pickups is necessary in order to obtain information of an adjacent track. In the case where a track jump is performed for every access in order to obtain information of an adjacent track, a new problem occurs in that the transfer rate of a system does not improve. With the configuration including a plurality of optical pickups, the cost of the system increases.

Problem 4: When the track pitch is narrowed, there is not only an increase in the crosstalk amount for an RF signal but also a deterioration in an address signal for which a wobble is caused in a track with a predetermined method and added as address information. When the address signal deteriorates, acquisition of an address that identifies the position of an optical disc is difficult, and the access performance of the optical disc decreases. In the worst case, recording or reproduction for the optical disc is unfeasible. In the case where the address information has deteriorated due to crosstalk, it is difficult to identify the position for recording or reproduction. In the case of reproducing data from a recorded optical disc, it suffices to identify the reproduction position from an RF signal, since address information is superimposed on recorded data. However, in the case of recording data in an unrecorded optical disc, reproduction of an address signal is extremely important since an RF signal is not recorded. Particularly, in the case where an adjacent track is a recorded region, it is difficult to identify the position for recording. In Patent Literatures 4, 5, and 6, crosstalk cancel signal processing for an address signal is not described.

CITATION LIST

Patent Literature

Patent Literature 1: Japanese Patent No. 3059026
Patent Literature 2: Japanese Patent No. 3560410
Patent Literature 3: Japanese Patent No. 4534387
Patent Literature 4: Japanese Patent No. 3225611
Patent Literature 5: Japanese Patent No. 2710709
Patent Literature 6: Japanese Patent Application Laid-open No. 2012-79385

SUMMARY OF THE INVENTION

The present invention has been made in order to solve the problems described above, and an object thereof is to provide an information reproducing apparatus and an information reproducing method that can improve the reproduction performance.

An information reproducing apparatus according to one aspect of the present invention is an information reproducing apparatus in which one optical laser spot is formed on one recording track with respect to an information recording medium recording data on a plurality of adjacent recording tracks and the data is reproduced based on reflected light from the optical laser spot, including: a photodetector divided by a dividing line parallel to a recording track scanning direction into a first light-receiving section that receives reflected light of a center section of the recording track and a second light-receiving section that receives reflected light of a portion adjacent, in a radial direction of the information recording medium, with respect to the center section; a first adaptive equalization filter that performs waveform equalization of an output signal from the first light-receiving section; a second adaptive equalization filter that performs waveform equalization of an output signal from the second light-receiving section; and a data decoder that decodes reproduction data based on an output waveform from the first adaptive equalization filter and an output waveform from the second adaptive equalization filter.

With the present invention, a signal component of a self track that is scanned by the center of an optical laser spot and a crosstalk component from a track adjacent to the self track are detected from one optical laser spot, and equalization for intended PR characteristics is possible while removing a crosstalk component having a predetermined frequency without mounting a large-scale circuit. Therefore, the error rate of reproduction data can be reduced, and the reproduction performance can be improved.

An object, feature, and advantage of the present invention will become more apparent from the detailed description below and attached drawings.

DESCRIPTION OF EMBODIMENTS

Figure 1:
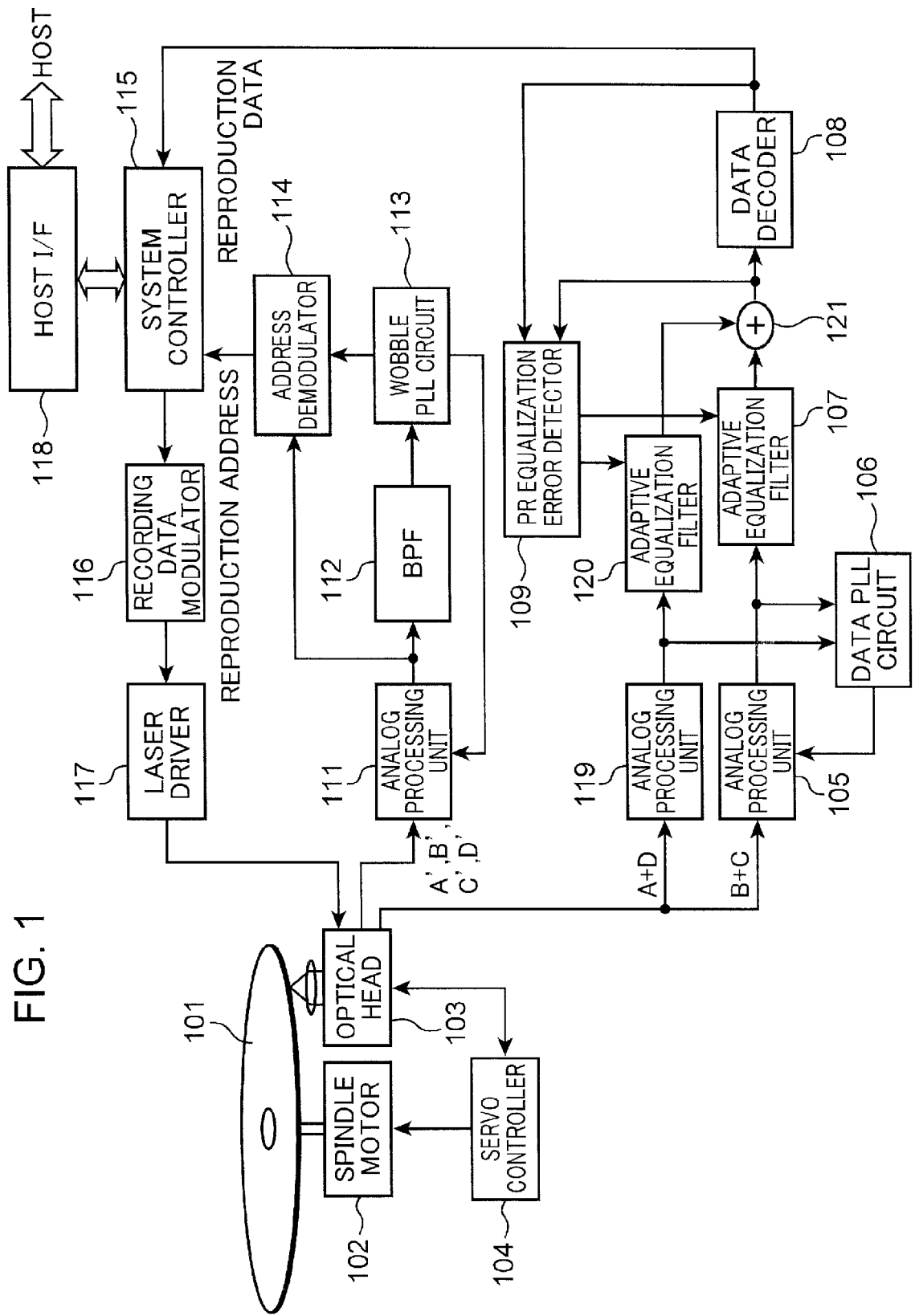
FIG. 1 is a diagram showing the configuration of an infatuation recording and reproducing apparatus in Embodiment 1 of the present invention.

An apparatus that records or reproduces information in an information recording medium in embodiments of the present invention below will be described with reference to the drawings. The same components are denoted by the same reference numeral, and repetitions of descriptions are omitted. The embodiments below are one example embodying the present invention and does not limit the technical scope of the present invention.

(Embodiment 1)

Figure 2:
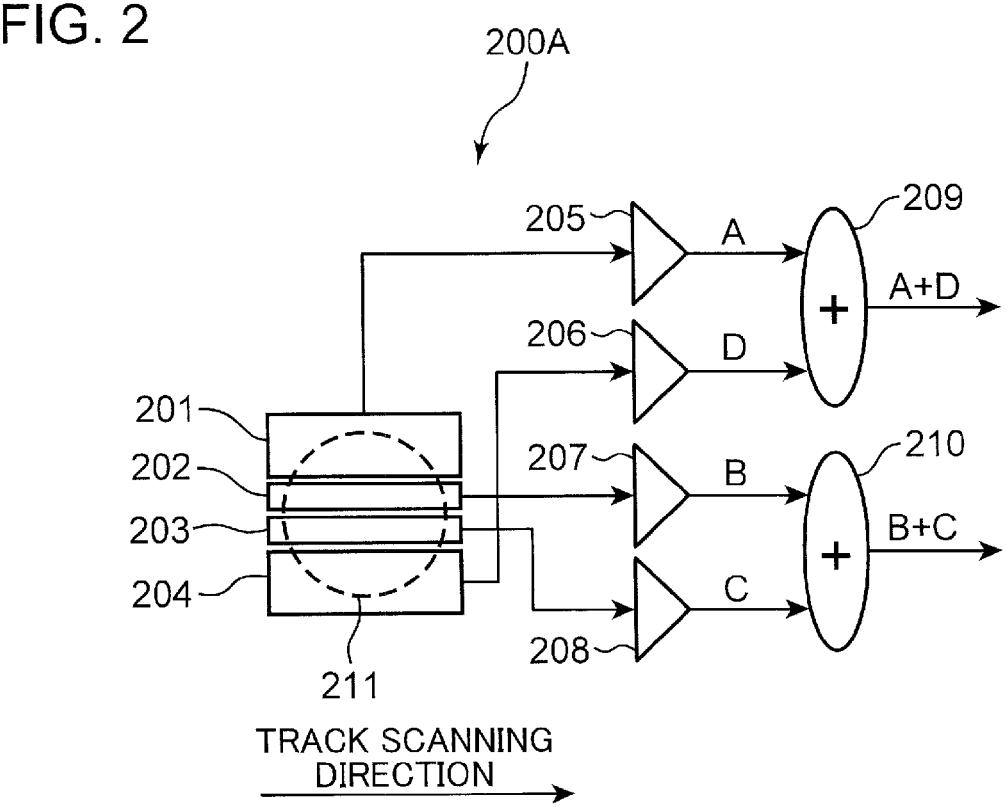
FIG. 2 is a diagram showing the configuration of a reproduction data detection photodetector in Embodiment 1 of the present invention.
Figure 3:
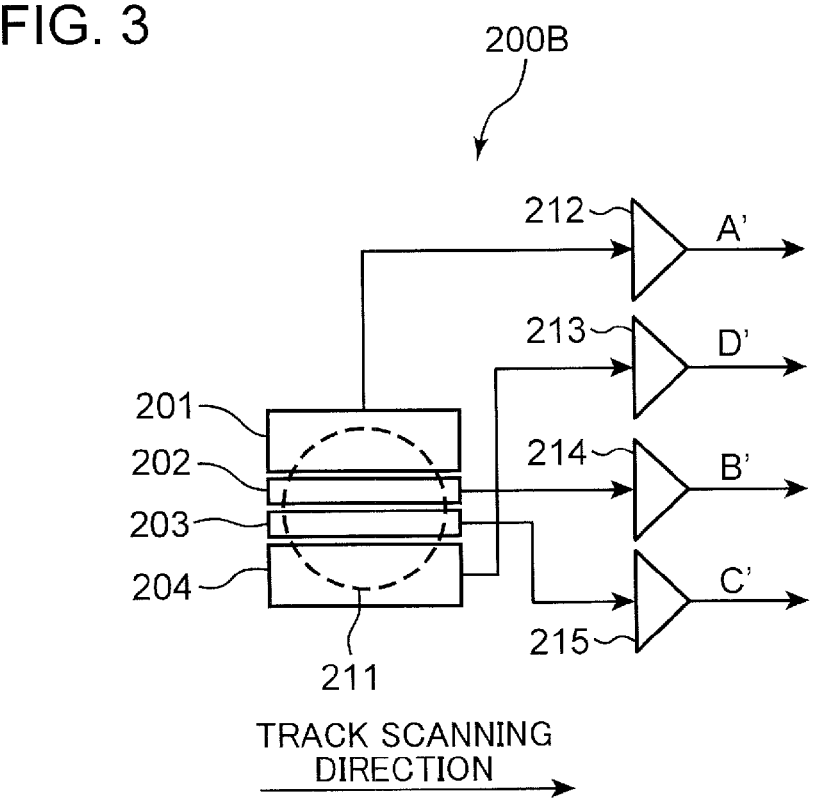
FIG. 3 is a diagram showing the configuration of a wobble detection photodetector in Embodiment 1 of the present invention.

FIG. 1 is a diagram showing the configuration of an information recording and reproducing apparatus in Embodiment 1 of the present invention. FIG. 2 is a diagram showing the configuration of a reproduction data detection photodetector in Embodiment 1 of the present invention. FIG. 3 is a diagram showing the configuration of a wobble detection photodetector in Embodiment 1 of the present invention.

In the information recording and reproducing apparatus, one optical laser spot is formed on one recording track with respect to the optical disc 101 recording data on a plurality of adjacent recording tracks, and the data is reproduced based on reflected light from the optical laser spot.

The information recording and reproducing apparatus shown in FIG. 1 includes the spindle motor 102, the optical head 103, the servo controller 104, the analog processing unit 105, the data PLL circuit 106, the adaptive equalization filter 107, the data decoder 108, the PR equalization error detector 109, the analog processing unit 111, the BPF 112, the wobble PLL circuit 113, the address demodulator 114, the system controller 115, the recording data modulator 116, the laser driver 117, the host I/F 118, an analog processing unit 119, an adaptive equalization filter 120, and an adder 121.

Figure 32:
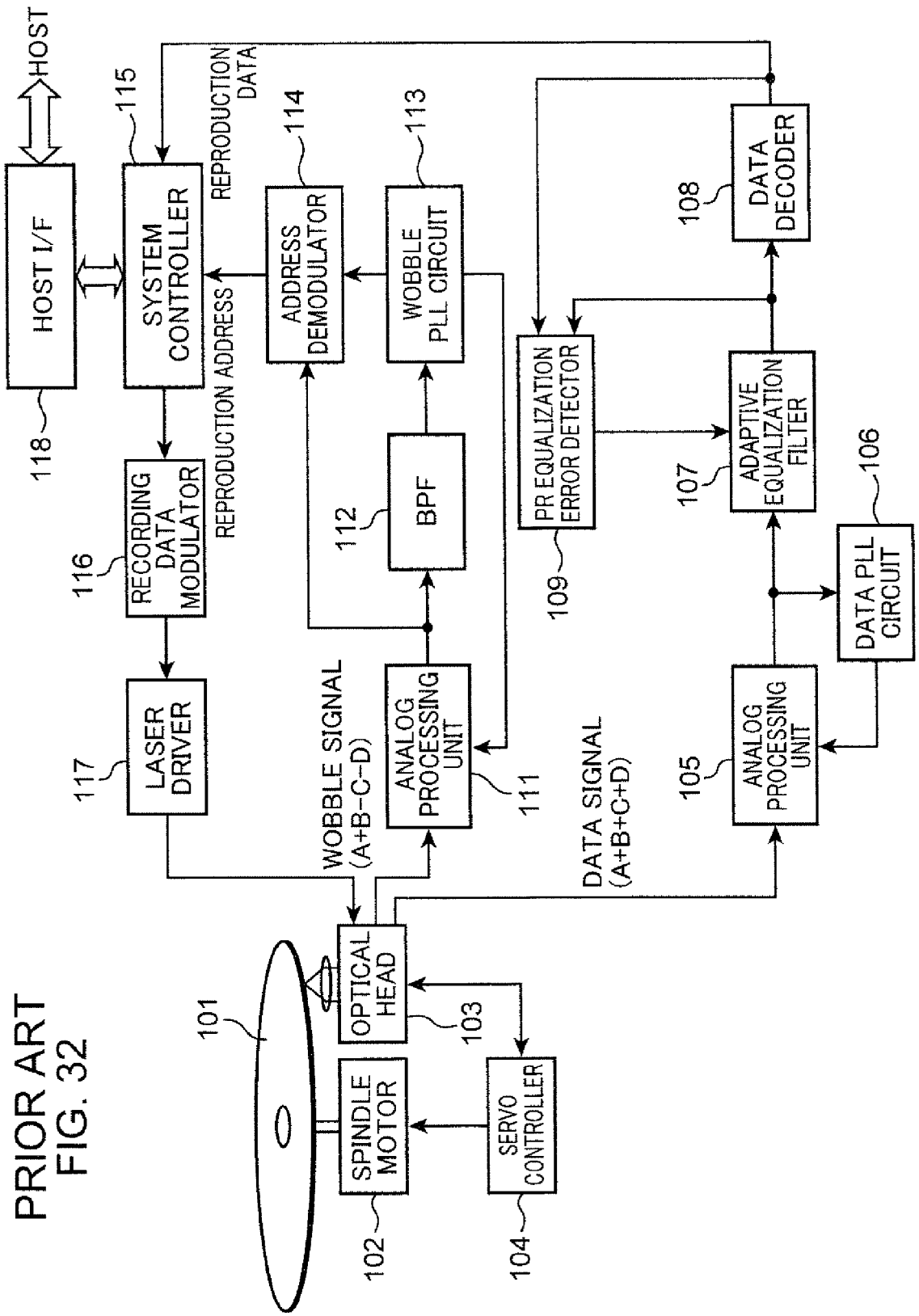
FIG. 32 is a diagram showing the configuration of a conventional information recording and reproducing apparatus.

First, the difference from the conventional information recording and reproducing apparatus shown in FIG. 32 will be described. A reproduction data detection photodetector 200A and a wobble detection photodetector 200B included in the optical head 103 in this Embodiment 1 have configurations as shown in FIG. 2 and FIG. 3. Unlike the photodetector illustrated in FIG. 34, a light-receiving region that receives laser light is divided by a dividing line parallel to the track scanning direction. The track scanning direction is a direction perpendicular to the radial direction of the optical disc 101.

First, using FIG. 2, the reproduction data detection photodetector 200A will be described. In FIG. 2, the reproduction data detection photodetector 200A includes four light-receiving sections 201, 202, 203, and 204 divided by dividing lines parallel to the track scanning direction, and is irradiated with an optical spot 211 reflected from an information recording medium as shown by a dotted line in FIG. 2. For the width (length in a direction perpendicular to the track scanning direction) of the four light-receiving sections 201, 202, 203, and 204, it suffices to select an optimum design value in consideration of the effect of crosstalk cancelling, noise and frequency characteristics deterioration of a reproduction signal, or the like. For example, the widths of the light-receiving sections 201, 202, 203, and 204 may be divided in a ratio of 2:1:1:2.

The light-receiving sections 202 and 203 receive reflected light of a center section of a recording track. The light-receiving sections 201 and 204 receive reflected light of a portion adjacent in the radial direction of the optical disc 101 with respect to the center section.

Further, signals output from the four light-receiving sections 201, 202, 203, and 204 are respectively amplified by the amplifiers 205, 207, 208, and 206. Further, signals output from the amplifiers 205 and 206 are added in an adder 209, and signals output from the amplifiers 207 and 208 are added in an adder 210. In FIG. 2, signals output from the amplifiers 205, 206, 207, and 208 are respectively defined as A signal, D signal, B signal, and C signal. The output of the adder 209 is an A+D signal, and the output of the adder 210 is a B+C signal. The B+C signal is a reproduction signal of a region in the vicinity of the middle of a reproduction laser spot, and the A+D signal is a reproduction signal of a region in the vicinity of the end of reproduction laser spot. For the amplification amount of the four amplifiers 205, 206, 207, and 208, it suffices to select optimum design values respectively. For example, the amplification amount of the amplifiers 205, 206, 207, and 208 may be set in a ratio of 6:1:1:6.

Next, using FIG. 3, the wobble detection photodetector 200B will be described. The light-receiving sections 201, 202, 203, and 204 in FIG. 3 are shared with a reproduction data detector and have the same configuration as in FIG. 2. Signals detected by the four light-receiving sections 201, 202, 203, and 204 are respectively amplified by the amplifiers 212, 214, 215, and 213. Signals output from the amplifiers 212, 213, 214, and 215 are respectively defined as A' signal, D' signal, B' signal, and C' signal. For the amplification amount of the four amplifiers 212, 213, 214, and 215, it suffices to select optimum design values respectively. For example, the amplification amount of the amplifiers 212, 213, 214, and 215 may be set in a ratio of 2:1:1:2.

In FIG. 1, the A+D signal and the B+C signal are output from the optical head 103 and respectively input to the analog processing unit 119 and the analog processing unit 105. In a similar manner, the A' signal, the B' signal, the C' signal, and the D' signal are output from the optical head 103 and input to the analog processing unit 111. The analog processing unit 111 detects a wobble signal through subtraction (A'+B'−C'−D') of the C' signal and the D' signal from an added value of the A' signal and the B' signal.

With respect to the B+C signal from the optical head 103, the analog processing unit 105 performs predetermined HPF processing in which DC fluctuation is reduced, LPF processing in which high-pass noise unnecessary for data reproduction is removed, AGC processing in which amplitude fluctuation of a data signal is reduced, and ADC processing in which an analog signal is converted to a digital signal using a clock signal supplied from the data PLL circuit 106.

With respect to the A+D signal from the optical head 103, the analog processing unit 119 performs predetermined HPF processing in which DC fluctuation is reduced, LPF processing in which high-pass noise unnecessary for data reproduction is removed, AGC processing in which amplitude fluctuation of a data signal is reduced, and ADC processing in which an analog signal is converted to a digital signal using a clock signal supplied from the data PLL circuit 106.

From a data signal processed in the analog processing unit 105 and a data signal processed in the analog processing unit 119, the data PLL circuit 106 generates a clock signal in synchronization with a reproduction signal.

The adaptive equalization filter 107 performs waveform equalization of output signals from the light-receiving sections 202 and 203. The adaptive equalization filter 107 includes, for example, a finite impulse response (FIR) filter. The adaptive equalization filter 107 is input with a data signal processed in the analog processing unit 105. The adaptive equalization filter 107 adaptively updates the coefficient of a filter such that the addition result of a data signal processed in the adaptive equalization filter 107 and a data signal processed in the analog processing unit 119 and the adaptive equalization filter 120 is provided with intended partial response (PR) characteristics.

Figure 4:
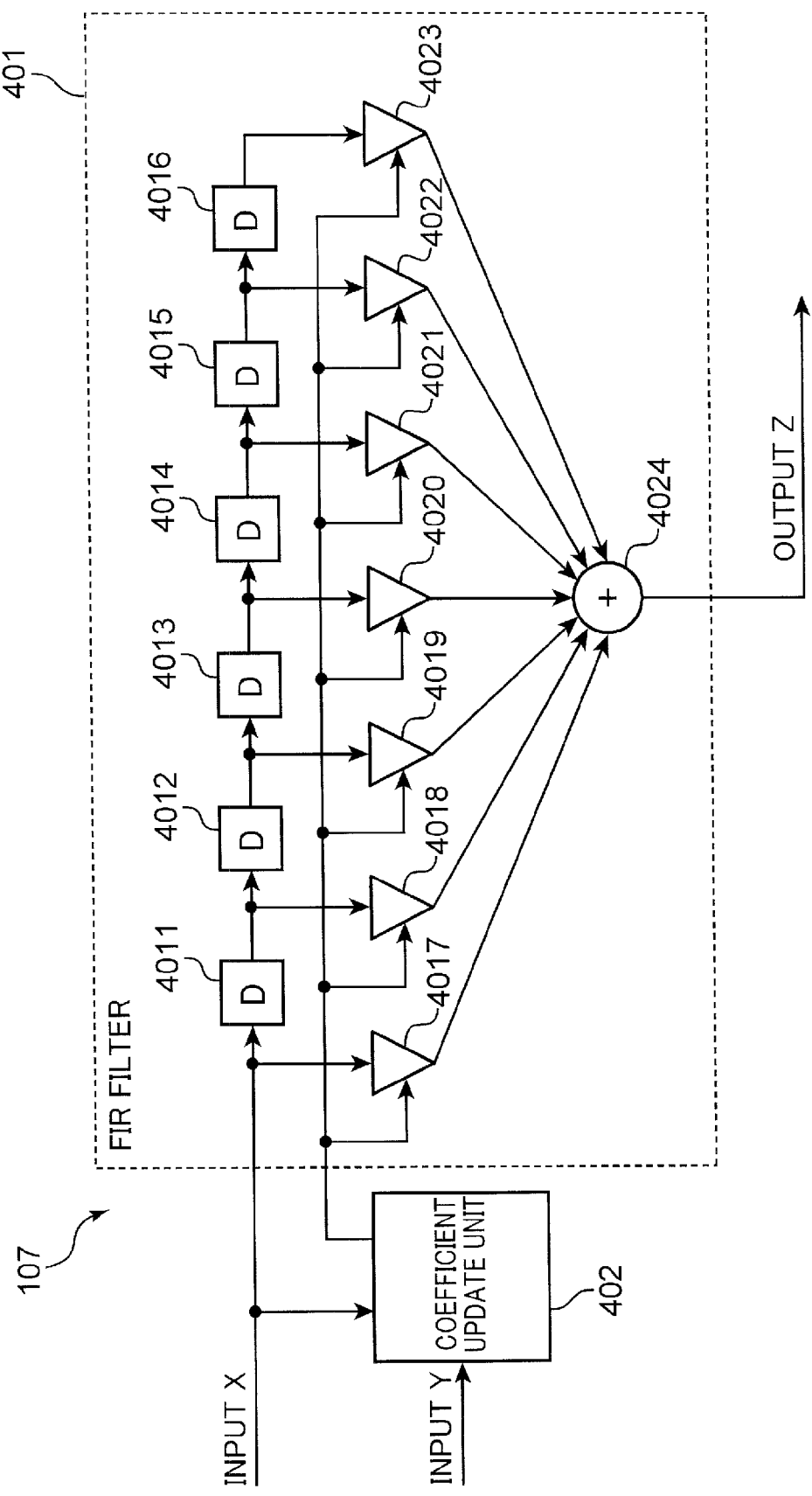
FIG. 4 is a diagram showing the configuration of an adaptive equalization filter in Embodiment 1 of the present invention.

FIG. 4 is a diagram showing the configuration of the adaptive equalization filter 107 in Embodiment 1 of the present invention. The adaptive equalization filter 107 shown in FIG. 4 includes a 7-tap FIR filter 401 and a coefficient update unit 402. Input X is an output signal from the analog processing unit 105, and input Y is an output signal from the PR equalization error detector 109. The FIR filter 401 includes six delay elements 4011 to 4016, seven multipliers 4017 to 4023, and an adder 4024. The six delay elements 4011 to 4016 delay, for example, an input signal at data channel intervals. It suffices to select the delay amount of delay elements 4011 to 4016 such that intended filter characteristics are achieved.

The coefficient update unit 402 performs operation and update of the coefficient such that the output from the PR equalization error detector 109 becomes small with, for example, the least mean squares (LMS) algorithm. The seven multipliers 4017 to 4023 respectively multiply seven coefficients updated by the coefficient update unit 402 and seven signals for which input X is delayed by the six delay elements 4011 to 4016. Then, with the adder 4024, the seven multiplication results of the multipliers 4017 to 4023 are added and output as adaptive filter output Z.

The adaptive equalization filter 120 performs waveform equalization of an output signal from the light-receiving sections 201 and 204. The adaptive equalization filter 120 includes, for example, an FIR filter. The adaptive equalization filter 120 is input with a data signal processed in the analog processing unit 119. The adaptive equalization filter 120 adaptively updates the coefficient of a filter such that the addition result of a data signal processed in the adaptive equalization filter 120 and a data signal processed in the analog processing unit 105 and the adaptive equalization filter 107 is provided with intended partial response (PR) characteristics.

The configuration of the adaptive equalization filter 120 is similar to the configuration of the adaptive equalization filter 107 shown in FIG. 4. Note that, in each of the adaptive equalization filter 107 and the adaptive equalization filter 120, an optimum tap number of the FIR filter 401 and optimum coefficient update response characteristics of the coefficient update unit 402 in FIG. 4 are selected.

The adder 121 adds an output signal from the adaptive equalization filter 107 and an output signal from the adaptive equalization filter 120. The PR equalization error detector 109 outputs a common error to the adaptive equalization filter 107 and the adaptive equalization filter 120 and updates the coefficient of each filter, such that an output signal of the adder 121 is provided with intended PR characteristics. In the case of this embodiment, operation and update are performed for the tap coefficient in the adaptive equalization filter 107 and the adaptive equalization filter 120, such that intended PR characteristics are approximated and crosstalk becomes minimum. The adder 121 outputs a signal in which the influence of crosstalk is reduced. Therefore, the error rate of binarization data (reproduction data) decoded by the data decoder 108 is reduced.

The data decoder 108 decodes reproduction data based on the output waveform from the adaptive equalization filter 107 and the output waveform from the adaptive equalization filter 120. The data decoder 108 performs binarization processing of the addition result of the output waveform from the adaptive equalization filter 107 and the output waveform from the adaptive equalization filter 120.

The PR equalization error detector 109 calculates an error between the equalization target waveform calculated based on the result of binarization processing by the data decoder 108 and the addition result of the output waveform from the adaptive equalization filter 107 and the output waveform from the adaptive equalization filter 120. The coefficient update unit 402 of the adaptive equalization filter 107 performs operation of the coefficient used in the adaptive equalization filter 107 based on the error calculated by the PR equalization error detector 109. The coefficient update unit 402 of the adaptive equalization filter 120 performs operation of the coefficient used in the adaptive equalization filter 120 based on the error calculated by the PR equalization error detector 109.

In this Embodiment 1, the information recording and reproducing apparatus corresponds to one example of an information reproducing apparatus, the photodetector 200A corresponds to one example of a photodetector, the light-receiving sections 202 and 203 correspond to one example a first light-receiving section, the light-receiving sections 201 and 204 correspond to one example of a second light-receiving section, the adaptive equalization filter 107 corresponds to one example of a first adaptive equalization filter, the adaptive equalization filter 120 corresponds to one example of a second adaptive equalization filter, the data decoder 108 corresponds to one example of a data decoder, the PR equalization error detector 109 corresponds to one example of an error detector, and the coefficient update unit 402 corresponds to one example of a first coefficient arithmetic unit and a second coefficient arithmetic unit.

The point in the crosstalk cancel signal processing in this embodiment will be described. The A+D signal output from the optical head 103 in FIG. 1 includes a component of a reproduction signal of a self track (reproduction target track scanned by the middle of an optical spot) and a crosstalk component from an adjacent track (track adjacent on both sides of the reproduction target track scanned by the middle of the optical spot) on both sides of the self track. The proportion of a reproduction signal component of the self track and the crosstalk component of the adjacent track is determined by the area of the light-receiving section in FIG. 2.

Figure 5:
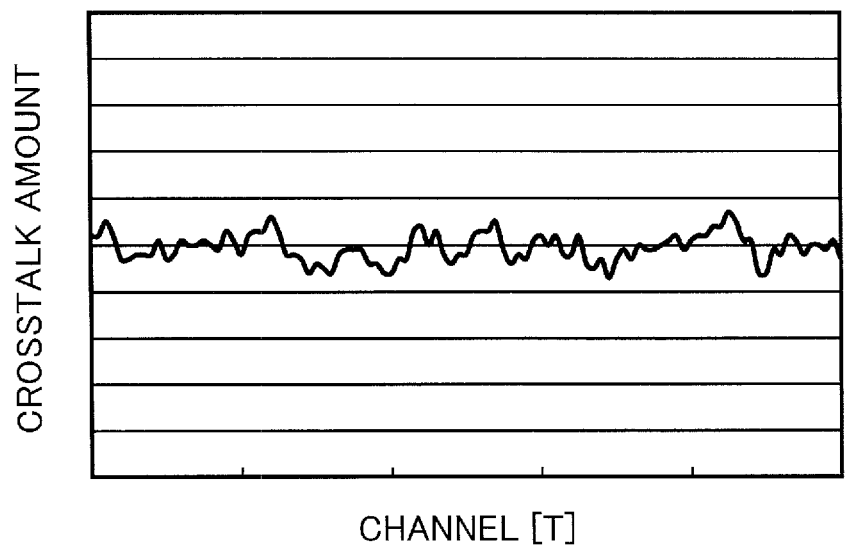
FIG. 5 is a diagram showing the crosstalk amount from an adjacent track.

FIG. 5 is a diagram showing the crosstalk amount from an adjacent track. The crosstalk amount shown in FIG. 5 is a reproduction signal obtained upon reproducing a self track in a state where data is recorded in the adjacent track and data is not recorded in the self track. It can be seen that the crosstalk amount is one tenth the signal amplitude of a reproduction signal of the self track and that there is a great influence on the reproduction of the self track. The crosstalk amount is not constant because the recording patterns of the adjacent tracks on both sides are not the same, and the crosstalk amounts from the adjacent tracks differ depending on the recording mark length. That is, since crosstalk has certain frequency characteristics, the crosstalk amount being not constant implies that crosstalk cannot be removed sufficiently with a simple addition operation or subtraction operation. Therefore, removal of crosstalk in consideration of the frequency characteristics is necessary. The adaptive equalization filter 120 performs operation of the tap coefficient so as to achieve both correlation of the reproduction signal component of the self track and the PR equalization output and non-correlation of the crosstalk component and the PR equalization output (offset of the crosstalk component).

Figure 6:
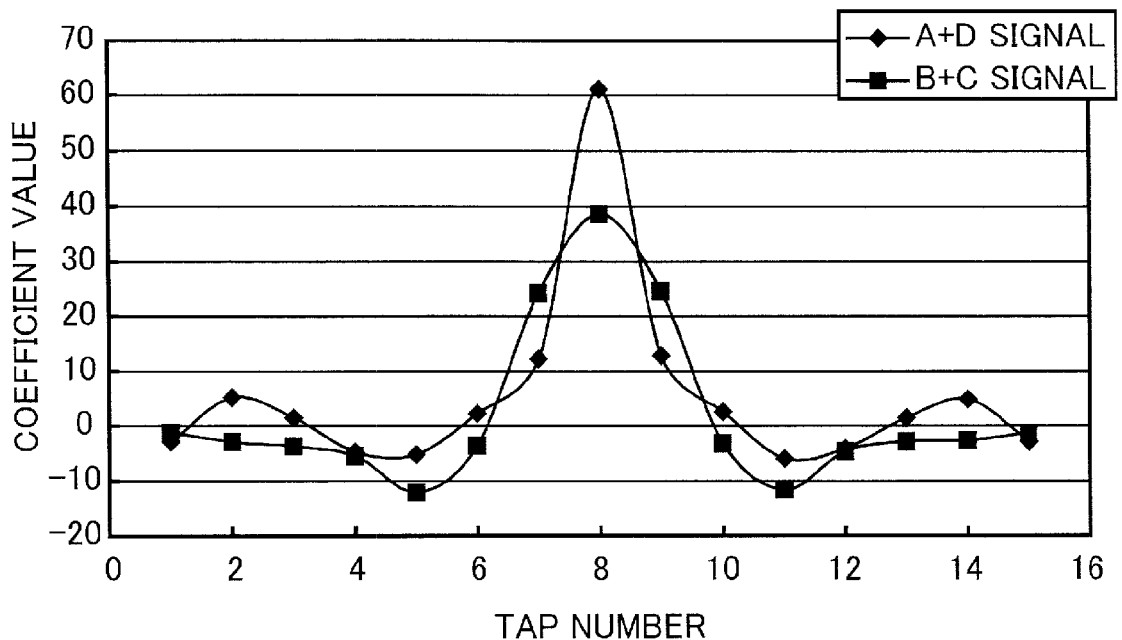
FIG. 6 is a diagram showing the tap coefficient of an adaptive equalization filter that has processed an A+D signal and the tap coefficient of an adaptive equalization filter that has processed a B+C signal.
Figure 7:
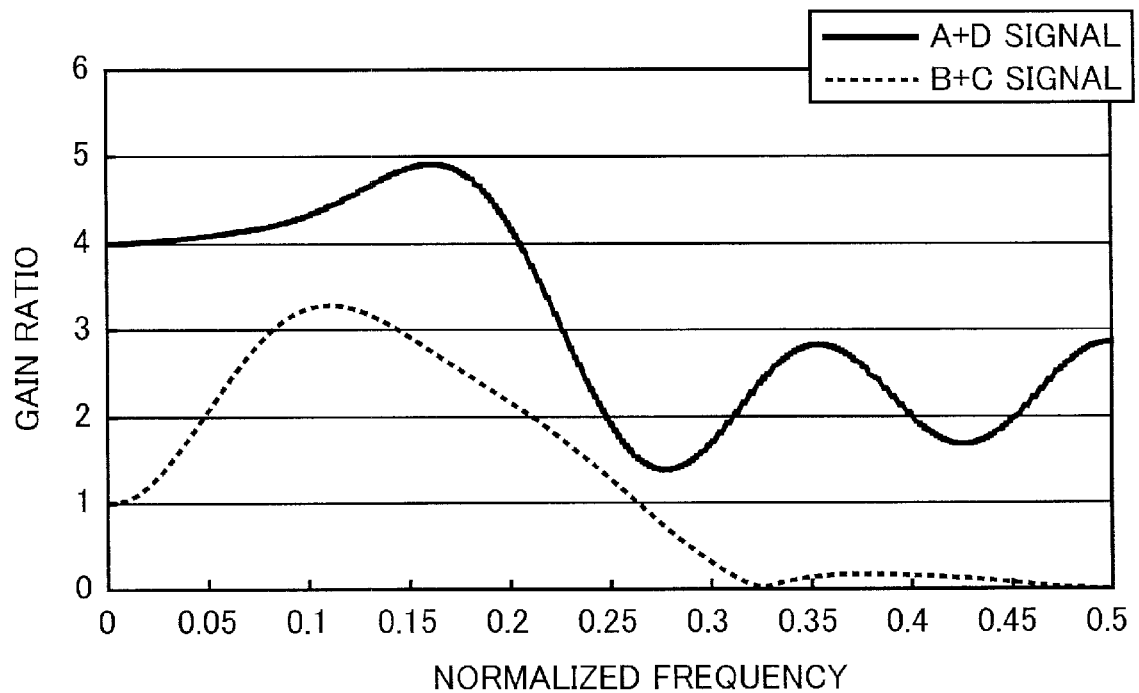
FIG. 7 is a diagram showing the frequency characteristics of the tap coefficient in FIG. 6.

FIG. 6 is a diagram showing the tap coefficient of the adaptive equalization filter 120 that has processed the A+D signal and the tap coefficient of the adaptive equalization filter 107 that has processed a B+C signal in FIG. 1. FIG. 7 is a diagram showing the frequency characteristics of the tap coefficient of the adaptive equalization filter 120 that has processed the A+D signal and the frequency characteristics of the tap coefficient of the adaptive equalization filter 107 that has processed a B+C signal in FIG. 1. FIG. 6 shows the converged tap coefficient of the adaptive equalization filter. The tap number of the adaptive equalization filter 107 and the adaptive equalization filter 120 are both 15 taps as an example. FIG. 7 is a diagram showing the frequency characteristics of the tap coefficient in FIG. 6. In FIG. 7, the ordinate shows the gain ratio, and the abscissa shows the normalized frequency that has been normalized with a predetermined frequency. Herein, numerical values that have been converted to the frequency characteristics in the case where the proportion of the amplifiers 205, 206, 207, and 208 in FIG. 2 is 1:1:1:1 are shown.

By raising the high-pass characteristics for the A+D signal including a crosstalk component of an adjacent track, the crosstalk component can be removed further. With the configuration of this embodiment in which a signal component of a self track and a crosstalk component from an adjacent track are detected with one spot (one reproduction operation), a large correction in the phase difference is not necessary since the phases of the signal component of the self track and the crosstalk component do not differ greatly. Thus, since it is not necessary to increase the tap number of the adaptive equalization filter 107 and the adaptive equalization filter 120 to carry out a phase difference correction measure, an increase in circuit scale is prevented.

With the embodiment of the present invention as described above, a signal component of a self track and a crosstalk component from an adjacent track are detected with one spot (one reproduction operation), and equalization for intended PR characteristics is possible while removing crosstalk having a predetermined frequency without mounting a large-scale circuit. Therefore, the error rate of an output signal from the data decoder 108 can be reduced.

The signal phase (delay) of the A signal and the D signal and the signal phase (delay) of the B signal and the C signal in FIG. 2 have to be in an almost absent state. However, the signal phase (delay) of the A+D signal and the B+C signal can be corrected with the adaptive equalization filter 107 and the adaptive equalization filter 120.

In the case where the influence of crosstalk is great in the data PLL circuit 106, there are cases where stable extraction of a clock in synchronization with a reproduction signal is difficult. In such cases, a function equivalent to the adaptive equalization filter 107, the adaptive equalization filter 120, the adder 121, the data decoder 108, and the PR equalization error detector 109 that can remove a crosstalk component may be inserted to a loop of PLL.

Figure 34:
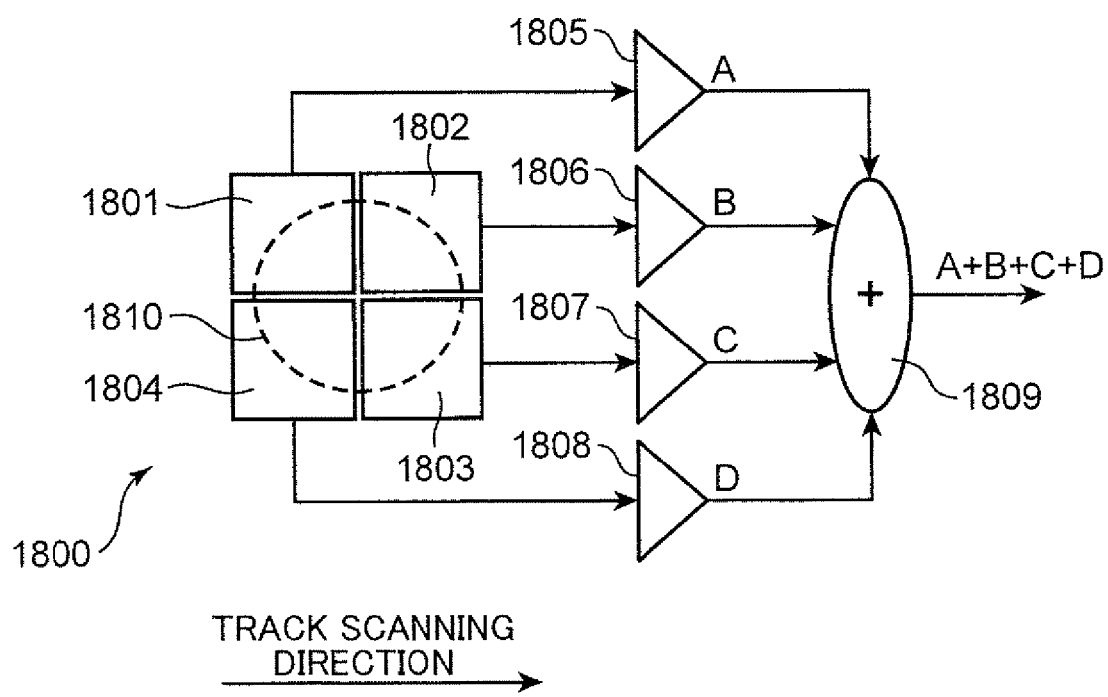
FIG. 34 is a diagram showing the configuration of a conventional photodetector for reproducing recording data.

A dividing method for the light-receiving section in FIG. 2 and FIG. 3 is not limited to division into four in this embodiment. In the case where the reproduction data detection photodetector 200A and the wobble detection photodetector 200B are included separately, it may be such that the reproduction data detection photodetector 200A in FIG. 2 includes three-divided light-receiving sections and the wobble detection photodetector 200B includes four-divided light-receiving sections, and the division number may be separate for every detected signal. Further, in this case, a dividing method as shown in FIG. 34 is acceptable for the wobble detection photodetector 200B, in order to share a signal detection unit that detects a servo signal for performing focus control and tracking control.

In this manner, one recording track is irradiated with one optical laser spot, a signal component and a crosstalk component from reflected light of the optical laser spot are separated, only the crosstalk component is removed, and an improvement in the reproduction performance of recording data (reduction in the data error rate) and an improvement in the reproduction performance of address information (reduction in the address error rate) can be achieved.

By applying cancel processing for crosstalk from an adjacent track of which the influence is increased by track narrowing of a recording track as one method for increasing the volume capacity of an optical disc not only to recording data but also to address information, stabilization of a system can be achieved.

Further, a large-scale circuit that adjusts the phases of reproduction data of an adjacent track and reproduction data of a self track is unnecessary, enabling the access performance to be improved and an increase in circuit scale to be prevented. Accordingly, the volume density of an optical disc can be improved, a decrease in the transfer rate due to unnecessary processing can be prevented, and a stable system can be achieved by an improvement in the reproduction performance.

Moreover, in the field of archive storage in which data is to be stored over a long period with high reliability, an increase in the efficiency of space in which data is stored and an increase in the stability of transfer rate can be achieved. Also, a great effect can be expected in the reduction of power consumption and the reduction in the amount of carbon-dioxide emissions at data centers.

(Embodiment 2)

Figure 8:
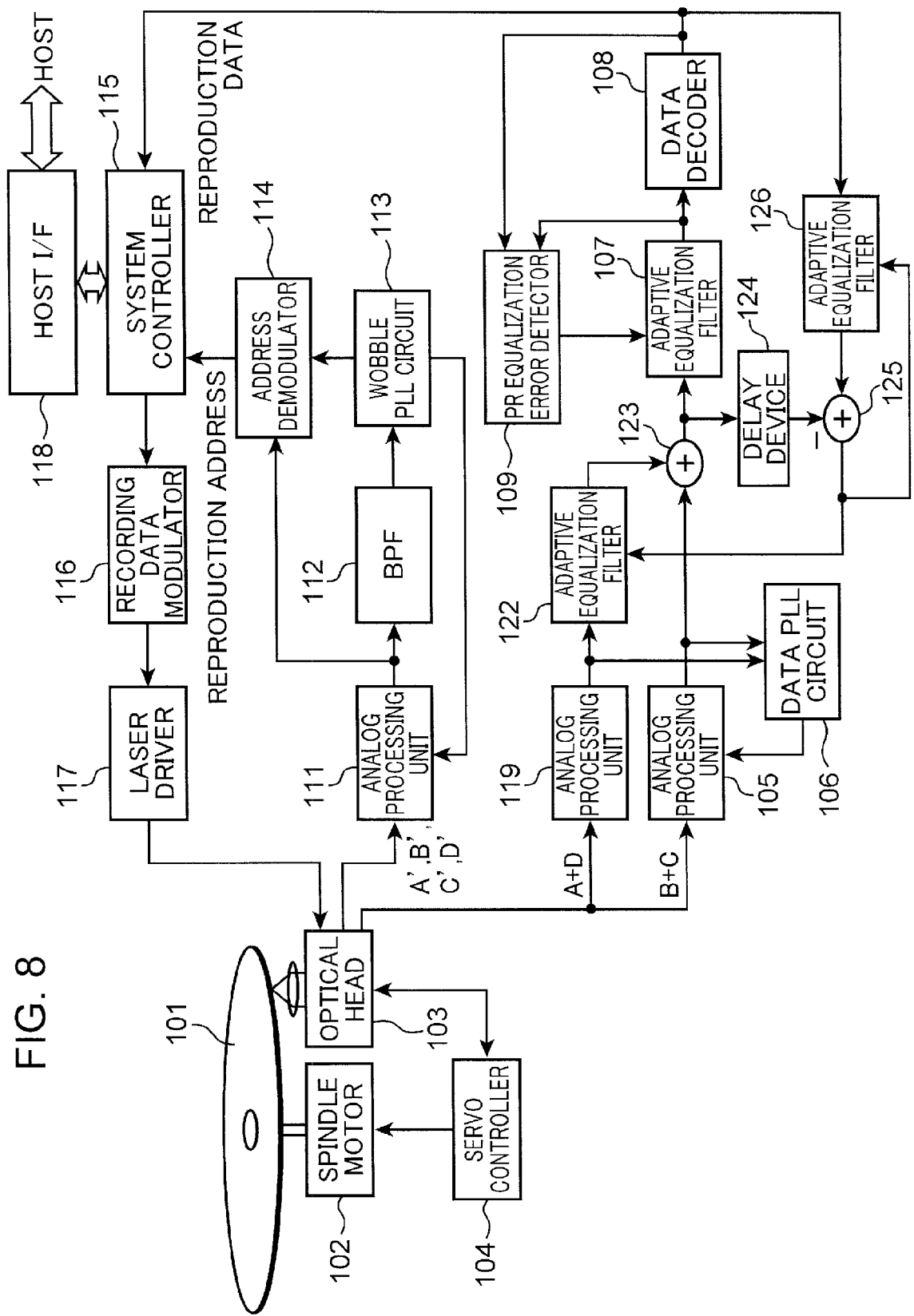
FIG. 8 is a diagram showing the configuration of an information recording and reproducing apparatus in Embodiment 2 of the present invention.

FIG. 8 is a diagram showing the configuration of an information recording and reproducing apparatus in Embodiment 2 of the present invention. First, the difference from Embodiment 1 in FIG. 1 will be described. A large difference is that the waveform shaping (equalization) target for removing a crosstalk component differs. In Embodiment 1, the target of waveform equalization after crosstalk component removal has been equalization for an intended PR method. In contrast, in Embodiment 2, the target of waveform equalization after crosstalk component removal is equalization to a reproduction signal without a crosstalk component. In the case where the high-pass characteristics in the frequency characteristics of a target PR method are insufficient with respect to the frequency characteristics of a reproduction signal, a high-pass component needs to be emphasized with an adaptive equalization filter. This causes a waveform to be distorted. Further, in the case where a crosstalk component is removed as illustrated with FIG. 6 and FIG. 7, characteristics in which a high-pass component is emphasized are necessary. Thus, there are cases where a crosstalk component cannot be removed sufficiently when a high-pass component of a reproduction waveform is emphasized unnecessarily.

Thus, in Embodiment 2, a crosstalk component is removed before a high-pass component is emphasized by equalizing a reproduction waveform for intended PR characteristics, and equalization of a reproduction waveform for intended PR characteristics is performed with respect to a signal in which a crosstalk component has been removed. Accordingly, the binarization performance of the data decoder improves, and the error rate can be reduced. That is, the idea is to not perform identical processing forcefully but to perform processing separately, in the case where the target frequency characteristics differ.

The information recording and reproducing apparatus shown in FIG. 8 includes the spindle motor 102, the optical head 103, the servo controller 104, the analog processing unit 105, the data PLL circuit 106, the adaptive equalization filter 107, the data decoder 108, the PR equalization error detector 109, the analog processing unit 111, the BPF 112, the wobble PLL circuit 113, the address demodulator 114, the system controller 115, the recording data modulator 116, the laser driver 117, the host I/F 118, the analog processing unit 119, an adaptive equalization filter 122, an adder 123, a delay device 124, an adder 125, and an adaptive equalization filter 126.

In FIG. 8, the adaptive equalization filter 122 has the same configuration as the adaptive equalization filter 107 shown in FIG. 4. Note that input Y for the adaptive equalization filter 122 is a signal output not from the PR equalization error detector 109 but from the adder 125. From the adder 125, a crosstalk component is output. The adaptive equalization filter 122 performs operation and update of the coefficient such that the crosstalk component is removed.

The adaptive equalization filter 107 performs waveform equalization of the addition result of the waveform of an output signal from the light-receiving sections 202 and 203 and the output waveform from the adaptive equalization filter 122. The data decoder 108 performs binarization processing of the output waveform from the adaptive equalization filter 107.

The adder 123 adds a reproduction signal from the analog processing unit 105 and a reproduction signal from the adaptive equalization filter 122. Since waveform equalization is performed such that the crosstalk component is removed in the adaptive equalization filter 122, the output waveform of the adder 123 is a waveform in which the crosstalk component has been removed. The adaptive equalization filter 107 performs waveform equalization of the output of the adder 123 in which the crosstalk component has been removed, such that intended PR characteristics are provided and a high-pass component is emphasized. Obviously, the bandwidth in which the gain is to be changed differs depending on the setting of a PR method.

The delay device 124 is delay-adjusted such that the waveform and the phase output from the adaptive equalization filter 126 are matched. The delay device 124 causes delay by the signal processing delay amount necessary for the adaptive equalization filter 107, the data decoder 108, and the adaptive equalization filter 126.

The adaptive equalization filter 126 outputs an ideal reproduction waveform that is a target based on the result of binarization processing by the data decoder 108 and the addition result of the waveform of the output signal from the light-receiving sections 202 and 203 and the output waveform from the adaptive equalization filter 122.

The adaptive equalization filter 126 generates an ideal reproduction signal without a noise component and a crosstalk component from a reproduction signal. That is, the reproduction signal generated by the adaptive equalization filter 126 has a waveform in which optical transfer function (OTF) characteristics of the reproduction signal have been reproduced. The adaptive equalization filter 126 has the same configuration as the adaptive equalization filter 107 shown in FIG. 4. Note that input Y for the adaptive equalization filter 126 is a signal output not from the PR equalization error detector 109 but from the adder 125. Input X for the adaptive equalization filter 126 is not a reproduction waveform but binary data output from the data decoder 108.

The coefficient update unit 402 of the adaptive equalization filter 107 performs operation of the coefficient used in the adaptive equalization filter 107 based on an error signal for the equalization target waveform obtained based on the result of binarization processing by the data decoder 108 and the output waveform from the adaptive equalization filter 107. The coefficient update unit 402 of the adaptive equalization filter 122 performs operation of the coefficient used in the adaptive equalization filter 122 based on an error signal for the addition result of the waveform of an output signal from the light-receiving sections 202 and 203 and the output waveform of the adaptive equalization filter 122 and the output waveform from the adaptive equalization filter 126.

In this Embodiment 2, the information recording and reproducing apparatus corresponds to one example of the information reproducing apparatus, the photodetector 200A corresponds to one example of the photodetector, the light-receiving sections 202 and 203 correspond to one example of the first light-receiving section, the light-receiving sections 201 and 204 correspond to one example of the second light-receiving section, the adaptive equalization filter 107 corresponds to one example of the first adaptive equalization filter, the adaptive equalization filter 122 corresponds to one example of the second adaptive equalization filter, the adaptive equalization filter 126 corresponds to one example of a third adaptive equalization filter, the data decoder 108 corresponds to one example of the data decoder, the PR equalization error detector 109 corresponds to one example of the error detector, and the coefficient update unit 402 corresponds to one example of the first coefficient arithmetic unit and the second coefficient arithmetic unit.

Figure 9:
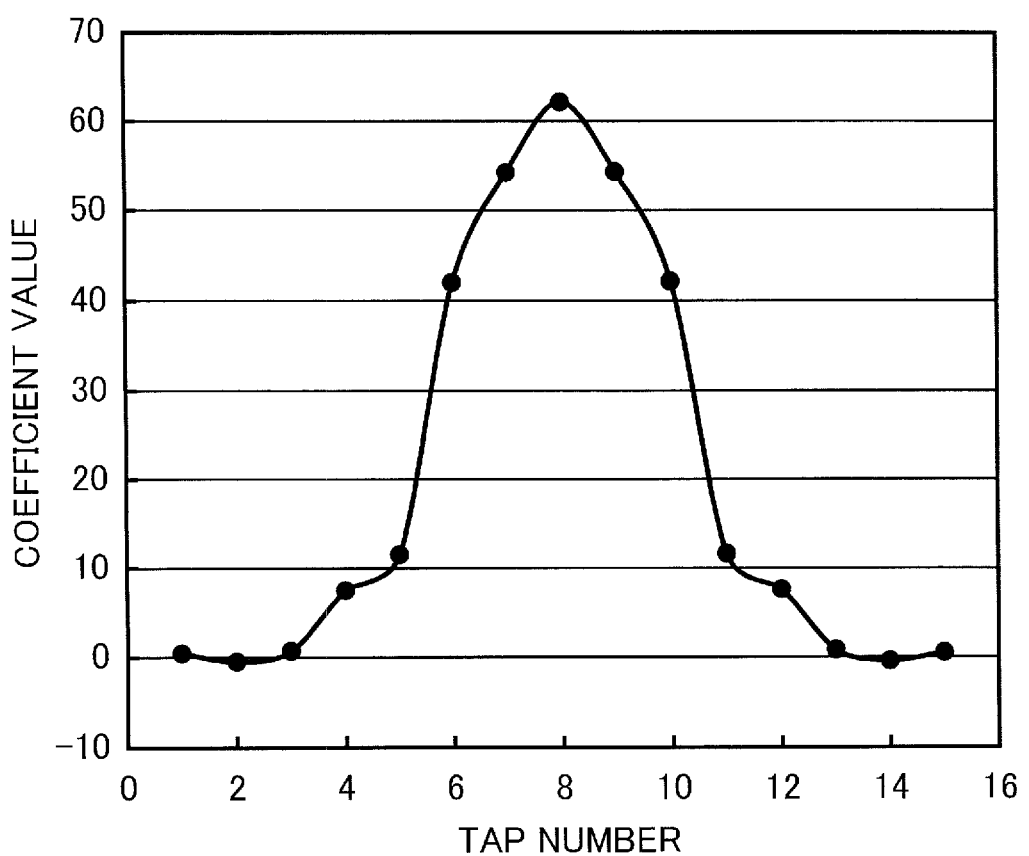
FIG. 9 is a diagram showing the relationship of the tap coefficient and the coefficient value of an adaptive equalization filter in Embodiment 2 of the present invention.
Figure 33:
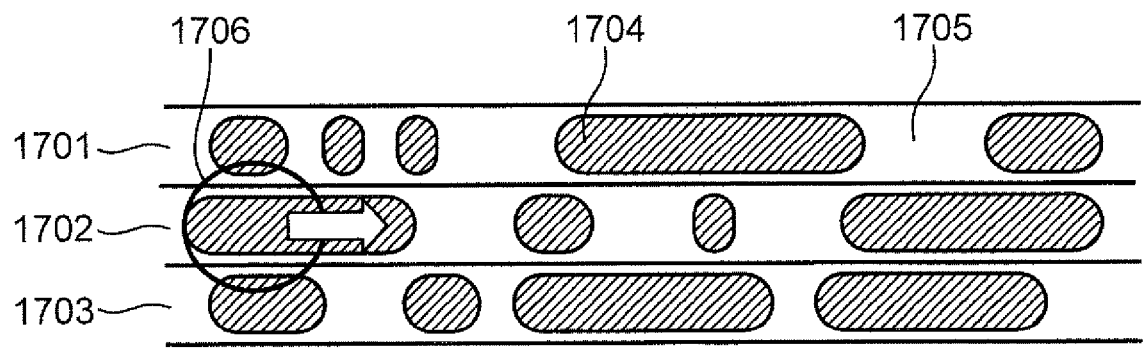
FIG. 33 is a diagram showing a laser irradiation spot scanning a recording track.

FIG. 9 is a diagram showing the relationship of the tap number and the coefficient value of the adaptive equalization filter 126 in Embodiment 2 of the present invention. FIG. 9 shows an example of the converged coefficient value for 15 taps in the adaptive equalization filter 126. In the adaptive equalization filter 126, the obtained tap coefficients form a waveform approximately equivalent to a reproduction signal in the case of reproducing one channel bit. One channel bit is the reference width (reference data) of a recording mark illustrated with FIG. 33. To illustrate with FIG. 4, an ideal reproduction signal without a noise component and crosstalk component in consideration of the OTF characteristics of the reproduction signal can be output when operation is performed in the FIR filter 401 for the obtained waveform (coefficient values of the multipliers 4017 to 4023) and binary data (input X) from the data decoder 108. The coefficient update unit 402 calculates the waveform (coefficient) approximately equivalent to the reproduction signal in the case of reproducing one channel bit, utilizing the correlation of a reproduced binary signal (input X) and the difference (input Y) of the reproduction signal and an ideal waveform.

With Embodiment 2 of the present invention as described above, a signal component of a self track and a crosstalk component from an adjacent track are detected with one spot (one reproduction operation), and equalization for intended PR characteristics is possible after removing crosstalk having a predetermined frequency, without mounting a large-scale circuit. Therefore, the error rate of an output signal from the data decoder 108 can be reduced.

(Embodiment 3)

Figure 10:
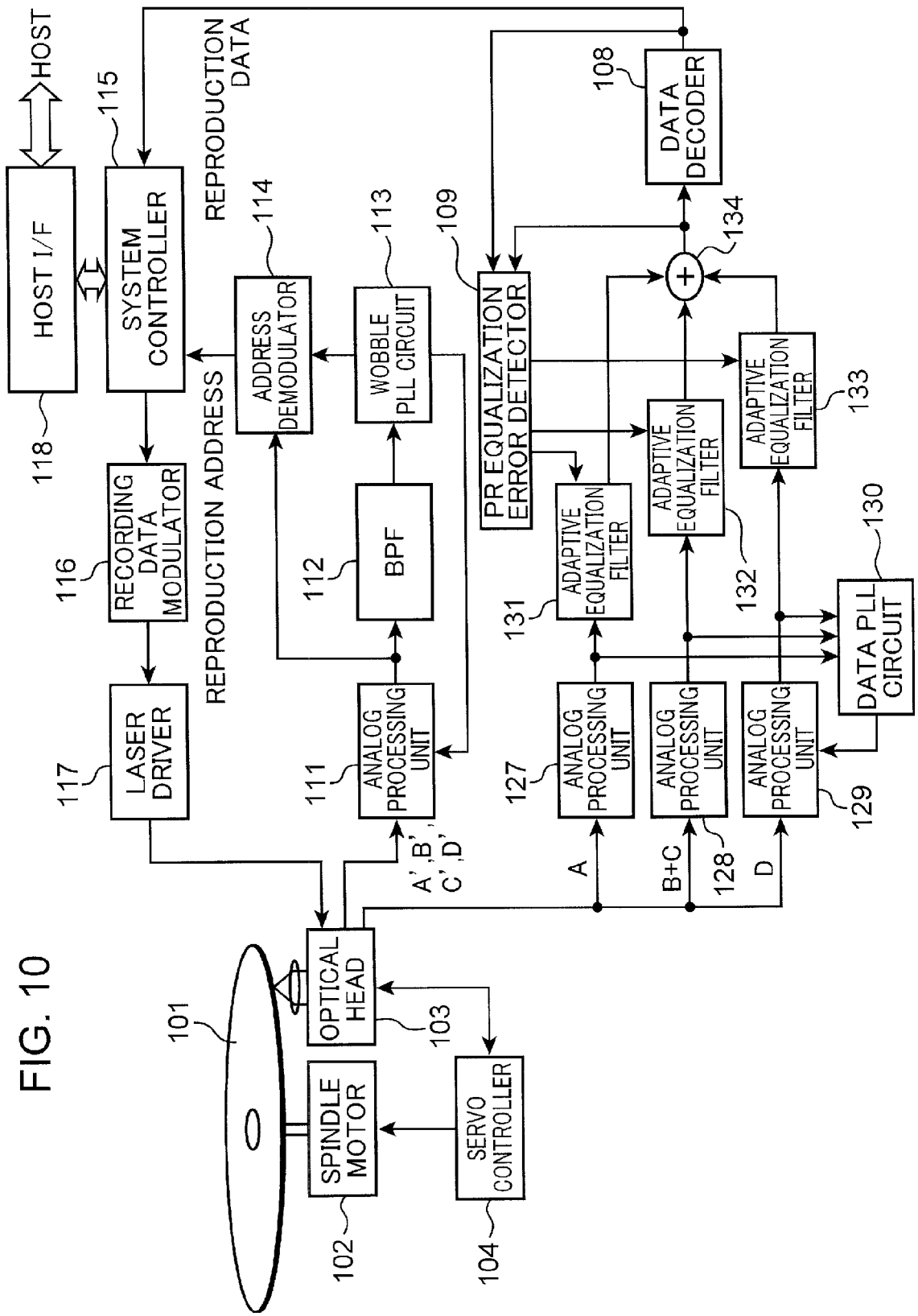
FIG. 10 is a diagram showing the configuration of an information recording and reproducing apparatus in Embodiment 3 of the present invention.

FIG. 10 is a diagram showing the configuration of an information recording and reproducing apparatus in Embodiment 3 of the present invention. First, the difference from Embodiment 1 in FIG. 1 will be described. A large difference is that three-divided reproduction signals are output from an optical head, and a crosstalk component is removed from the three reproduction signals. There are cases where a bias occurs in a crosstalk component of the A signal and a crosstalk component of the D signal due to a radial tilt caused by an inclination of the optical head and an optical disc, an offtrack in which a laser spot does not scan the center of a track, or the like. In such cases, a configuration in which leakage signals from tracks adjacent on both sides are processed separately so that bias can be removed is desirable.

In this Embodiment 3, the configuration is such that a crosstalk component with a bias as described above can be handled. Note that, in this case, there is a risk that the tangential line for the optical head and a signal processing device (or signal processing circuit) increases, and further the scale of the signal processing circuit increases. Therefore, it is necessary that this Embodiment 3 be selected in consideration of the balance of performance and circuit scale. Generally, transmission of a reproduction signal (high-bandwidth signal) may be transmission as a differential signal in consideration of the noise resistance characteristics. In that case, a signal line is doubled.

The information recording and reproducing apparatus shown in FIG. 10 includes the spindle motor 102, the optical head 103, the servo controller 104, the data decoder 108, the PR equalization error detector 109, the analog processing unit 111, the BPF 112, the wobble PLL circuit 113, the address demodulator 114, the system controller 115, the recording data modulator 116, the laser driver 117, the host I/F 118, an analog processing unit 127, an analog processing unit 128, an analog processing unit 129, a data PLL circuit 130, an adaptive equalization filter 131, an adaptive equalization filter 132, an adaptive equalization filter 133, and an adder 134.

Figure 11:
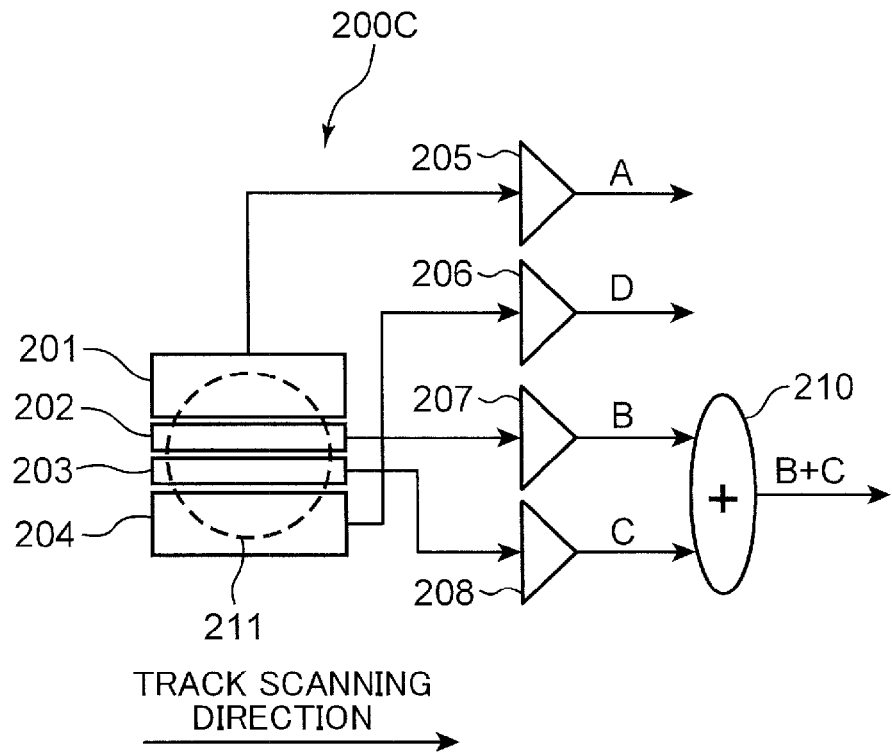
FIG. 11 is a diagram showing the configuration of a photodetector of an optical head in Embodiment 3 of the present invention.

FIG. 11 is a diagram showing the configuration of a photodetector of the optical head in Embodiment 3 of the present invention. A photodetector 200C of the optical head 103 in FIG. 10 is configured as in FIG. 11 and outputs the A signal, the D signal, and the B+C signal. The light-receiving sections 201 to 204, the amplifiers 205 to 208, and the adder 210 have the same characteristics and configurations as in FIG. 2. The A signal output from the amplifier 205 is output to the analog processing unit 127, the D signal output from the amplifier 206 is output to the analog processing unit 129, and the B+C signal output from the adder 210 is output to the analog processing unit 128.

The light-receiving section 201 receives reflected light of a portion adjacent on one side in the radial direction of the optical disc 101 with respect to a center section. The light-receiving section 204 receives reflected light of a portion adjacent on the other side in the radial direction of the optical disc 101 with respect to the center section.

The analog processing units 127, 128, and 129 have the same configuration as the analog processing units 105 and 119 in FIG. 1. With respect to three reproduction signals of the A signal, the B+C signal, and the D signal, the analog processing units 127, 128, and 129 perform predetermined HPF processing in which DC fluctuation is reduced, LPF processing in which high-pass noise unnecessary for data reproduction is removed, AGC processing in which amplitude fluctuation of a data signal is reduced, and ADC processing in which an analog signal is converted to a digital signal using a clock signal supplied from the data PLL circuit 130.

From the three reproduction signals processed in the analog processing units 127, 128, and 129, the data PLL circuit 130 generates a clock signal in synchronization with the reproduction signal. The adaptive equalization filters 131, 132, and 133 have the same configuration as the adaptive equalization filter 107 shown in FIG. 4.

The adaptive equalization filter 131 performs waveform equalization of an output signal from the light-receiving section 201. The adaptive equalization filter 132 performs waveform equalization of an output signal from the light-receiving sections 202 and 203. The adaptive equalization filter 133 performs waveform equalization of an output signal from the light-receiving section 204.

The adder 134 adds output waveforms from the three adaptive equalization filters 131, 132, and 133. For each of the three adaptive equalization filters 131, 132, and 133, operation and update are performed for an optimum coefficient using a common error signal from the PR equalization error detector 109 such that the output waveform from the adder 134 is provided with intended PR characteristics.

The data decoder 108 performs binarization processing of the addition result of the output waveform from the adaptive equalization filter 132, the output waveform from the adaptive equalization filter 131, and the output waveform from the adaptive equalization filter 133.

The PR equalization error detector 109 calculates an error between the equalization target waveform calculated based on the result of binarization processing by the data decoder 108 and the addition result of the output waveform from the adaptive equalization filter 131, the output waveform from the adaptive equalization filter 132, and the output waveform from the adaptive equalization filter 133.

The coefficient update unit 402 of the adaptive equalization filter 132 performs operation of the coefficient used in the adaptive equalization filter 132 based on the error calculated by the PR equalization error detector 109. The coefficient update unit 402 of the adaptive equalization filter 131 performs operation of the coefficient used in the adaptive equalization filter 131 based on the error calculated by the PR equalization error detector 109. The coefficient update unit 402 of the adaptive equalization filter 133 performs operation of the coefficient used in the adaptive equalization filter 133 based on the error calculated by the PR equalization error detector 109.

In this Embodiment 3, the information recording and reproducing apparatus corresponds to one example of the information reproducing apparatus, the photodetector 200C corresponds to one example of the photodetector, the light-receiving sections 202 and 203 correspond to one example of the first light-receiving section, the light-receiving section 201 corresponds to one example of a third light-receiving section, the light-receiving section 204 corresponds to one example of a fourth light-receiving section, the adaptive equalization filter 132 corresponds to one example of the first adaptive equalization filter, the adaptive equalization filter 131 corresponds to one example of the third adaptive equalization filter, the adaptive equalization filter 133 corresponds to one example of a fourth adaptive equalization filter, the data decoder 108 corresponds to one example of the data decoder, the PR equalization error detector 109 corresponds to one example of the error detector, and the coefficient update unit 402 corresponds to one example of the first coefficient arithmetic unit, the second coefficient arithmetic unit, and a third coefficient arithmetic unit.

With this Embodiment 3 of the present invention as described above, a signal component of a self track and a crosstalk component from an adjacent track are detected from three reproduction signals detected from one spot (one reproduction operation), and equalization for intended PR characteristics is possible while removing crosstalk having a predetermined frequency. Therefore, the error rate of an output signal from the data decoder 108 can be reduced. Particularly, the error rate can be reduced with respect to bias of a crosstalk component from two adjacent tracks that occur due to a radial tilt, offtrack, lens shift, or the like.

Although the photodetector 200C of the optical head 103 includes four-divided light-receiving sections in this Embodiment 3, the present invention is not limited as such and may include three-divided light-receiving sections. A case where a photodetector of the optical head 103 in FIG. 10 includes three-divided light-receiving sections will be described.

Figure 12:
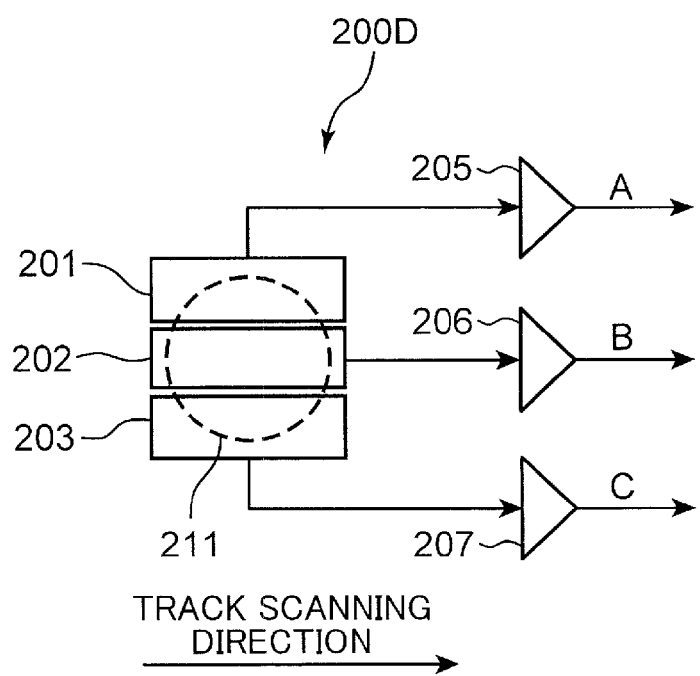
FIG. 12 is a diagram showing the configuration of a photodetector in a first modified example of Embodiment 3 of the present invention.

A photodetector 200D including three-divided light-receiving sections is configured as in FIG. 12. FIG. 12 is a diagram showing the configuration of the photodetector in a first modified example of Embodiment 3 of the present invention. The photodetector 200D includes the three light-receiving sections 201, 202, and 203 divided by dividing lines parallel to the track scanning direction, and is irradiated with an optical spot 211 reflected from an information recording medium as shown by a dotted line in FIG. 12. The photodetector 200D outputs the A signal, the B signal, and the C signal. The amplifiers 205 to 207 respectively amplify signals output from the light-receiving sections 201 to 203. The light-receiving sections 201 to 203 and amplifiers 205 to 207 have the same characteristics and configurations as the light-receiving sections 201 to 203 and the amplifiers 205 to 207 shown in FIG. 11. The difference of the photodetector 200D in FIG. 12 and the photodetector 200C in FIG. 11 is whether or not the light-receiving section corresponding to the middle portion of the optical spot 211 is divided.

Figure 13:
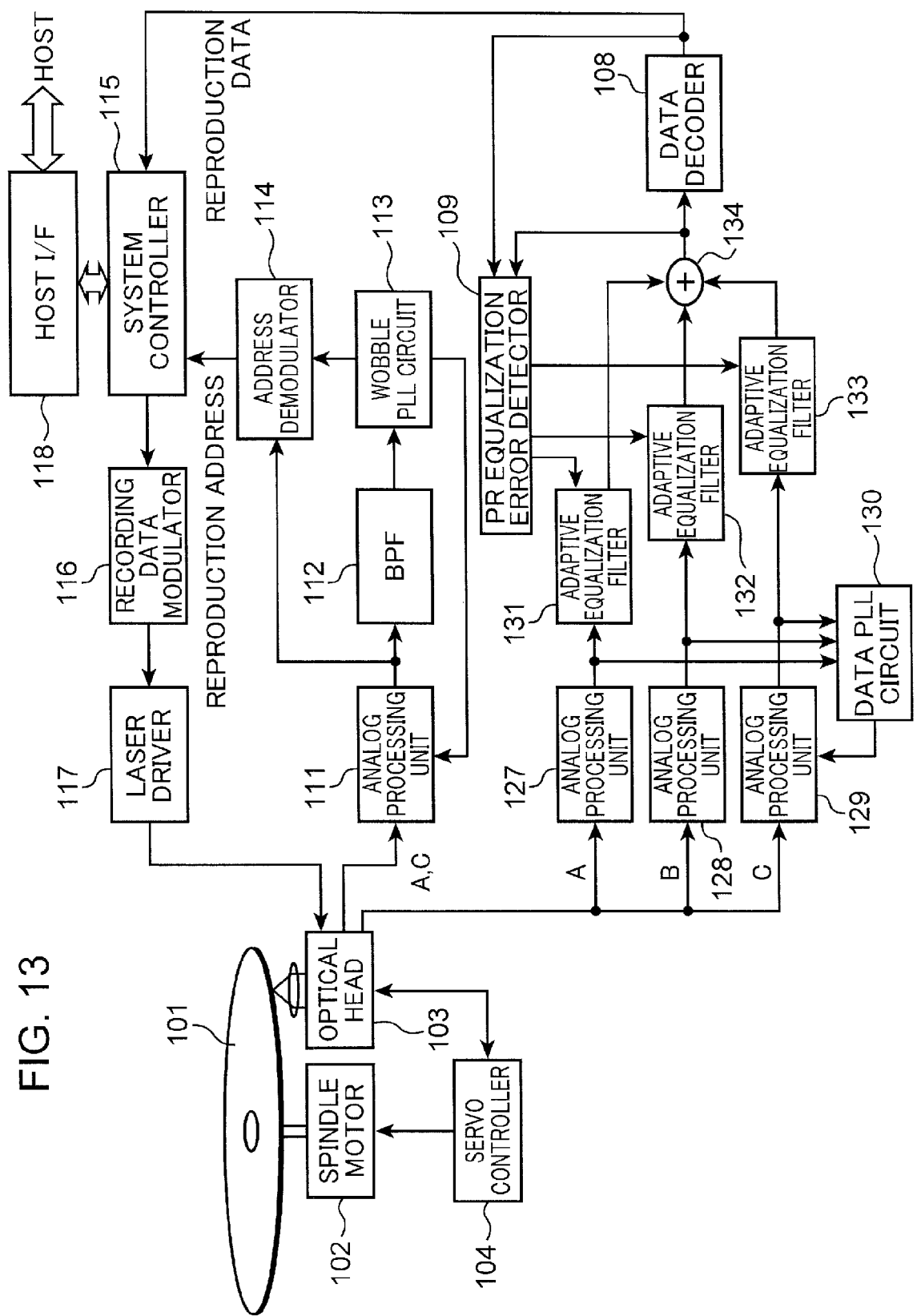
FIG. 13 is a diagram showing the configuration of an information recording and reproducing apparatus in the first modified example of Embodiment 3 of the present invention.

In the case where the photodetector 200D shown in FIG. 12 is used, an information recording and reproducing apparatus that records or reproduces information in an information recording medium in the first modified example of Embodiment 3 of the present invention is configured as in FIG. 13. FIG. 13 is a diagram showing the configuration of the information recording and reproducing apparatus in the first modified example of Embodiment 3 of the present invention.

The information recording and reproducing apparatus shown in FIG. 13 includes the spindle motor 102, the optical head 103, the servo controller 104, the data decoder 108, the PR equalization error detector 109, the analog processing unit 111, the BPF 112, the wobble PLL circuit 113, the address demodulator 114, the system controller 115, the recording data modulator 116, the laser driver 117, the host I/F 118, the analog processing unit 127, the analog processing unit 128, the analog processing unit 129, the data PLL circuit 130, the adaptive equalization filter 131, the adaptive equalization filter 132, the adaptive equalization filter 133, and the adder 134.

The light-receiving section 201 receives reflected light of a portion adjacent on one side in the radial direction of the optical disc 101 with respect to a center section. The light-receiving section 203 receives reflected light of a portion adjacent on the other side in the radial direction of the optical disc 101 with respect to the center section.

The adaptive equalization filter 131 performs waveform equalization of an output signal from the light-receiving section 201. The adaptive equalization filter 132 performs waveform equalization of an output signal from the light-receiving section 202. The adaptive equalization filter 133 performs waveform equalization of an output signal from the light-receiving section 203.

The data decoder 108 performs binarization processing of the addition result of the output waveform from the adaptive equalization filter 131, the output waveform from the adaptive equalization filter 132, and the output waveform from the adaptive equalization filter 133.

The wobble PLL circuit 113 detects a wobble signal from the difference of the output signal from the light-receiving section 201 and the output signal from the light-receiving section 203. The address demodulator 114 demodulates an address from the wobble signal detected by the wobble PLL circuit 113.

In the first modified example of this Embodiment 3, the information recording and reproducing apparatus corresponds to one example of the information reproducing apparatus, the photodetector 200D corresponds to one example of the photodetector, the light-receiving section 202 corresponds to one example of the first light-receiving section, the light-receiving section 201 corresponds to one example of the third light-receiving section, the light-receiving section 203 corresponds to one example of a fourth light-receiving section, the adaptive equalization filter 132 corresponds to one example of the first adaptive equalization filter, the adaptive equalization filter 131 corresponds to one example of the third adaptive equalization filter, the adaptive equalization filter 133 corresponds to one example of the fourth adaptive equalization filter, the data decoder 108 corresponds to one example of the data decoder, the PR equalization error detector 109 corresponds to one example of the error detector, the coefficient update unit 402 corresponds to one example of the first coefficient arithmetic unit, the second coefficient arithmetic unit, and the third coefficient arithmetic unit, the wobble PLL circuit 113 corresponds to one example of a wobble detection unit, and the address demodulator 114 corresponds to one example of an address demodulator.

The difference of the information recording and reproducing apparatus shown in FIG. 13 and the information recording and reproducing apparatus shown in FIG. 10 is that data recorded in the optical disc 101 is reproduced from the A signal, the B signal, and the C signal from the photodetector 200D, and address information recorded in the optical disc 101 in advance is reproduced from the A signal and the C signal.

The advantage of this configuration is that the signal-to-noise ratio (SN ratio) of a transmission line can be improved by the reduction of an addition unit that adds a plurality of reproduction signals, since the division number of the light-receiving sections is small. Through optimization of the division ratio of the light-receiving sections 201 to 203, address information can be reproduced stably from a wobble signal that is a difference signal for the A signal and the C signal while removing a crosstalk component from an adjacent track that is included in a reproduction signal. However, when the area of a light-receiving region of the light-receiving sections 201 and 203 is made too small, there is a possibility of not only a decrease in the SN ratio of a reproduction signal but also a deterioration in various reproduction stress tolerances. Therefore, the division ratio of the light-receiving section needs to be set deliberately.

For example, it suffices that the region area of the light-receiving section 202 be made smaller than the total of the region area of the light-receiving section 201 and the region area of the light-receiving section 203 in consideration of the balance of the crosstalk cancelling performance and the address reproduction performance.

The crosstalk amount from an adjacent track differs depending on the design parameter of an optical disc such as spot size or track pitch and the radial-direction width of a recording mark formed by a recording operation. If the design parameter of an optical disc such as spot size or track pitch is determined, the divided width with which a reproduction signal of a self track and a crosstalk signal from an adjacent track can be separated is determined naturally.

Figure 14:
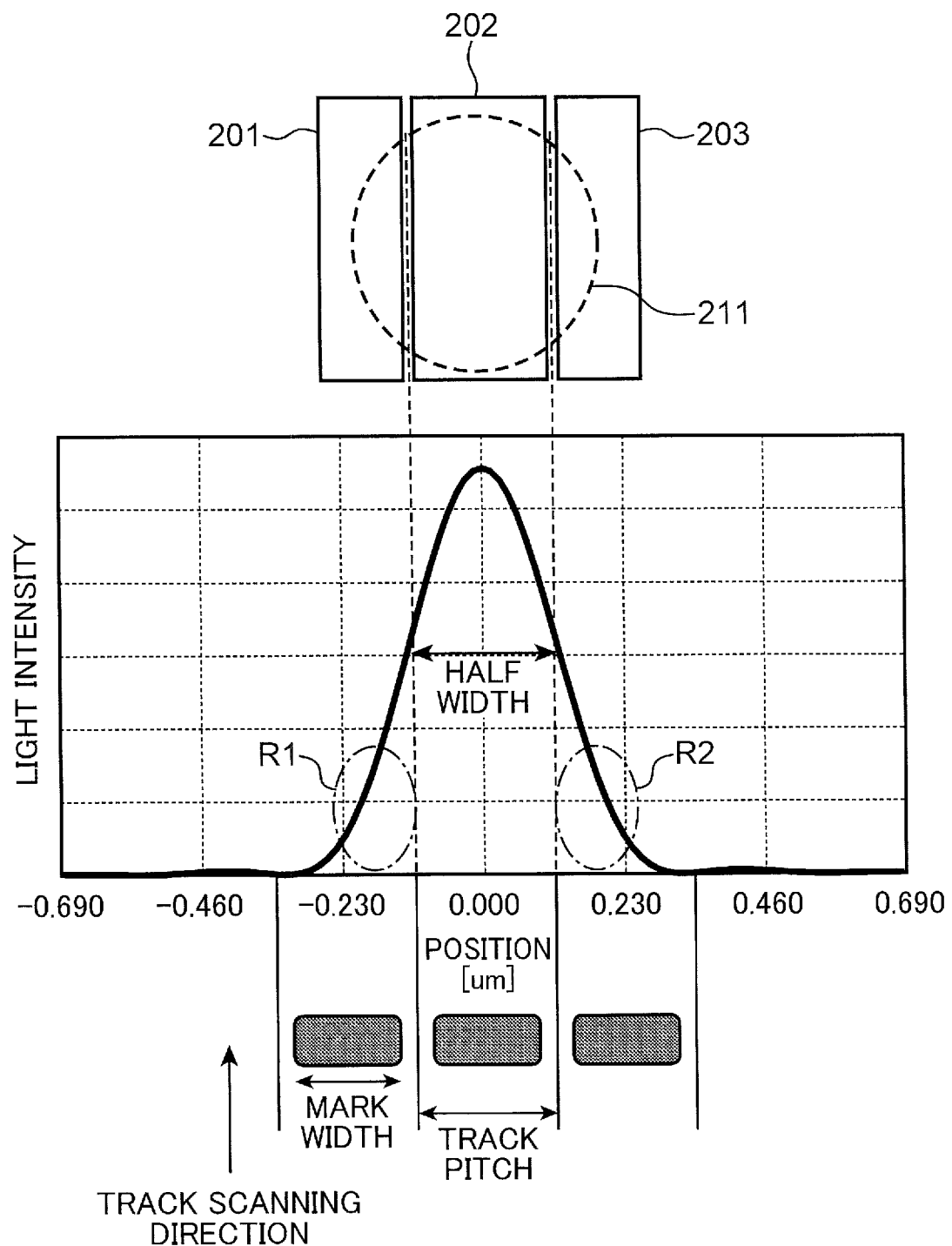
FIG. 14 is a diagram showing the relationship of a photodetector that is divided into three by dividing lines parallel to the track scanning direction, the light intensity distribution of laser light, and recording signals of three tracks.

FIG. 14 is a diagram showing the relationship of a photodetector that is divided into three by dividing lines parallel to the track scanning direction, the light intensity distribution of laser light, and recording signals of three tracks. The definitions of the light-receiving sections 201, 202, and 203 and the optical spot 211 are the same as the above. The half width of the spot size is 0.25 μm, the track pitch is 0.23 μm, and the width (mark width) of a recording mark in the radial direction is 0.19 μm. It can be seen that a signal from an adjacent track leaks into regions R1 and R2 of the light intensity distribution of laser light, since the track pitch is narrower than the half width of the spot size.

When calculated with optical simulation, the influence of an adjacent track with respect to the spot size is approximately 27% of the spot size. Therefore, the ratio of the divided widths of the light-receiving sections 201, 202, and 203 for separating a signal of a self track and a signal of an adjacent track can be estimated as 27:46:27.

In order to enable reproduction of an optical disc of a new type while ensuring compatibility with Blu-ray discs, it is necessary to change only the track pitch without changing the half width of the spot size and introduce crosstalk cancel signal processing proposed in this embodiment. Since the track pitch with which the effect of the crosstalk cancel signal processing can be exhibited is approximately 80% of the half width, it suffices to determine the candidate for the track pitch in consideration of the area density and the reproduction performance of an optical disc. For example, it suffices that the track pitch be approximately 0.24 μm to 0.2 μm.

In this case, it is desirable that the division ratio of the light-receiving section in a middle section and the light-receiving section in an end section with which the effect of crosstalk cancelling can be exhibited be 1.5 to 4.5. That is, a value of the width in the radial direction for the light-receiving section (first light-receiving section) in the middle section divided by the width in the radial direction for the light-receiving section (third light-receiving section) in one end section and a value of the width in the radial direction for the light-receiving section (first light-receiving section) in the middle section divided by the width in the radial direction for the light-receiving section (fourth light-receiving section) in the other end section is preferably in a range of 0.75 to 2.25.

For example, in the case where the division ratio of the light-receiving section in the middle section and the light-receiving section in the end section is 2, the ratio of the divided widths of the light-receiving sections 201, 202, and 203 is 1:2:1 (end section to middle section to end section). In other words, it is desirable that a value of the width of the light-receiving section in the middle section over, open parenthesis, two times the width of the light-receiving section in the end section, close parenthesis, be 0.75 to 2.25. That is, a value of the width in the radial direction for the light-receiving section (first light-receiving section) in the middle section divided by the width in the radial direction for the light-receiving section (second light-receiving section) in both end sections is preferably in a range of 0.75 to 2.25.

Herein, only the divided width for division into three has been described. However, it suffices to determine the divided width with similar considerations in the case of division into four or division into five.

Further, it suffices to ensure a predetermined or greater carrier-to-noise ratio (CN ratio) of a wobble signal that allows the address performance to be ensured with the division proportion described above. In the case where the predetermined or greater CN ratio cannot be ensured with the divided width described above, a change in the spot size or track pitch or a change to a recording film that can reduce the width of a formed recording mark in the radial direction and can maintain the SN ratio is necessary.

Figure 15:
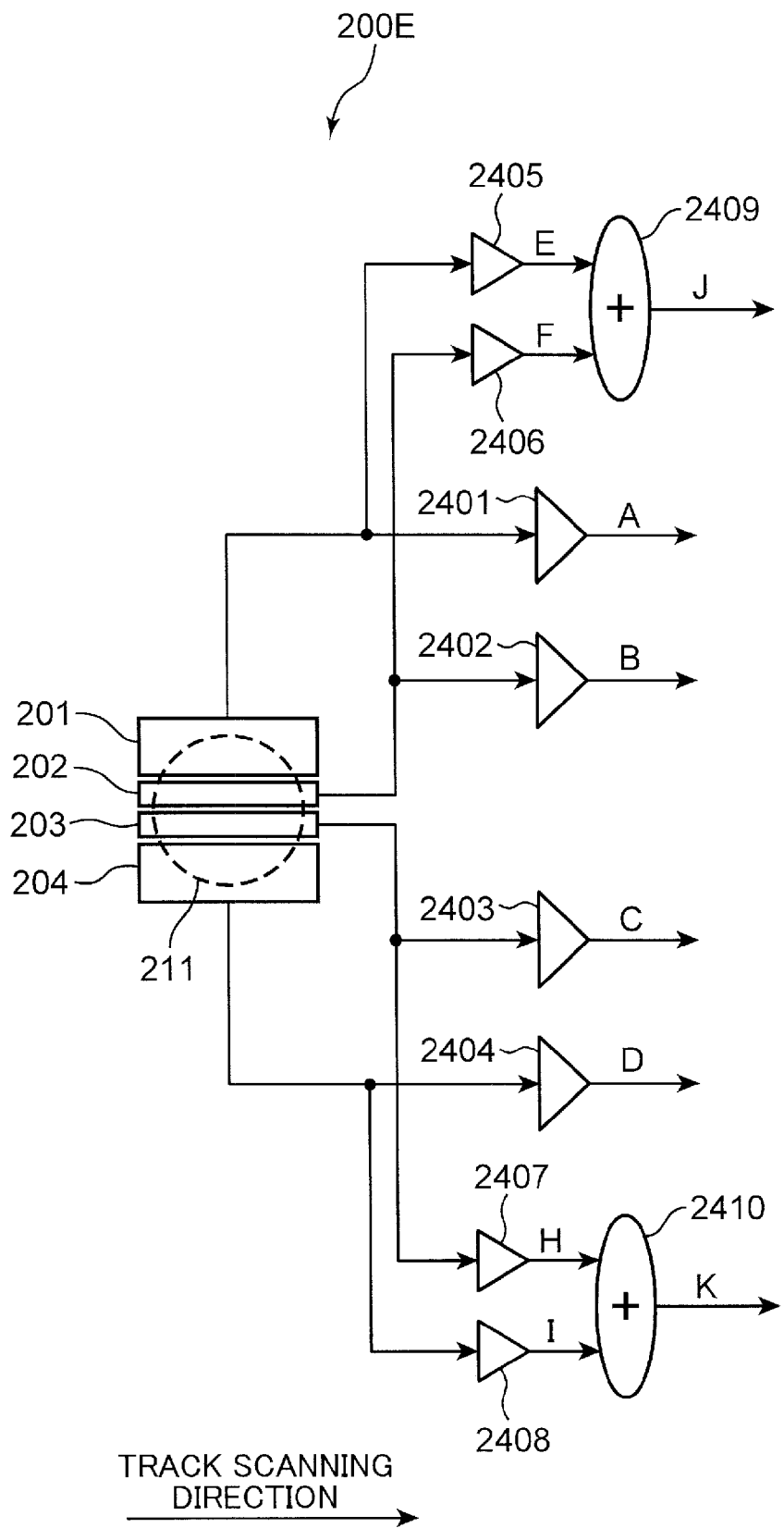
FIG. 15 is a diagram showing the configuration of a photodetector in a second modified example of Embodiment 3 of the present invention.

A case where a photodetector of the optical head 103 includes four-divided light-receiving sections and crosstalk cancel processing is performed using four-divided signals will be described. The photodetector including the four-divided light-receiving sections is configured as in FIG. 15. FIG. 15 is a diagram showing the configuration of the photodetector in a second modified example of Embodiment 3 of the present invention.

A photodetector 200E shown in FIG. 15 includes the light-receiving sections 201, 202, 203, and 204, amplifiers 2401, 2402, 2403, 2404, 2405, 2406, 2407, and 2408, and adders 2409 and 2410.

The amplifier 2401 outputs the A signal in which a signal output from the light-receiving section 201 is amplified. The amplifier 2402 outputs the B signal in which a signal output from the light-receiving section 202 is amplified. The amplifier 2403 outputs the C signal in which a signal output from the light-receiving section 203 is amplified. The amplifier 2404 outputs the D signal in which a signal output from the light-receiving section 204 is amplified. The amplifier 2405 outputs an E signal in which a signal output from the light-receiving section 201 is amplified. The amplifier 2406 outputs an F signal in which a signal output from the light-receiving section 202 is amplified. The amplifier 2407 outputs an H signal in which a signal output from the light-receiving section 203 is amplified. The amplifier 2408 outputs an I signal in which a signal output from the light-receiving section 204 is amplified.

The adder 2409 adds the E signal output from the amplifier 2405 and the F signal output from the amplifier 2406 and outputs a J signal (E+F). The adder 2410 adds the H signal output from the amplifier 2407 and the I signal output from the amplifier 2408 and outputs a K signal (H+I).

The photodetector outputs the A signal, the B signal, the C signal, the D signal, the J signal, and the K signal. The light-receiving sections 201 to 204, the amplifiers 2401 to 2408, and the adders 2409 and 2410 have the same characteristic and configurations as the light-receiving sections 201 to 204, the amplifiers 205 to 208, and the adder 210 shown in FIG. 11. Note that the characteristics of the respective amplifiers 2401 to 2408 may be optimized by the configuration. The J signal and the K signal are output as a signal for generating a wobble signal. The E signal and the I signal may be output as a signal for generating a wobble signal, as long as the division proportion of the light-receiving section 201 and the light-receiving section 204 is a division proportion sufficient for detecting a wobble signal.

Figure 16:
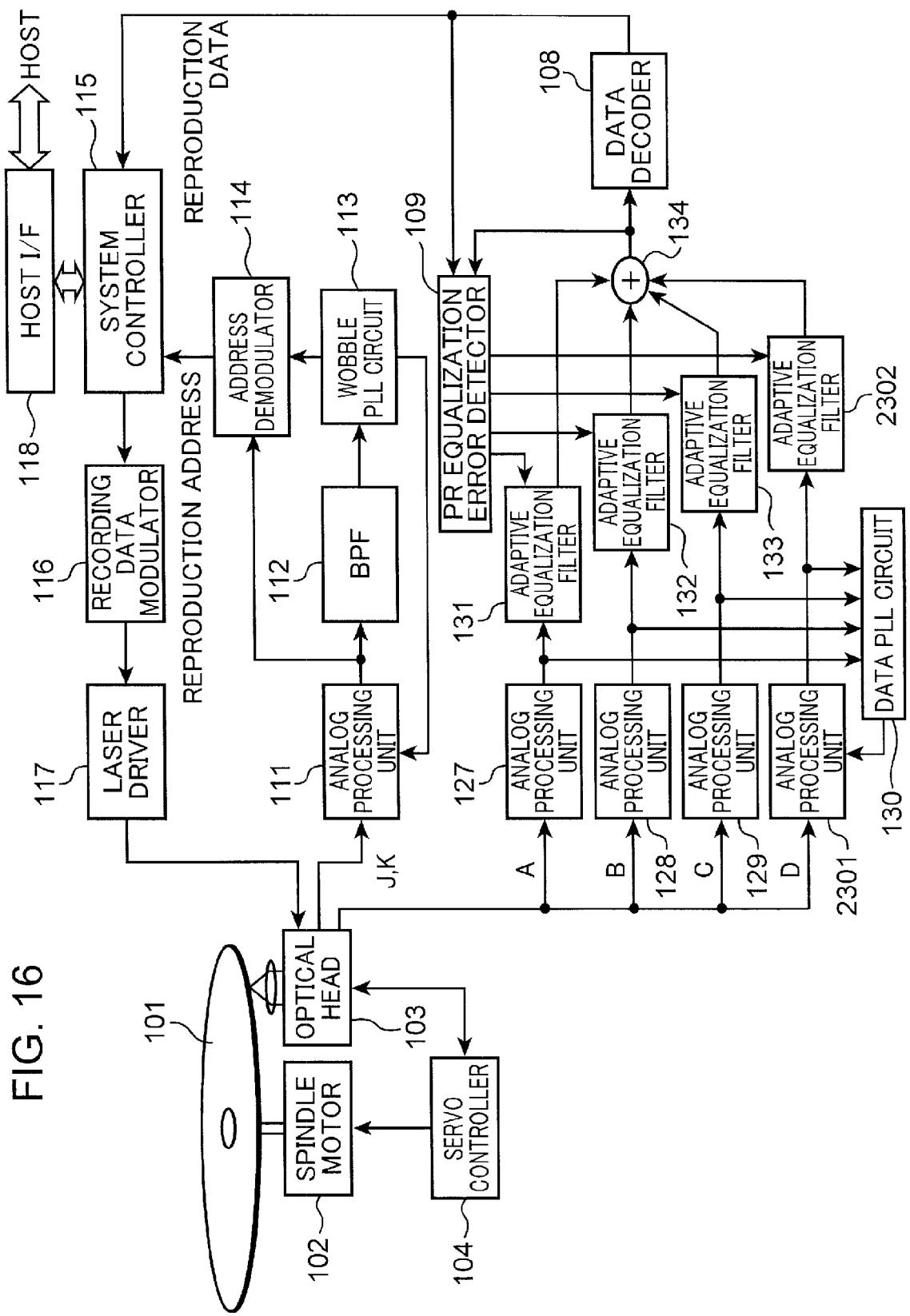
FIG. 16 is a diagram showing the configuration of an information recording and reproducing apparatus in the second modified example of Embodiment 3 of the present invention.

In the case where the photodetector 200E shown in FIG. 15 is used, an information recording and reproducing apparatus that records or reproduces information in an information recording medium in the second modified example of Embodiment 3 of the present invention is configured as in FIG. 16. FIG. 16 is a diagram showing the configuration of the information recording and reproducing apparatus in the second modified example of Embodiment 3 of the present invention. The difference of the photodetector 200E shown in FIG. 15 and the photodetector 200C shown in FIG. 11 is that a signal from the light-receiving section 202 and a signal from the light-receiving section 203 are output without addition, and a signal in which a signal from the light-receiving section 201 and a signal from the light-receiving section 202 are added and a signal in which a signal from the light-receiving section 203 and a signal from the light-receiving section 204 are added are output as a signal for generating a signal for detecting a wobble signal.

The difference of the information recording and reproducing apparatus shown in FIG. 16 and the information recording and reproducing apparatus shown in FIG. 10 is that data recorded in the optical disc 101 is reproduced based on the A signal, the B signal, the C signal, and the D signal from the photodetector 200E, and address information recorded in the optical disc 101 in advance is reproduced based on the J signal and the K signal from the photodetector 200E.

The information recording and reproducing apparatus shown in FIG. 16 includes the spindle motor 102, the optical head 103, the servo controller 104, the data decoder 108, the PR equalization error detector 109, the analog processing unit 111, the BPF 112, the wobble PLL circuit 113, the address demodulator 114, the system controller 115, the recording data modulator 116, the laser driver 117, the host I/F 118, the analog processing unit 127, the analog processing unit 128, the analog processing unit 129, the data PLL circuit 130, the adaptive equalization filter 131, the adaptive equalization filter 132, the adaptive equalization filter 133, the adder 134, an analog processing unit 2301, and an adaptive equalization filter 2302.

Since reproduction signals from the optical head 103 are increased to four in the information recording and reproducing apparatus shown in FIG. 16, the analog processing unit 2301 and the adaptive equalization filter 2302 necessary for crosstalk cancel processing are added. The data PLL circuit 130 performs synchronization processing from four signals from the analog processing units 127, 128, 129, and 2301.

With the adder 134, four signals from the adaptive equalization filters 131, 132, 133, and 2302 are added and output to the PR equalization error detector 109. The PR equalization error detector 109 generates an error signal from the difference of a signal in which the four signals are added and an expected value of PR equalization, and outputs the generated error signal to the four adaptive equalization filters 131, 132, 133, and 2302.

In the second modified example of this Embodiment 3, the information recording and reproducing apparatus corresponds to one example of the information reproducing apparatus, the photodetector 200E corresponds to one example of the photodetector, the light-receiving section 201 corresponds to one example of the third light-receiving section, the light-receiving section 204 corresponds to one example of the fourth light-receiving section, the light-receiving section 202 corresponds to one example of a fifth light-receiving section, the light-receiving section 203 corresponds to one example of a sixth light-receiving section, the adaptive equalization filter 131 corresponds to one example of the third adaptive equalization filter, the adaptive equalization filter 2302 corresponds to one example of the fourth adaptive equalization filter, the adaptive equalization filter 132 corresponds to one example of a fifth adaptive equalization filter, the adaptive equalization filter 133 corresponds to one example of a sixth adaptive equalization filter, the data decoder 108 corresponds to one example of the data decoder, the PR equalization error detector 109 corresponds to one example of the error detector, the coefficient update unit 402 corresponds to one example of the first coefficient arithmetic unit, the second coefficient arithmetic unit, the third coefficient arithmetic unit, and a fourth coefficient arithmetic unit, the wobble PLL circuit 113 corresponds to one example of the wobble detection unit, and the address demodulator 114 corresponds to one example of the address demodulator.

The advantage of this configuration is that the crosstalk cancelling effect can be maintained by the increased division number of the light-receiving sections, in the case where the center of the optical spot 211 in FIG. 15 is displaced from the center of a recording track of the optical disc 101 and the photodetector 200E is not appropriately irradiated with reproducing light.

Causes for the photodetector 200E not being appropriately irradiated with reproducing light include a case where an offtrack has occurred, a case where a radial tilt has occurred, and a case where a lens shift has occurred at the time of reproduction. These are causes that generally may occur at the time of reproduction. With respect to these causes, the photodetector 200E including the four-divided light-receiving sections can improve the reproduction tolerance.

Figure 17A:
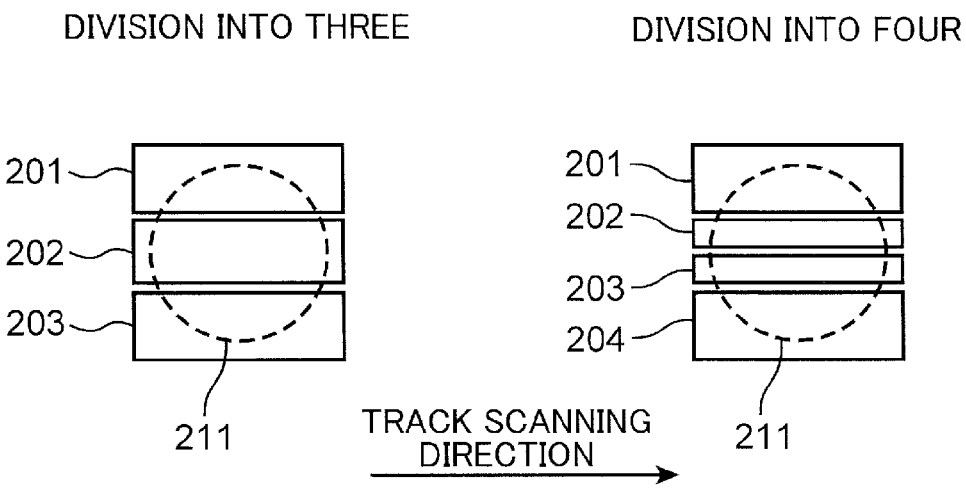
FIG. 17A is a diagram showing three-divided light-receiving sections and four-divided light-receiving sections in the case where a lens shift has not occurred.
Figure 17B:
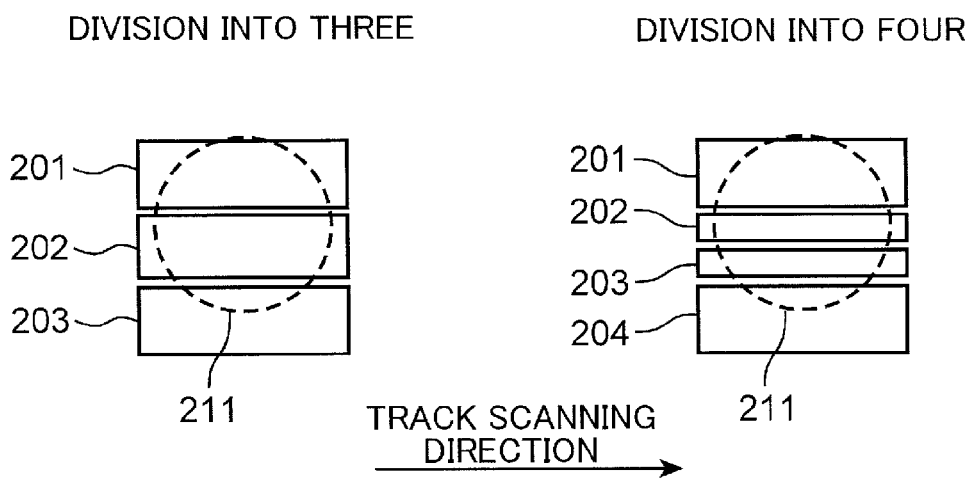
FIG. 17B is a diagram showing the three-divided light-receiving sections and the four-divided light-receiving sections in the case where a lens shift of a predetermined amount has occurred.

FIG. 17A and FIG. 17B are diagrams for comparison of a photodetector including three-divided light-receiving sections and a photodetector including four-divided light-receiving sections, in the case where a lens shift has occurred. FIG. 17A is a diagram showing the three-divided light-receiving sections and the four-divided light-receiving sections in the case where a lens shift has not occurred, and FIG. 17B is a diagram showing the three-divided light-receiving sections and the four-divided light-receiving sections in the case where a lens shift of a predetermined amount has occurred.

In the case where a lens shift has occurred with the case of the photodetector including the three-divided light-receiving sections, the center of the optical spot 211 is largely displaced, and the light-receiving section 203 is almost not irradiated with light. Therefore, since a crosstalk component from an adjacent track and a signal from a self track cannot be separated, the crosstalk cancelling effect cannot be exhibited sufficiently. With the case of the photodetector including the four-divided light-receiving sections, a crosstalk component from an adjacent track and a signal of a self track can be separated due to the separation of the light-receiving section 203 and the light-receiving section 204 being separated, even in the case where the center of the optical spot 211 is largely displaced and the light-receiving section 204 is almost not irradiated with light. Therefore, the crosstalk cancelling effect can be exhibited.

Increasing the division number of the light-receiving sections increases the tolerance with respect to a photodetector not being appropriately irradiated with reproducing light, but decreases the SN ratio of the light-receiving section of the photodetector. Since the reproduction tolerance and the SN ratio depending on the division number are in a trade-off relationship, it is necessary to select the optimum division number and division configuration. Although an example of division into four has been shown herein, the light-receiving section may be divided into five or divided into six, or the division number may be increased, in order to increase the tolerance to a situation where a photodetector is not appropriately irradiated with reproducing light.

Figure 18:
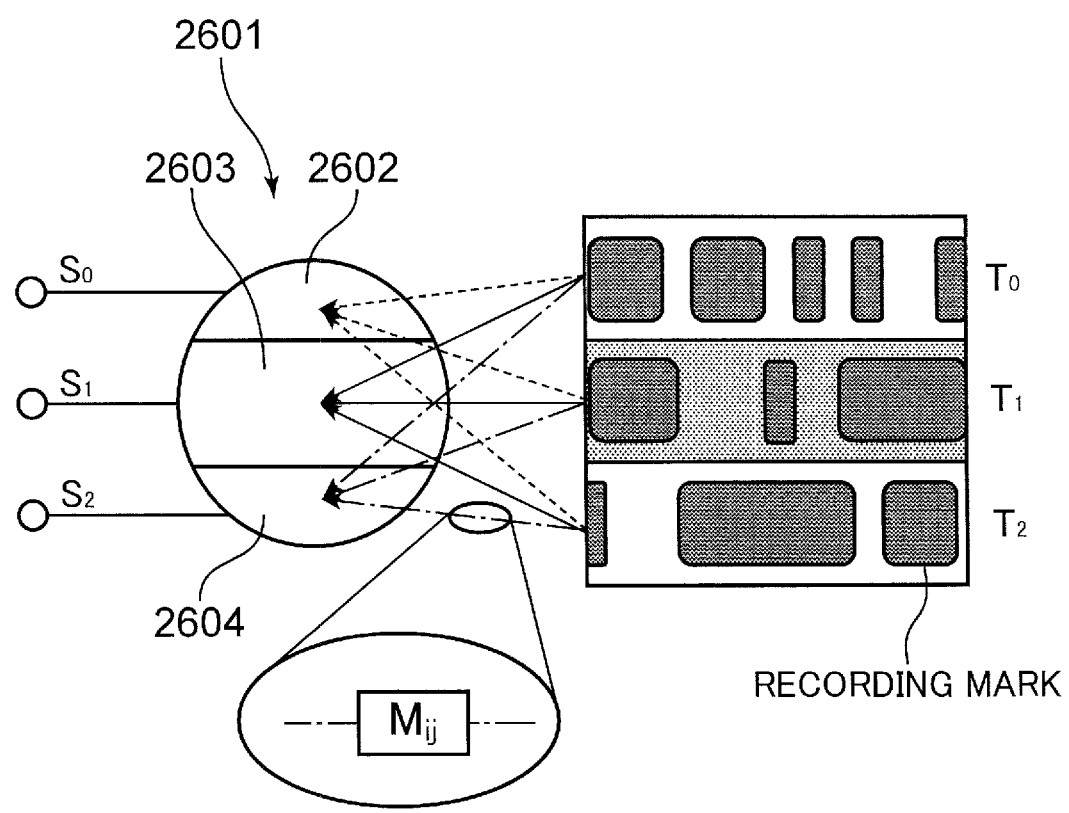
FIG. 18 is a diagram schematically showing three light-receiving sections of a photodetector that receives reflected light from a recording track and three tracks in the case where an optical head irradiates the recording track with laser light.

The principle of crosstalk cancel signal processing in the case of using a photodetector including three-divided light-receiving sections will be described. FIG. 18 is a diagram schematically showing three light-receiving sections 2602, 2603, and 2604 of a photodetector 2601 that receives reflected light from a recording track and three tracks $T_0$, $T_1$, and $T_2$, in the case where an optical head irradiates the recording track with laser light. The light-receiving sections 2602, 2603, and 2604 respectively output signals $S_0$, $S_1$, and $S_2$. The three signals $S_0$, $S_1$, and $S_2$ are influenced with different characteristics by the tracks $T_0$, $T_1$, and $T_2$.

Therefore, the signals $S_0$, $S_1$, and $S_2$ can be represented with Expression (1) of a matrix operation below. In Expression (1), $M_{ij}$ is the amount representing the influence from each track with respect to each signal, i represents the light-receiving section number, and j represents the track number. An error that cannot be expressed with a simple addition signal is represented by $\delta_0$, $\delta_1$, and $\delta_2$.

[Formula 1]

$$\begin{pmatrix} S_0 \\ S_1 \\ S_2 \end{pmatrix} = \begin{pmatrix} M_{00}, M_{01}, M_{02} \\ M_{10}, M_{11}, M_{12} \\ M_{20}, M_{21}, M_{22} \end{pmatrix} \begin{pmatrix} T_0 \\ T_1 \\ T_2 \end{pmatrix} + \begin{pmatrix} \delta_0 \\ \delta_1 \\ \delta_2 \end{pmatrix} \quad (1)$$

Figure 19:
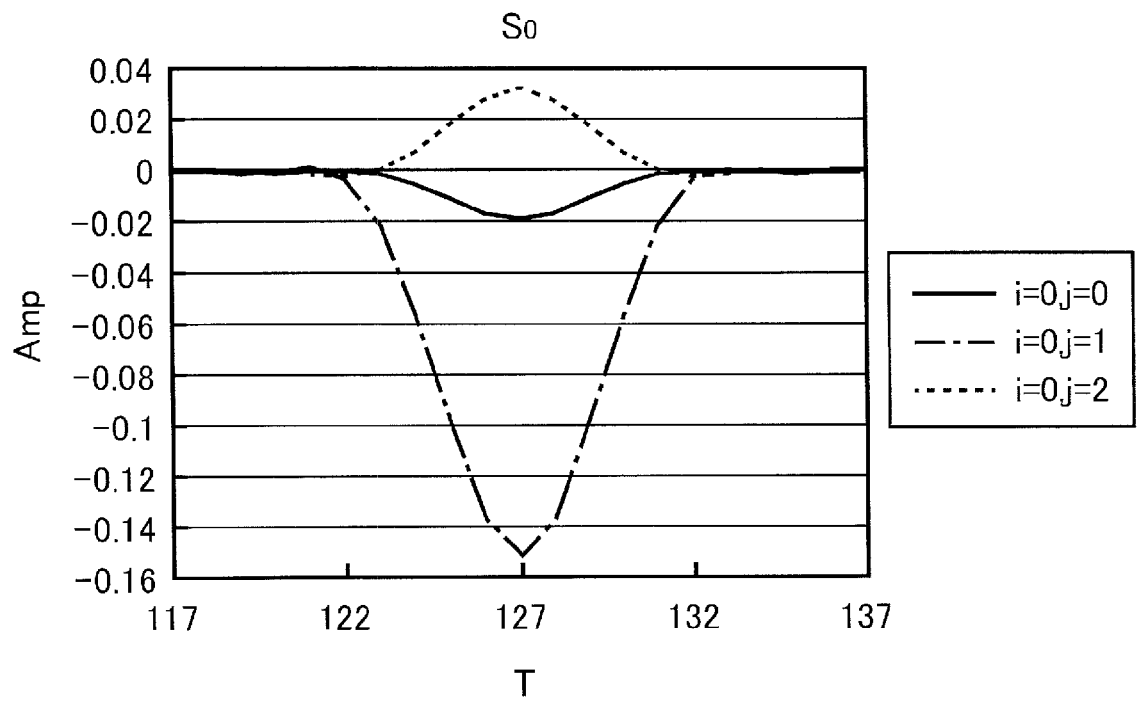
FIG. 19 is a diagram showing $M_{ij}$ characteristics of a signal $S_0$.
Figure 20:
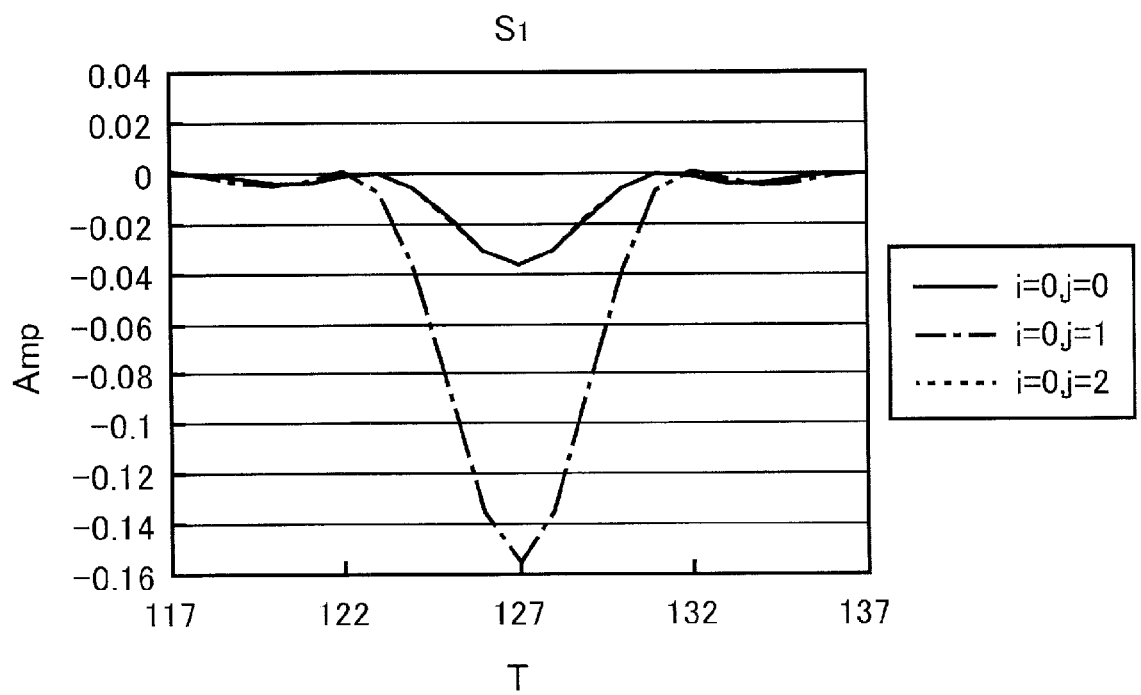
FIG. 20 is a diagram showing $M_{ij}$ characteristics of a signal $S_1$.
Figure 21:
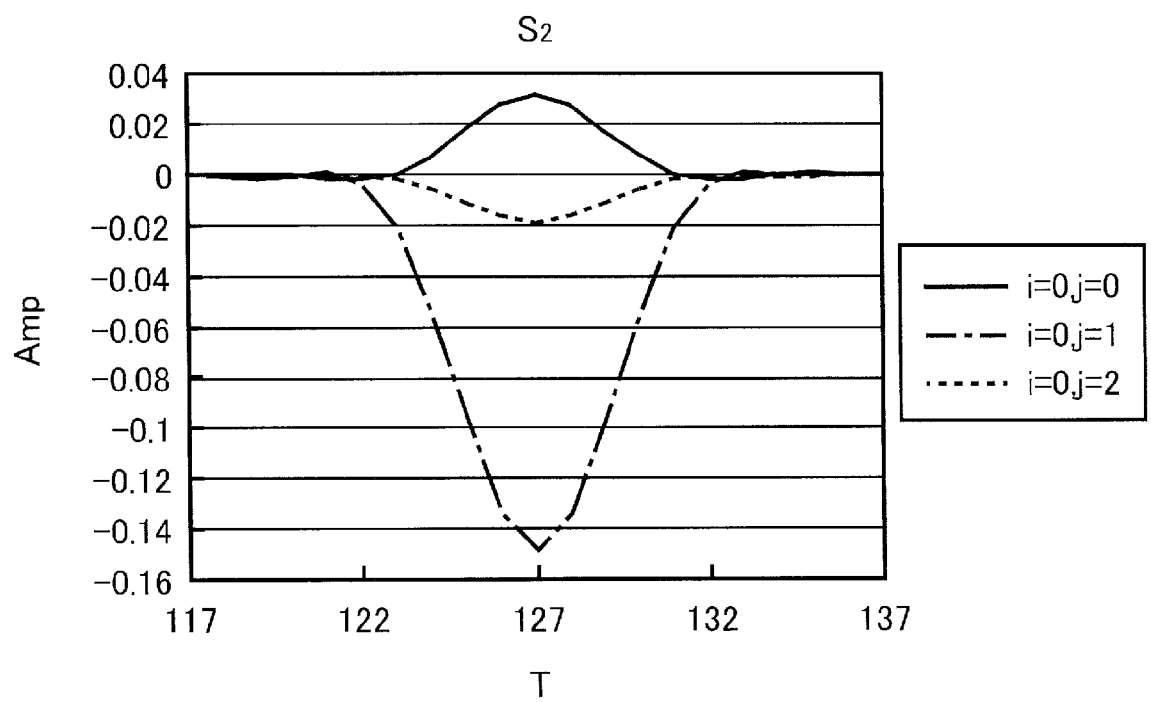
FIG. 21 is a diagram showing $M_{ij}$ characteristics of a signal $S_2$.

When $M_{ij}$ with which $\delta_0$, $\delta_1$, and $\delta_2$ become minimum such that an expression of inverse matrix operation of Expression (1) shown in Expression (2) below holds is obtained, the characteristics of the signals $S_0$, $S_1$, and $S_2$ are as shown in FIG. 19, FIG. 20, and FIG. 21. FIG. 19 is a diagram showing the $M_{ij}$ characteristics of the signal $S_0$, FIG. 20 is a diagram showing the $M_{ij}$ characteristics of the signal $S_1$, and FIG. 21 is a diagram showing the $M_1$ characteristics of the signal $S_2$. The $M_{ij}$ characteristics show the influence from the three tracks in the respective signals $S_0$, $S_1$, and $S_2$.

[Formula 2]

$$\begin{pmatrix} T_0 \\ T_1 \\ T_2 \end{pmatrix} = \begin{pmatrix} M'_{00}, M'_{01}, M'_{02} \\ M'_{10}, M'_{11}, M'_{12} \\ M'_{20}, M'_{21}, M'_{22} \end{pmatrix} \begin{pmatrix} S_0 \\ S_1 \\ S_2 \end{pmatrix} \quad (2)$$

Figure 22:
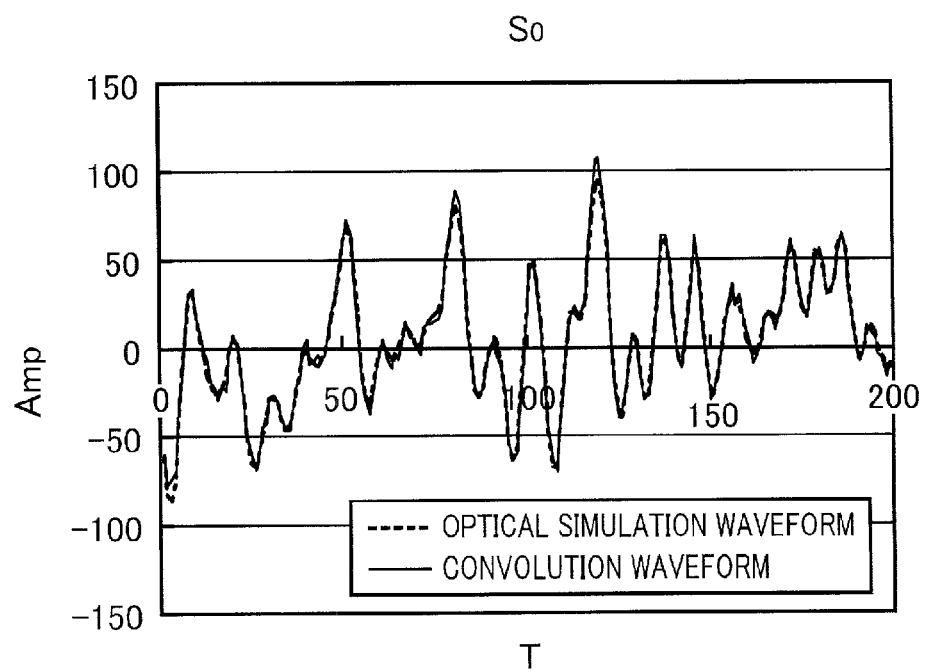
FIG. 22 is a diagram for comparison of the waveform resulting from a convolution operation of $M_{ij}$ characteristics and a track signal and the optical simulation waveform of the signal $S_0$.
Figure 23:
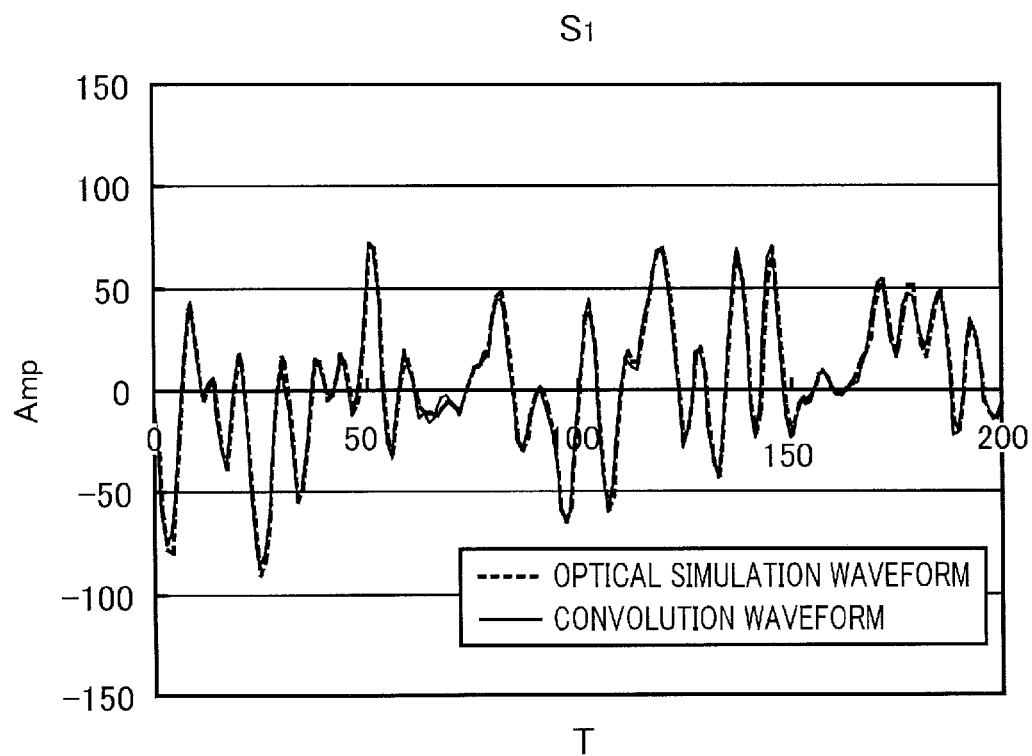
FIG. 23 is a diagram for comparison of the waveform resulting from a convolution operation of $M_{ij}$ characteristics and a track signal and the optical simulation waveform of the signal $S_1$.
Figure 24:
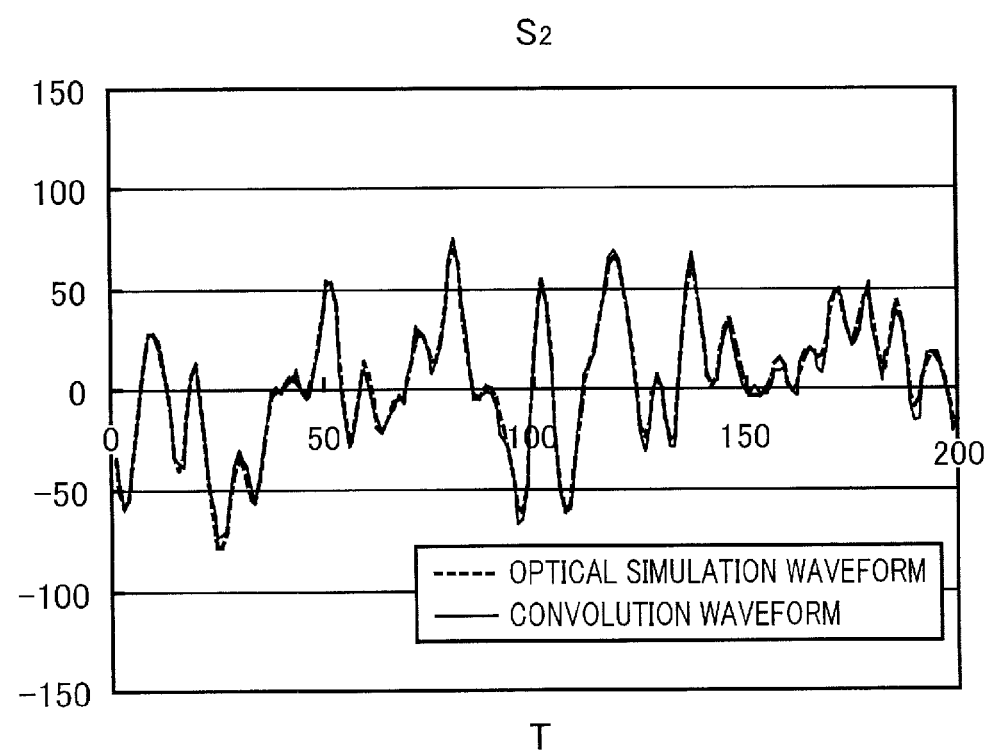
FIG. 24 is a diagram for comparison of the waveform resulting from a convolution operation of $M_{ij}$ characteristics and a track signal and the optical simulation waveform of the signal $S_2$.

The waveform resulting from a convolution operation of the $M_{ij}$ characteristics and a track signal and the optical simulation waveform of the signals $S_0$, $S_1$, and $S_2$ were compared, with $\delta_0$, $\delta_1$, and $\delta_2$ as 0 in Expression (1). FIG. 22 is a diagram for comparison of the waveform resulting from the convolution operation of the $M_{ij}$ characteristics and the track signal and the optical simulation waveform of the signal $S_0$. FIG. 23 is a diagram for comparison of the waveform resulting from the convolution operation of the $M_{ij}$ characteristics and the track signal and the optical simulation waveform of the signal $S_1$. FIG. 24 is a diagram for comparison of the waveform resulting from the convolution operation of the $M_{ij}$ characteristics and the track signal and the optical simulation waveform of the signal $S_2$.

In FIG. 22 to FIG. 24, the two waveforms approximately coincide. Therefore, the signals $S_0$, $S_1$, and $S_2$ can be expressed with a linear convolution operation. That is, while a signal from a self track and a signal from an adjacent track are mixed and output as a reproduction signal, the signal from an adjacent track can be removed by passing the signals $S_0$, $S_1$, and $S_2$ from the three light-receiving sections through a filter of predetermined characteristics.

For example, a case of equalization for predetermined PR characteristics is expressed with Expression (3) below, and $M'_{10}/PR$, $M'_{11}/PR$, and $M'_{12}/PR$ by which the signals $S_0$, $S_1$, and $S_2$ are multiplied mean a filter.

[Formula 3]

$$PR(T_1) = \frac{M'_{10}}{PR}S_0 + \frac{M'_{11}}{PR}S_1 + \frac{M'_{12}}{PR}S_2 \qquad (3)$$

As described above, the filter coefficient of predetermined PR characteristics and with which a crosstalk component from an adjacent track can be removed can be calculated with an adaptive filter using the LMS algorithm.

A model shown in FIG. 18 is a model limited to the influence from only three tracks, but a model may be in consideration of the influence of up to five tracks. The model shown in FIG. 18 is a model using a photodetector divided into three by dividing lines parallel to the track scanning direction. However, other division numbers and division configurations are acceptable. In this case, the influence on respective light-receiving sections can be removed or reduced by passing a reproduction signal through a predetermined filter, if the influence amount for the respective light-receiving sections can be expressed with a linear convolution operation.

(Embodiment 4)

Figure 25:
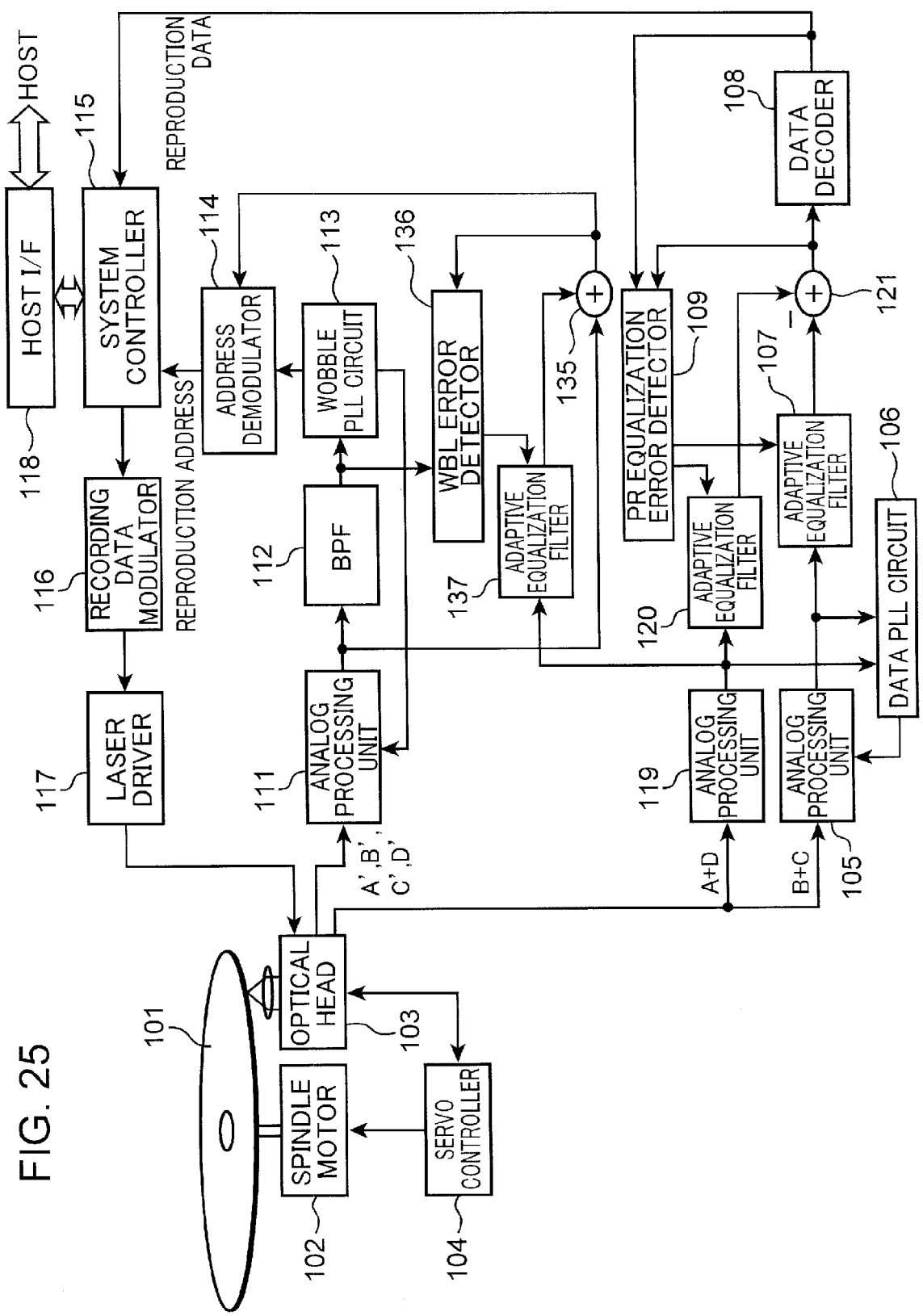
FIG. 25 is a diagram showing the configuration of an information recording and reproducing apparatus in Embodiment 4 of the present invention.

FIG. 25 is a diagram showing the configuration of an information recording and reproducing apparatus in Embodiment 4 of the present invention. First, the difference from Embodiments 1 to 3 in FIG. 1 will be described. A large difference is that, while crosstalk cancel processing in Embodiments 1 to 3 cancels crosstalk only with respect to a recorded data signal, crosstalk cancel processing in Embodiment 4 cancels crosstalk also with respect to address information need by causing a wobble in a track groove illustrated with FIG. 31. As one evaluation method for the reproduction performance of address information, there is an evaluation of CN ratio (ratio of carrier level and noise level of a signal).

Figure 26:
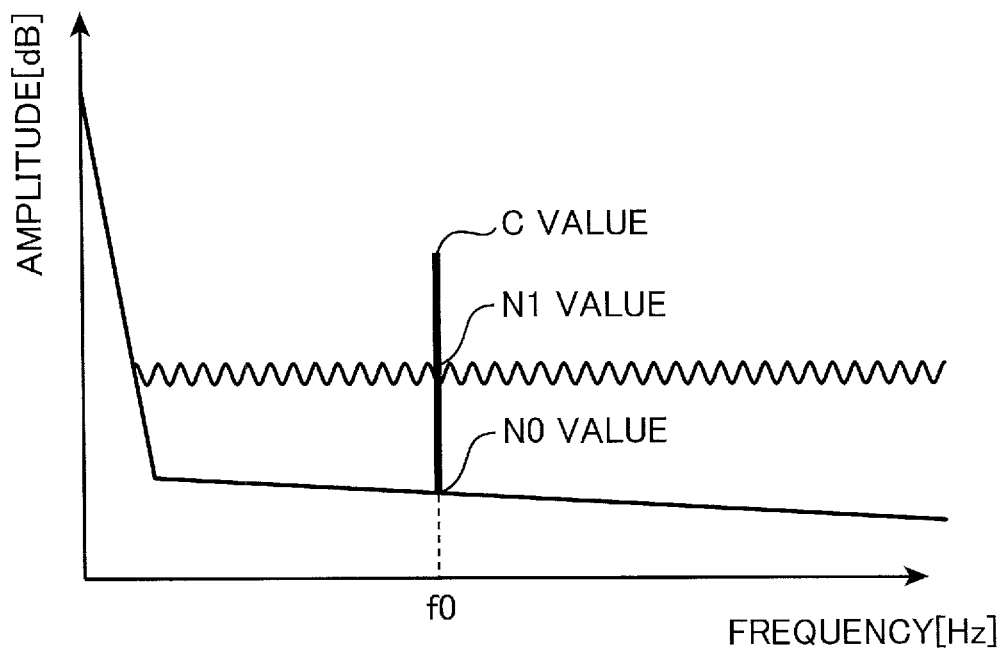
FIG. 26 is a diagram showing the frequency characteristics of a wobble signal in Embodiment 4 of the present invention.

FIG. 26 is a diagram showing the frequency characteristics of a wobble signal in Embodiment 4 of the present invention. FIG. 26 shows an example of measurement of the CN ratio. A frequency f0 is the reference frequency of a wobble signal, a C value is the amplitude level (carrier level) at the frequency f0, and an N0 value and an N1 value are the noise level at the frequency f0. Further, the N0 value is the noise level in the case where an adjacent track and a self track are unrecorded, and the N1 value is the noise level in the case where an adjacent track is recorded. A smaller difference of the C value and the N value means more deterioration in the reproduction performance of address information.

Figure 31:
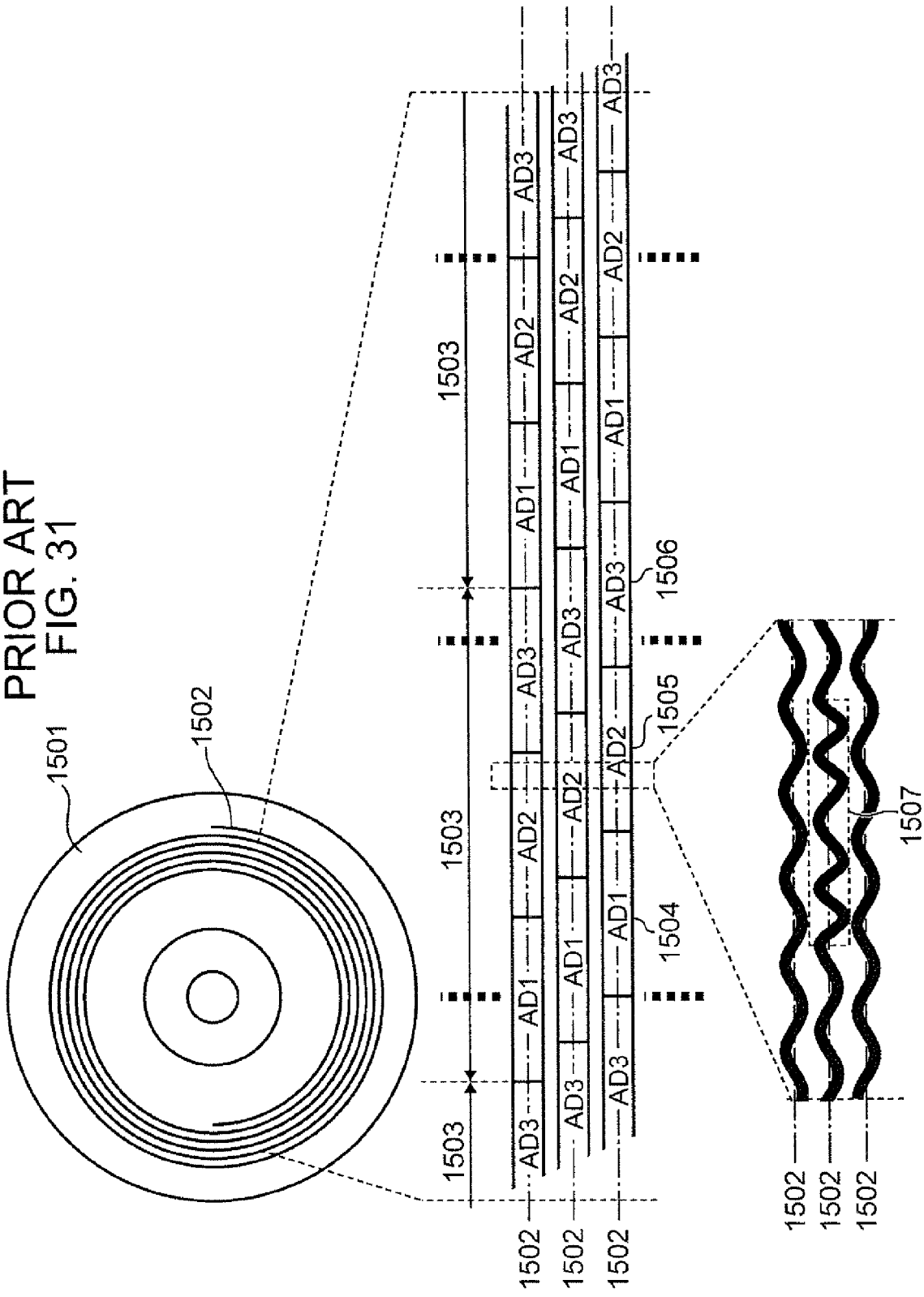
FIG. 31 is a diagram for illustrating the format of a different conventional optical disc.

As described with the example in FIG. 31, address information is inserted as MSK-modulated wobbling information for a track groove. In order to reproduce the modulated information, an MSK-modulated section is detected based on a wobble signal for reference (wobble signal that is not modulated). Therefore, when the quality of the wobble signal for reference deteriorates, the detection performance of the MSK-modulated section also deteriorates. Therefore, a decrease in the base noise (removal of a crosstalk component) illustrated with FIG. 26 is an extremely important point. As shown in FIG. 26, a track to which an adjacent track is recorded with data increases in noise level due to a crosstalk component. As the track width is made narrower, the noise level due to a crosstalk component from an adjacent track tends to increase. Thus, in Embodiment 4, a signal processing method that can remove a crosstalk component with respect to a wobble signal is provided. By applying signal processing of Embodiment 4, the noise level of the N1 value in FIG. 26 decreases to near the N0 value, and the reproduction performance of address information improves.

The information recording and reproducing apparatus shown in FIG. 25 includes the spindle motor 102, the optical head 103, the servo controller 104, the analog processing unit 105, the data PLL circuit 106, the adaptive equalization filter 107, the data decoder 108, the PR equalization error detector 109, the analog processing unit 111, the BPF 112, the wobble PLL circuit 113, the address demodulator 114, the system controller 115, the recording data modulator 116, the laser driver 117, the host I/F 118, the analog processing unit 119, the adaptive equalization filter 120, the adder 121, an adder 135, a WBL error detector 136, and an adaptive equalization filter 137.

The information recording and reproducing apparatus shown in FIG. 25 removes a crosstalk component that has leaked into a wobble signal using the A+D signal including a crosstalk component. The configuration of the adaptive equalization filter 137 is similar to the configuration of the adaptive equalization filter 107 shown in FIG. 4. Note that, in the adaptive equalization filter 137, an optimum tap number of the FIR filter 401 and optimum coefficient update response characteristics of the coefficient update unit 402 in FIG. 4 are selected. For the adaptive equalization filter 137, input X is a signal in which the A+D signal is processed in analog processing unit 119, and input Y is a signal from the WBL error detector 136. An error signal including a crosstalk component is input to the adaptive equalization filter 137 from the WBL error detector 136. For the tap coefficient of the adaptive equalization filter 137, operation and update are performed such that a crosstalk component is removed.

The adder 135 adds a wobble signal from the analog processing unit 111 and a signal from the adaptive equalization filter 137. The output of the adder 135 is a wobble signal in which a crosstalk component has been removed, and is input to the address demodulator 114. The WBL error detector 136 outputs the difference of the output of the adder 135 and an output signal of the BPF 112. The BPF 112 is a filter for PLL and therefore provided with filter characteristics for extracting only a wobble component. Although noise is reduced by the BPF 112, a crosstalk component in a filter pass band is still unable to be removed. By the BPF 112, a signal of MSK modulation or the like is also removed. An output signal of the BPF 112 cannot be used as a signal for address modulation, but being a signal in which a crosstalk component outside the filter pass band has been removed, can be used as a target value signal for a wobble signal.

With this Embodiment 4 of the present invention as described above, a signal component of a self track and a crosstalk component from an adjacent track are detected from four reproduction signals detected from one spot (one reproduction operation), and equalization for intended PR characteristics is possible while removing crosstalk having a predetermined frequency. Therefore, the error rate of an output signal of the data decoder 108 can be reduced.

Further, a crosstalk component included in a wobble signal can be removed using a data signal having a crosstalk component from an adjacent track, and the address error rate can also be improved.

The configuration of a photodetector of the optical head 103 in FIG. 25 may be a configuration as in FIG. 11. In this case, the optical head 103 outputs three signals of the A signal, the B+C signal, and the D signal. The information recording and reproducing apparatus removes a crosstalk component of a wobble signal using the A signal and the D signal. In this case, it suffices to add one circuit with the same configuration as the adaptive equalization filter 137. With this configuration, the address error rate can be reduced with respect to bias of a crosstalk component from two adjacent tracks that occurs due to a radial tilt, offtrack, or the like in particular.

(Embodiment 5)

Figure 27:
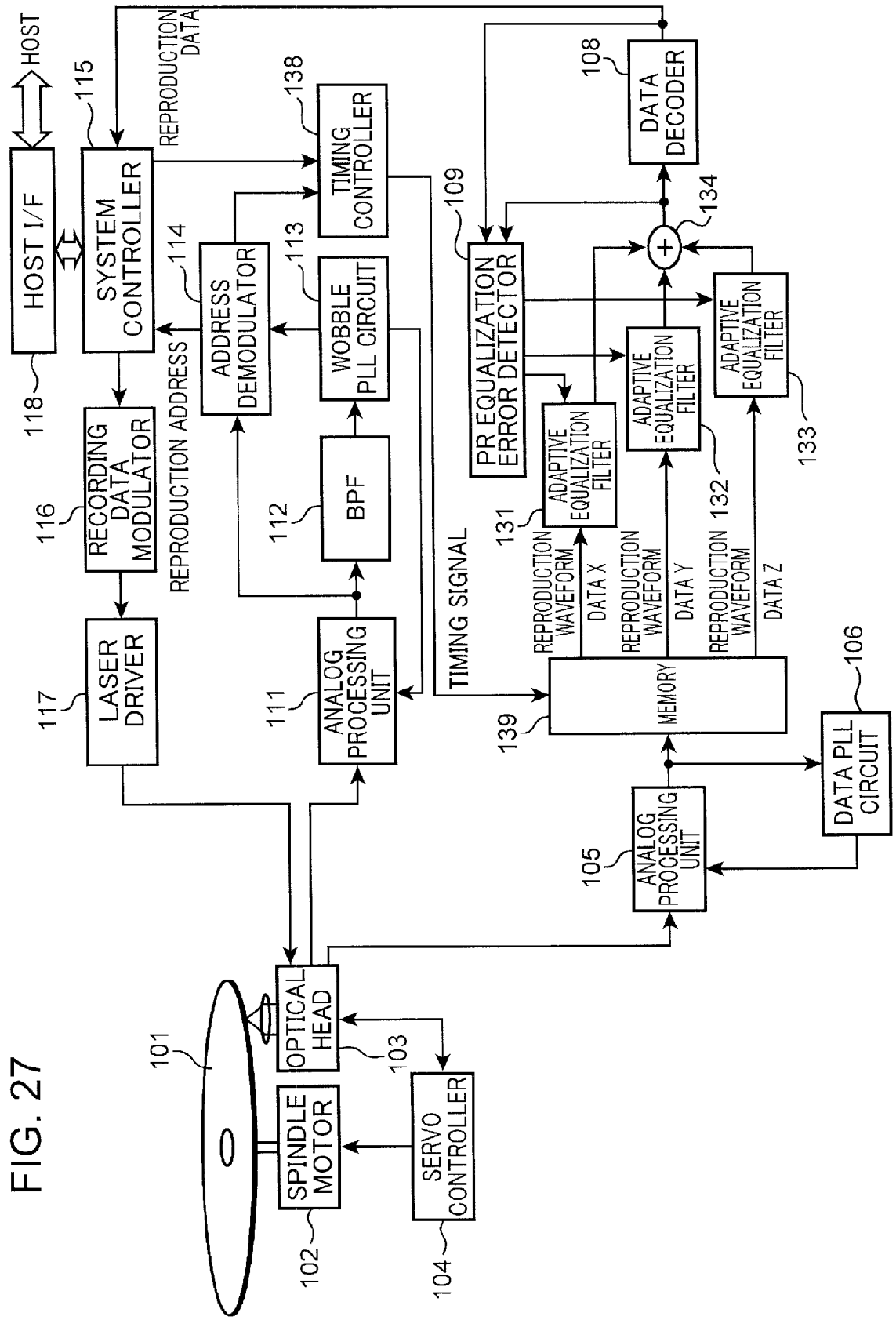
FIG. 27 is a diagram showing the configuration of an information recording and reproducing apparatus in Embodiment 5 of the present invention.
Figure 28:
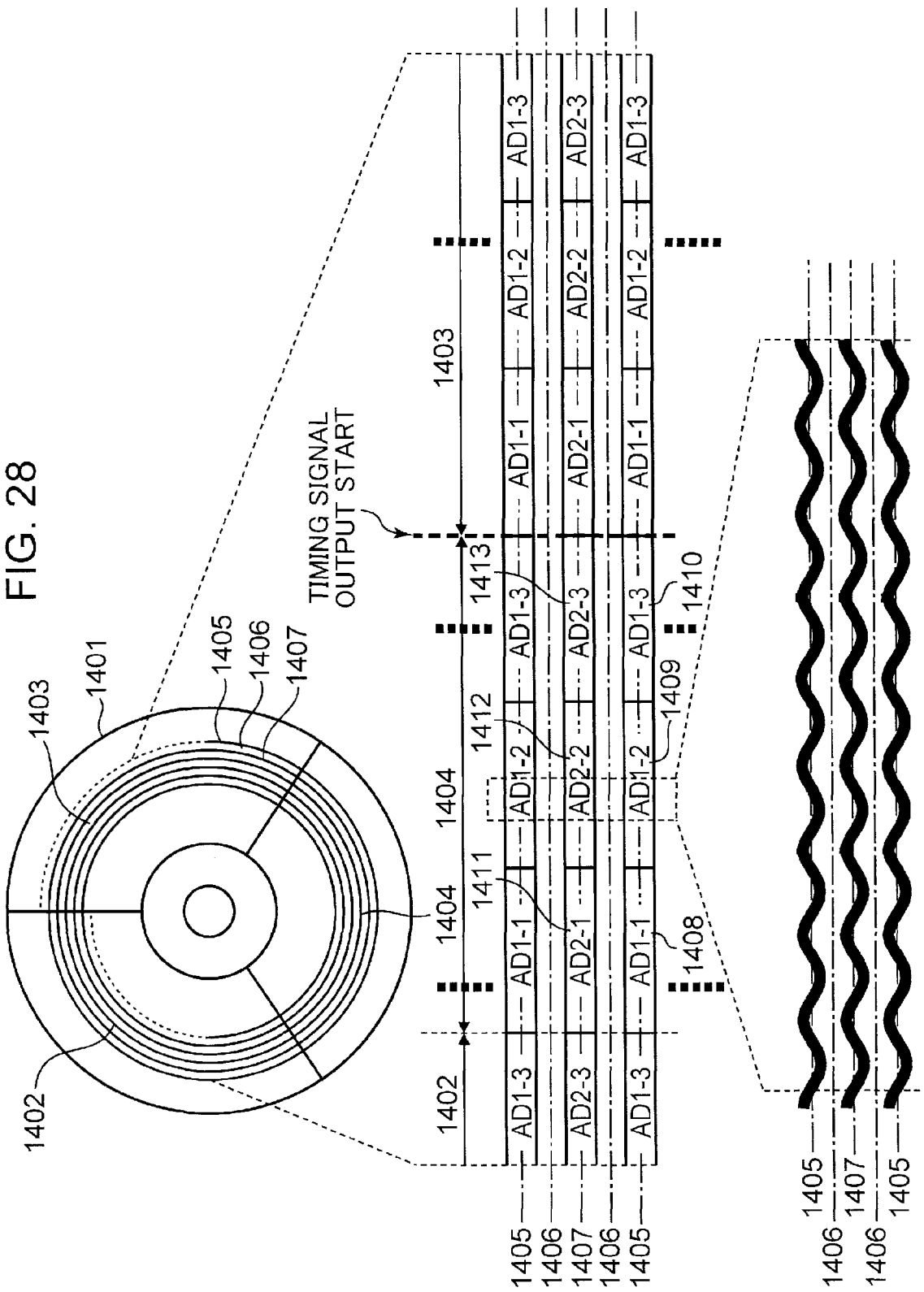
FIG. 28 is a diagram showing the configuration of an information recording medium in Embodiment 5 of the present invention.

FIG. 27 is a diagram showing the configuration of an information recording and reproducing apparatus in Embodiment 5 of the present invention, and FIG. 28 is a diagram showing the configuration of an information recording medium in Embodiment 5 of the present invention. First, a problem with a conventional technique will be described. In the section described above, four problems of Patent Literature 6 have been described. Even with a system in which Problem 1 to Problem 3 are hypothetically tolerated, a timing at which reproduction data of an adjacent track and reproduction data of a self track are input to a memory poses a problem. In Patent Literature 6, a reproduction signal of an adjacent track is held in a memory at a predetermined timing for synchronization with a crosstalk component of the adjacent track. In order to tolerate to some degree the difference in timing of the reproduction signal of the adjacent track held in the memory, the tap coefficient of an adaptive equalizer is increased as a measure in Patent Literature 6. In Patent Literature 6, an equalizer with 256 taps is shown in order to tolerate a timing difference of several tens of clocks. With the configuration of Patent Literature 6, two equalizers having at least multi-stage tap coefficients are necessary to correspond to tracks adjacent on both sides. Therefore, there is a problem of an increase in circuit scale and complication of a circuit.

In Patent Literature 6, the difference in timing at which a reproduction signal of an adjacent track is held in a memory is tolerated to some degree because of the address format or the like. Using FIG. 31, the relationship of an address and recording data for Blu-ray will be described. In the case where address information and recording data are superimposed and recorded in the same region, the adjacent address information and recording data reference position are displaced from a straight line extending in the radial direction with the center of an optical disc as the reference. Therefore, it is difficult to obtain the timing at which a reproduction signal of an adjacent track is held in a memory with high precision. The reason will be described.

In FIG. 31, the recording track 1502 is formed by a groove on the optical disc 1501. In the data recording region 1503, data is recorded. In the address information regions 1504, 1505, and 1506, address information for accessing the data recording region 1503 is recorded. The address information is arranged in the same region as recording data. The recording data is superimposed and recorded on the address information. One piece of recording data is recorded in a region configured of the three pieces of address information AD1 (Z05), AD2 (Z06), and AD3 (Z07), and a region configured of the three pieces of address information is the data recording region 1503 that is a recording unit for data. An integral multiple of the length of the data recording region 1503 configured of the three pieces of address information does not match the length of the circumference of a track. Therefore, as shown in FIG. 31, the positions of the data recording region 1503 on the circumference are arranged with a displacement between adjacent recording tracks for every circumference of the optical disc.

In the recording track 1502, one bit of the address information AD1, AD2, or AD3 is recorded by partially changing the waveform of a groove with a wobble of certain cycles. The region 1507 shown in enlargement in the lower section of FIG. 31 is a portion corresponding to an address bit that is subjected to modulation called MSK. Since an integral multiple of the wobble cycle and the length of one circumference of a recording track do not match as shown in the lower section of FIG. 31, the phases of a wobble are displaced by a certain amount between adjacent recording tracks.

Since recording data of an adjacent recording track and recording data of a self recording track are displaced with each other when the recording data of the adjacent recording track is held in a memory with the address information AD1, AD2, and AD3 as the reference for an optical disc configured in this manner, processing and a processing circuit for adjusting the timing of holding the recording data in the memory has been necessary. Even if processing for adjusting the timing is carried out, an equalizer that has multi-stage tap coefficients has been necessary in order to ensure a favorable channel clock precision due to displacement by several tens of channel clocks.

In Embodiment 5 of the present invention, the timing precision for holding reproduction data of an adjacent track in a memory can be improved to several tens of channel clocks or less with respect to the radial direction to prevent an increase in circuit scale. Therefore, in Embodiment 5 of the present invention, an address format for causing an integral multiple of the wobble cycle forming the address information and the length of one circumference of a recording track to match and optimum crosstalk cancel signal processing utilizing the address format can be realized.

In the optical disc of this Embodiment 5, address information is recorded with a constant angular velocity (CAV) method, and recording data is recorded with a constant linear velocity (CLV) method.

The information recording and reproducing apparatus shown in FIG. 27 includes the spindle motor 102, the optical head 103, the servo controller 104, the analog processing unit 105, the data PLL circuit 106, the data decoder 108, the PR equalization error detector 109, the analog processing unit 111, the BPF 112, the wobble PLL circuit 113, the address demodulator 114, the system controller 115, the recording data modulator 116, the laser driver 117, the host I/F 118, the adaptive equalization filter 131, the adaptive equalization filter 132, the adaptive equalization filter 133, the adder 134, a timing controller 138, and a memory 139.

A photodetector of the optical head 103 shown in FIG. 27 has a configuration similar to the photodetector shown in FIG. 34. The photodetector outputs an A+B+C+D signal as a reproduction signal. The analog processing unit 105 converts a reproduction signal to a digital signal in synchronization with a clock from the data PLL circuit 106 and stores the reproduction signal converted to the digital signal in the memory 139. In this Embodiment 5, reproduction waveform data of an adjacent track is necessary in order to exhibit the effect of crosstalk cancelling. Therefore, reproduction waveform data Y of a region to be reproduced, reproduction waveform data X of a track adjacent on the inner circumference side in the radial direction to the region to be reproduced, and reproduction waveform data Z of a track adjacent on the outer circumference side in the radial direction to the region to be reproduced are stored in the memory 139. A timing signal stored in the memory 139 is supplied from the timing controller 138. A timing signal output from the timing controller 138 is generated using address information demodulated by the address demodulator 114.

The address demodulator 114 demodulates address information of the optical disc 101. The timing controller 138 generates a timing signal of which the phase is matched in the radial direction, based on address information demodulated by the address demodulator 114. Based on a timing signal, the memory 139 holds the reproduction waveform of data recorded in a first recording track for which reproduction of data is intended, the reproduction waveform of data recorded in a second recording track adjacent in one radial direction of the optical disc 101 with respect to the first recording track, and the reproduction waveform of data recorded in a third recording track adjacent in the other radial direction of the optical disc 101 with respect to the first recording track.

The adaptive equalization filter 132 performs waveform equalization of the reproduction waveform from the first recording track held in the memory 139. The adaptive equalization filter 131 performs waveform equalization of the reproduction waveform from the second recording track held in the memory 139. The adaptive equalization filter 133 performs waveform equalization of the reproduction waveform from the third recording track held in the memory 139.

The data decoder 108 performs binarization processing of the addition result of the output waveform from the adaptive equalization filter 132, the output waveform from the adaptive equalization filter 131, and the output waveform from the adaptive equalization filter 133. The PR equalization error detector 109 calculates an error between the equalization target waveform calculated based on the result of binarization processing by the data decoder 108 and the addition result.

The coefficient update unit 402 of the adaptive equalization filter 132 performs operation of the coefficient used in the adaptive equalization filter 132 based on the error calculated by the PR equalization error detector 109. The coefficient update unit 402 of the adaptive equalization filter 131 performs operation of the coefficient used in the adaptive equalization filter 131 based on the error calculated by the PR equalization error detector 109. The coefficient update unit 402 of the adaptive equalization filter 133 performs operation of the coefficient used in the adaptive equalization filter 133 based on the error calculated by the PR equalization error detector 109.

In the address format in this Embodiment 5, the boundaries of address blocks storing address information are aligned in the radial direction. The address information is reproduced, the boundary of the address block is detected, and a timing signal for storing reproduction waveform data in the memory 139 is generated from a detection signal for the boundary of the address block. Accordingly, it is possible to align the position of reproduction waveform data of a self track and the position of reproduction waveform data of an adjacent track with high precision. That is, since the reproduction waveform data adjacent to the reproduction waveform data of the self track can be stored in the memory 139, the scale of a circuit that corrects the position can be made small.

For example, it suffices to design the tap number of the adaptive equalization filters 131, 132, and 133 in FIG. 27 in consideration of the intersymbol interference amount of reproduction waveform data. The intersymbol interference amount is determined by the relationship of a beam spot and the track recording density. For example, in the case where there is an interference of approximately ten channel bits, the tap number of the adaptive equalization filters 131, 132, and 133 is designed to be approximately ten taps in consideration of other interferences such as a tilt or aberration. Note that, in this case, the interval of tap numbers is the interval of channel bits.

In this Embodiment 5, the information recording and reproducing apparatus corresponds to one example of the information reproducing apparatus, the address demodulator 114 corresponds to one example of the address demodulator, the timing controller 138 corresponds to one example of a timing controller, the memory 139 corresponds to one example of a memory, the adaptive equalization filter 132 corresponds to one example of the first adaptive equalization filter, the adaptive equalization filter 131 or the adaptive equalization filter 133 corresponds to one example of the second adaptive equalization filter, the data decoder 108 corresponds to one example of the data decoder, the PR equalization error detector 109 corresponds to one example of the error detector, and the coefficient update unit 402 corresponds to one example of the first coefficient arithmetic unit and the second coefficient arithmetic unit.

Next, the format of the information recording medium in Embodiment 5 of the present invention will be described using FIG. 28. FIG. 28 is a diagram for illustrating the format of an optical disc in Embodiment 5 of the present invention. In FIG. 28, an optical disc 1401 has a recording layer on both surfaces. In FIG. 28, only one surface of the optical disc 1401 is shown, and the other surface has a similar structure. Groove tracks 1405 and 1407 are recording tracks formed by a groove on the optical disc 1401. A land track 1406 is a recording track formed by a land on the optical disc 1401. Address blocks 1402, 1403, and 1404 are formed through division of the groove tracks 1405 and 1407 and the land track 1406 by a straight line extending in a radial manner from the center of the optical disc 1401.

The groove track 1405 and the groove track 1407 are repeated alternately in the radial direction with the land track 1406 therebetween. The groove tracks 1405 and 1407 and the land track 1406 form a recording track. The address blocks 1402, 1403, and 1404 that have been divided into three parts in a radial manner each have three independent pieces of address information 1408, 1409, and 1410 or 1411, 1412, and 1413. The address information 1408, 1409, 1410, 1411, 1412, and 1413 are recorded by causing a wobble in the groove tracks 1405 and 1407. The three pieces of address information 1408, 1409, and 1410 are one set, and the address value for the three pieces of address information 1408, 1409, and 1410 increases sequentially. The three pieces of address information 1411, 1412, and 1413 are one set, and the address value for the three pieces of address information 1411, 1412, and 1413 increases sequentially.

The optical disc 1401 includes the groove tracks 1405 and 1407 and the land track 1406 formed between the two adjacent groove tracks 1405 and 1407. The groove tracks 1405 and 1407 record address information showing position information within the recording surface of the optical disc 1401 with a predetermined pattern of wobble of the groove. The groove tracks 1405 and 1407 may be configured of one groove formed in a spiral manner on a recording surface. The groove tracks 1405 and 1407 may be configured of a plurality of grooves formed concentrically on a recording surface.

In the lower section of FIG. 28, a partially enlarged schematic view of the track is shown. As shown in the lower section of FIG. 28, a feature of the optical disc 1401 in this Embodiment 5 is that the phases of wobbles are aligned between adjacent grooves. That is, the configuration is such that the length of one circumference of a groove track is an integral multiple of the cycle of wobble. Accordingly, the width of the land track 1406 sandwiched between the groove tracks 1405 and 1407 does not change, and a constant width can be maintained.

An integral multiple of the cycle of wobble in a portion other than the address information in the recording track (groove tracks 1405 and 1407) matches the length of one circumference of the recording track. An integral multiple of the cycle of address information matches the length of one circumference of the recording track.

Since the length of one circumference of a recording track does not match an integral multiple of the cycle of wobble in the conventional optical disc such as a Blu-ray disc shown in FIG. 31, the phase of a wobble of an adjacent tracks is gradually displaced for every recording track. Therefore, although the width of a groove track can be maintained constant, the width of a land track changes frequently, and the shape of the land track is made inappropriate as a recording track.

Further, in the conventional optical disc shown in FIG. 31, the wobble phase of an adjacent groove changes for every recording track. Therefore, a beat occurs in a wobble signal, causing deterioration in the reproduction performance for an address or the generation performance for a recording clock generated by a PLL circuit based on a wobble. Upon use of land as a recording track, this phenomenon is more significant. Since the wall surface of a land is configured of two adjacent grooves with a wobble, the phase of the land changes completely asynchronously, such that even detection of a wobble signal is not possible and a recording clock cannot be generated. Therefore, data cannot be recorded in land.

The structure of an optical disc that is the first point in this Embodiment 5 with respect to these conventional problems will be described below. The optical disc in Embodiment 5 enables the beat phenomenon due to a wobble of land to be resolved by a configuration in which the cycles of wobble of adjacent grooves are aligned throughout the surface of the optical disc. Accordingly, a stable wobble signal is detectable even with land.

Further, in the optical disc of this Embodiment 5, address information is recorded by modulating a wobble of a groove using an address bit pattern that differs for the groove track 1405 and the groove track 1407 on both sides of the land track 1406. Accordingly, it is possible to acquire the address information even with the land track 1406 sandwiched between the groove track 1405 and the groove track 1407. The arrangement structure of address data that enables acquisition of address information with land will be described below in detail.

Figure 29:
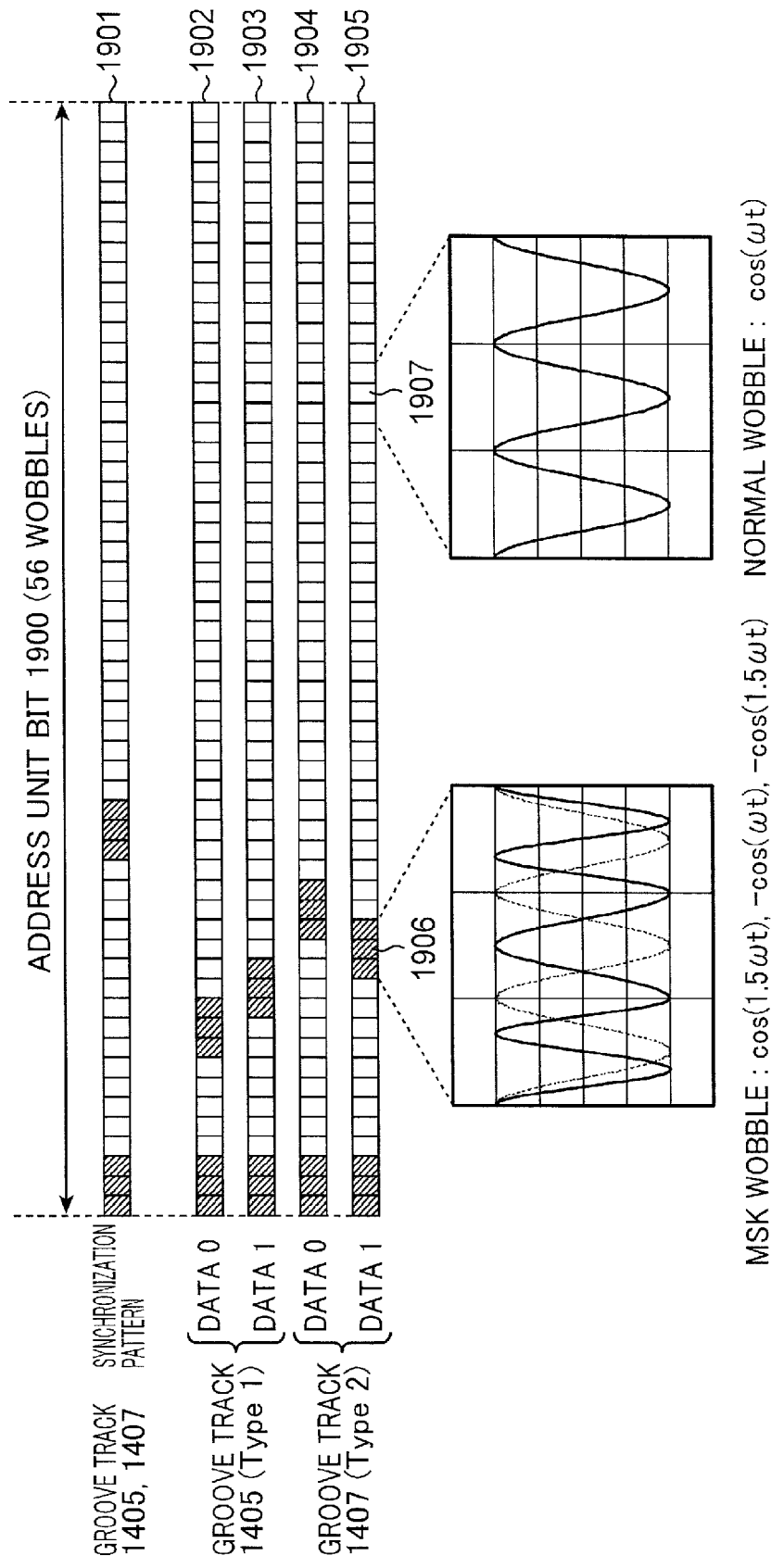
FIG. 29 is a schematic diagram for illustrating the data arrangement structure of address information in Embodiment 5 of the present invention.

FIG. 29 is a schematic diagram for illustrating the data arrangement structure of address information in this Embodiment 5. In order to record address information, it is necessary to record data corresponding to one bit of address information in advance on an optical disc as a change in wobble. The optical disc of this Embodiment 5 is configured of the two types of groove track 1405 and groove track 1407 that are switched alternately for every circumference, and a large feature is that the pattern of data recording address information differs for the groove track 1405 and the groove track 1407.

As shown in FIG. 29, one bit of address data is configured of an address unit bit 1900 configured of 56 wobbles. In FIG. 29, address data 1902 and 1903 are each address data in a recording format (Type 1) of 1/0 in the groove track 1405, and address data 1904 and 1905 are each address data in a recording format (Type 2) of 1/0 in the groove track 1407. Within the address unit bit 1900, a special wobble called an MSK wobble 1906 (shaded section in FIG. 29) in which the shape of a wobble has been changed exists in two parts. Aside from the MSK wobble 1906 having a special wobble pattern, a normal wobble 1907 having a normal wobble pattern is formed. By changing the appearing position of the MSK wobble 1906 having the special wobble pattern, a plurality of types of 1/0 data can be expressed.

A wobble signal of the MSK wobble 1906 is represented as $\cos(1.5\omega t)$, $-\cos(\omega t)$, and $-\cos(1.5\omega t)$. A wobble signal of the normal wobble 1907 is represented as $\cos(\omega t)$.

In this Embodiment 5, as shown in FIG. 29, a synchronization pattern 1901 used commonly for the groove track 1405 and the groove track 1407 and address data 1902, 1903, 1904, and 1905 with a pattern of 0/1 corresponding to the respective groove tracks 1405 and 1407 are used. The pattern of the address data 1902, 1903, 1904, and 1905 differs in the position of the MSK wobble 1906 for every pattern. Therefore, demodulation of the address data 1902, 1903, 1904, and 1905 is possible without interference with each other. Thus, by the patterns of the address data 1902, 1903, 1904, and 1905 of a groove adjacent to a land being configured as patterns that do not interfere with each other, it is possible to demodulate address data even when the land is traced. This is made achievable by the track scanning directions being different for the patterns of the address data 1902, 1903, 1904, and 1905.

Within the address information, different data and identical data exist in the adjacent groove track 1405 and groove track 1407. For example, the synchronization pattern 1901 that is information for identifying the start position of an address is information that is the same between adjacent groove tracks, and a common pattern can be used since a common interference does not occur.

Figure 30:
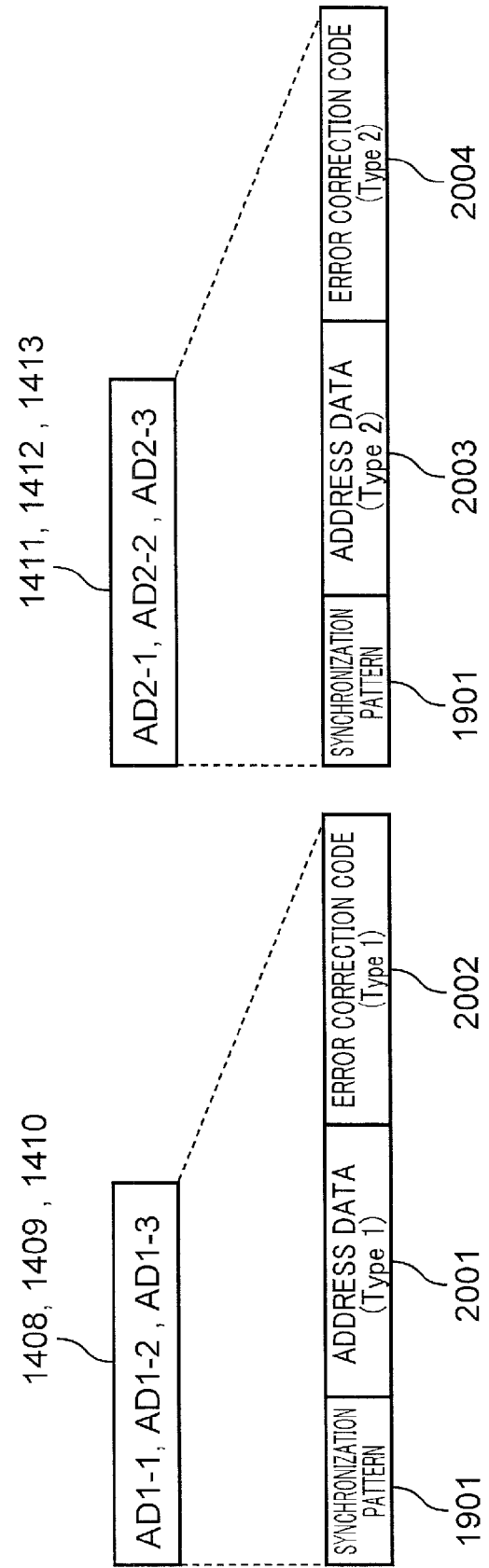
FIG. 30 is a diagram showing the structure of address information configured of a plurality of address unit bits in Embodiment 5 of the present invention.

FIG. 30 is a diagram showing the structure of the address information 1408, 1409, 1410, 1411, 1412, and 1413 configured of a plurality of address unit bits 1900 in this Embodiment 5.

In FIG. 30, the synchronization pattern 1901 is data common to the adjacent groove track 1405 and groove track 1407 and therefore uses a common pattern. Although one synchronization pattern 1901 is used in this Embodiment 5, the reliability of synchronization can be increased by using a plurality of the synchronization patterns 1901. Although there is one type of synchronization pattern in this Embodiment 5, it is possible to use in combination a pattern in which the position of the MSK wobble 1906 differs as the synchronization pattern. Since the synchronization pattern is common between the adjacent groove track 1405 and groove track 1407 at this time as well, it is not necessary to prepare separate synchronization patterns for each of the groove track 1405 and the groove track 1407. By a common wobble pattern being used with respect to data that is common between adjacent groove tracks in this manner, the number of necessary wobble patterns can be reduced.

In FIG. 30, address data 2001 is address data used in the groove track 1405, an error correction code 2002 is an error correction code added for correction of an error in the address data 2001, and the recording format of Type 1 is used for both.

In FIG. 30, address data 2003 is address data used in the groove track 1407, an error correction code 2004 is an error correction code added for correction of an error in the address data 2003, and the recording format of Type 2 is used for both.

Next, using FIG. 28, an operation example of crosstalk cancel signal processing in the information recording and reproducing apparatus in FIG. 27 will be described. Data is recorded in the optical disc 1401, and data recorded in the address block 1403 of the land track 1406 is reproduced.

First, a reproduction request including the reproduction length of a designated address that designates the position for reproduction is input to the system controller 115 from a host via the host I/F 118. Based on reproduction address information from the address demodulator 114, the system controller 115 controls the spindle motor 102, the optical head 103, and the servo controller 104 to move the spot of the optical head 103 to the groove track 1405 and start reproduction of an address.

Based on a timing signal generation indication from the system controller 115 and the address blocks 1402 and 1404 that are address information reproduced in the address demodulator 114, the timing controller 138 generates a timing signal and outputs the generated timing signal to the memory 139. For the timing signal in this case, as shown in FIG. 28, output is started at the boundary section for the address block 1404 and the address block 1403, such that output is only by the reproduction length indicated from the host. The memory 139 holds reproduction data recorded in the address block 1403 of the groove track 1405.

Next, based on reproduction address information from the address demodulator 114, the system controller 115 controls the spindle motor 102, the optical head 103, and the servo controller 104 to move the spot of the optical head 103 to the land track 1406 and start reproduction of an address. Based on a timing signal generation indication from the system controller 115 and the address blocks 1402 and 1404 that are address information reproduced in the address demodulator 114, the timing controller 138 generates a timing signal and outputs the generated timing signal to the memory 139. For the timing signal in this case, as shown in FIG. 28, output is started at the boundary section for the address block 1404 and the address block 1403, such that output is only by the reproduction length indicated from the host. The memory 139 holds reproduction data recorded in the address block 1403 of the land track 1406.

Next, based on reproduction address information from the address demodulator 114, the system controller 115 controls the spindle motor 102, the optical head 103, and the servo controller 104 to move the spot of the optical head 103 to the groove track 1407 and start reproduction of an address. Based on a timing signal generation indication from the system controller 115 and the address blocks 1402 and 1404 that are address information reproduced in the address demodulator 114, the timing controller 138 generates a timing signal and outputs the generated timing signal to the memory 139. For the timing signal in this case, as shown in FIG. 28, output is started at the boundary section for the address block 1404 and the address block 1403, such that output is only by the reproduction length indicated from the host. The memory 139 holds reproduction data recorded in the address block 1403 of the groove track 1407.

With the procedure described above, the memory 139 stores reproduction waveform data recorded in the address block 1403 of the groove track 1405, reproduction waveform data recorded in the address block 1403 of the land track 1406, and reproduction waveform data recorded in the address block 1403 of the groove track 1407 of which the phases are aligned in the radial direction. When the reproduction waveform data of the three recording tracks are held in the memory 139, a crosstalk component can be removed with the processing described in Embodiment 2 above, and the error rate of data demodulated in the data decoder 108 can be reduced.

The procedure of storing reproduction waveform data in the memory 139 is not limited to the above. Reproduction waveform data of three recording tracks may not be stored in the memory 139. Reproduction waveform data of two recording tracks may be stored in the memory 139 to execute the crosstalk cancel signal processing. In the case where two pieces of reproduction waveform data are used, the effect that a crosstalk component can be removed is reduced than when three pieces of reproduction waveform data are used, but a crosstalk component of a recording track adjacent to one can be removed.

In this manner, address information showing position information within the recording surface of an optical disc is recorded with a predetermined pattern of wobble in a recording track, an integral multiple of the cycle of wobble in a portion other than address information of a recording track matches the length of one circumference of a recording track, and an integral multiple of the cycle of address information matches the length of one circumference of a recording track. Address is arranged with a format configuration for an optical disc as described above, a timing controller that detects the boundary section for an address is provided, and a timing signal of a timing controller is used to store reproduction waveform data of recording data of three recording tracks in a memory. Accordingly, since reproduction waveform data can be stored in a state where phases are aligned in the radial direction, a large correction in the phase is not necessary. As a result, a phase correction circuit that corrects the phase by several tens of channel bits is unnecessary, and a signal processing circuit that removes a crosstalk component can be configured with a small scale.

The specific embodiments described above mainly include the invention having a configuration below.

An information reproducing apparatus according to one aspect of the present invention is an information reproducing apparatus in which one optical laser spot is formed on one recording track with respect to an information recording medium recording data on a plurality of adjacent recording tracks and the data is reproduced based on reflected light from the optical laser spot, including a photodetector divided by a dividing line parallel to a recording track scanning direction into a first light-receiving section that receives reflected light of a center section of the recording track and a second light-receiving section that receives reflected light of a portion adjacent, in a radial direction of the information recording medium, with respect to the center section, a first adaptive equalization filter that performs waveform equalization of an output signal from the first light-receiving section, a second adaptive equalization filter that performs waveform equalization of an output signal from the second light-receiving section, and a data decoder that decodes reproduction data based on an output waveform from the first adaptive equalization filter and an output waveform from the second adaptive equalization filter.

In this configuration, the photodetector is divided by a dividing line parallel to the track scanning direction into the first light-receiving section that receives reflected light of the center section of the recording track and the second light-receiving section that receives reflected light of the portion adjacent in the radial direction of the information recording medium with respect to the center section. The first adaptive equalization filter performs waveform equalization of the output signal from the first light-receiving section. The second adaptive equalization filter performs waveform equalization of the output signal from the second light-receiving section. The data decoder decodes reproduction data based on the output waveform from the first adaptive equalization filter and the output waveform from the second adaptive equalization filter.

Thus, a signal component of a self track that is scanned by the center of the optical laser spot and a crosstalk component from a track adjacent to the self track are detected from one optical laser spot, and equalization for intended PR characteristics is possible while removing a crosstalk component having a predetermined frequency without mounting a large-scale circuit. Therefore, the error rate of reproduction data can be reduced, and the reproduction performance can be improved.

In the information reproducing apparatus described above, it is preferable that the data decoder perform binarization processing of an addition result of an output waveform from the first adaptive equalization filter and an output waveform from the second adaptive equalization filter, the information reproducing apparatus further comprising: an error detector that calculates an error between an equalization target waveform calculated based on a result of binarization processing by the data decoder and the addition result, a first coefficient arithmetic unit that performs operation of a coefficient used in the first adaptive equalization filter based on the error calculated by the error detector, and a second coefficient arithmetic unit that performs operation of a coefficient used in the second adaptive equalization filter based on the error calculated by the error detector.

In this configuration, the data decoder performs binarization processing of the addition result of the output waveform from the first adaptive equalization filter and the output waveform from the second adaptive equalization filter. The error detector calculates the error between the equalization target waveform calculated based on the result of binarization processing by the data decoder and the addition result. The first coefficient arithmetic unit performs operation of the coefficient used in the first adaptive equalization filter based on the error calculated by the error detector. The second coefficient arithmetic unit performs operation of the coefficient used in the second adaptive equalization filter based on the error calculated by the error detector.

Thus, by the operation being performed for the coefficient of the first adaptive equalization filter and the second adaptive equalization filter such that a crosstalk component becomes minimum, reproduction data in which a crosstalk component is removed can be output, and the error rate of the reproduction data can be reduced.

In the information reproducing apparatus described above, it is preferable that the first adaptive equalization filter perform waveform equalization of an addition result of a waveform of an output signal from the first light-receiving section and an output waveform from the second adaptive equalization filter, and the data decoder perform binarization processing of an output waveform from the first adaptive equalization filter, the information reproducing apparatus further comprising: a third adaptive equalization filter that outputs an ideal reproduction waveform based on a result of binarization processing by the data decoder and an addition result of a waveform of an output signal from the first light-receiving section and an output waveform from the second adaptive equalization filter; a first coefficient arithmetic unit that performs operation of a coefficient used in the first adaptive equalization filter based on a signal error between an equalization target waveform obtained based on a result of binarization processing by the data decoder and an output waveform from the first adaptive equalization filter; and a second coefficient arithmetic unit that performs operation of a coefficient used in the second adaptive equalization filter based on a single of error between an addition result of a waveform of an output signal from the first light-receiving section and an output waveform from the second adaptive equalization filter and an output waveform from the third adaptive equalization filter.

In this configuration, the first adaptive equalization filter performs waveform equalization of the addition result of the waveform of the output signal from the first light-receiving section and the output waveform from the second adaptive equalization filter. The data decoder performs binarization processing of the output waveform from the first adaptive equalization filter. The third adaptive equalization filter outputs the ideal reproduction waveform based on the result of binarization processing by the data decoder and the addition result of the waveform of the output signal from the first light-receiving section and the output waveform from the second adaptive equalization filter. The first coefficient arithmetic unit performs operation of the coefficient used in the first adaptive equalization filter based on the error signal for the equalization target waveform obtained based on the result of binarization processing by the data decoder and the output waveform from the first adaptive equalization filter. The second coefficient arithmetic unit performs operation of the coefficient used in the second adaptive equalization filter based on the error signal for the addition result of the waveform of the output signal from the first light-receiving section and the output waveform from the second adaptive equalization filter and the output waveform from the third adaptive equalization filter.

Thus, a signal component of a self track that is scanned by the center of the optical laser spot and a crosstalk component from a track adjacent to the self track are detected from one optical laser spot, and equalization for intended PR characteristics is possible after a crosstalk component having a predetermined frequency is removed, without mounting a large-scale circuit. Therefore, the error rate of reproduction data can be reduced, and the reproduction performance can be improved.

In the information reproducing apparatus described above, it is preferable that a value of a width of the first light-receiving section in a radial direction divided by a width of the second light-receiving section in a radial direction be in a range of 0.75 to 2.25.

With this configuration, a crosstalk component from an adjacent track can be removed with high precision, in the case where the value of the width of the first light-receiving section in the radial direction divided by the width of the second light-receiving section in the radial direction is in the range of 0.75 to 2.25.

In the information reproducing apparatus described above, it is preferable that the second light-receiving section include a third light-receiving section that receives reflected light of a portion adjacent in one radial direction of the information recording medium with respect to the center section and a fourth light-receiving section that receives reflected light of a portion adjacent, in another radial direction of the information recording medium, with respect to the center section, the second adaptive equalization filter include a third adaptive equalization filter that performs waveform equalization of an output signal from the third light-receiving section and a fourth adaptive equalization filter that performs waveform equalization of an output signal from the fourth light-receiving section, and the data decoder perform binarization processing of an addition result of an output waveform from the first adaptive equalization filter, an output waveform from the third adaptive equalization filter, and an output waveform from the fourth adaptive equalization filter, the information reproducing apparatus further comprising: an error detector that calculates an error between an equalization target waveform calculated based on a result of binarization processing by the data decoder and the addition result; a first coefficient arithmetic unit that performs operation of a coefficient used in the first adaptive equalization filter based on the error calculated by the error detector; a second coefficient arithmetic unit that performs operation of a coefficient used in the third adaptive equalization filter based on the error calculated by the error detector; and a third coefficient arithmetic unit that performs operation of a coefficient used in the fourth adaptive equalization filter based on the error calculated by the error detector.

In this configuration, the second light-receiving section includes the third light-receiving section that receives reflected light of the portion adjacent in one radial direction of the information recording medium with respect to the center section and the fourth light-receiving section that receives reflected light of the portion adjacent in the other radial direction of the information recording medium with respect to the center section. The second adaptive equalization filter includes the third adaptive equalization filter that performs waveform equalization of the output signal from the third light-receiving section and the fourth adaptive equalization filter that performs waveform equalization of the output signal from the fourth light-receiving section. The data decoder performs binarization processing of the addition result of the output waveform from the first adaptive equalization filter, the output waveform from the third adaptive equalization filter, and the output waveform from the fourth adaptive equalization filter. The error detector calculates the error between the equalization target waveform calculated based on the result of binarization processing by the data decoder and the addition result. The first coefficient arithmetic unit performs operation of the coefficient used in the first adaptive equalization filter based on the error calculated by the error detector. The second coefficient arithmetic unit performs operation of the coefficient used in the third adaptive equalization filter based on the error calculated by the error detector. The third coefficient arithmetic unit performs operation of the coefficient used in the fourth adaptive equalization filter based on the error calculated by the error detector.

Thus, using an output signal from the three light-receiving sections, a crosstalk component from an adjacent track can be removed.

In the information reproducing apparatus described above, it is preferable that the second light-receiving section include a third light-receiving section that receives reflected light of a portion adjacent, in one radial direction of the information recording medium, with respect to the center section and a fourth light-receiving section that receives reflected light of a portion adjacent, in another radial direction of the information recording medium, with respect to the center section, the second adaptive equalization filter include a third adaptive equalization filter that performs waveform equalization of an output signal from the third light-receiving section and a fourth adaptive equalization filter that performs waveform equalization of an output signal from the fourth light-receiving section, and the data decoder perform binarization processing of an addition result of an output waveform from the first adaptive equalization filter, an output waveform from the third adaptive equalization filter, and an output waveform from the fourth adaptive equalization filter, the information reproducing apparatus further comprising: a wobble detection unit that detects a wobble signal from a difference of an output signal from the third light-receiving section and an output signal from the fourth light-receiving section; and an address demodulator that demodulates an address from the wobble signal detected by the wobble detection unit.

In this configuration, the second light-receiving section includes the third light-receiving section that receives reflected light of the portion adjacent in one radial direction of the information recording medium with respect to the center section and the fourth light-receiving section that receives reflected light of the portion adjacent in the other radial direction of the information recording medium with respect to the center section. The second adaptive equalization filter includes the third adaptive equalization filter that performs waveform equalization of the output signal from the third light-receiving section and the fourth adaptive equalization filter that performs waveform equalization of the output signal from the fourth light-receiving section. The data decoder performs binarization processing of the addition result of the output waveform from the first adaptive equalization filter, the output waveform from the third adaptive equalization filter, and the output waveform from the fourth adaptive equalization filter. The wobble detection unit detects the wobble signal from the difference of the output signal from the third light-receiving section and the output signal from the fourth light-receiving section. The address demodulator demodulates an address from the wobble signal detected by the wobble detection unit.

Thus, using an output signal from the three light-receiving sections, address information can be reproduced stably from a wobble signal while removing a crosstalk component from an adjacent track.

In the information reproducing apparatus described above, it is preferable that a value of a width of the first light-receiving section in a radial direction divided by a width of the third light-receiving section in a radial direction and a value of a width of the first light-receiving section in a radial direction divided by a width of the fourth light-receiving section in a radial direction be in a range of 1.5 to 4.5.

With this configuration, a crosstalk component from an adjacent track can be removed with high precision, in the case where the value of the width of the first light-receiving section in the radial direction divided by the width of the third light-receiving section in the radial direction and the value of the width of the first light-receiving section in the radial direction divided by the width of the fourth light-receiving section in the radial direction are in a range of 1.5 to 4.5.

In the information reproducing apparatus described above, it is preferable that the second light-receiving section include a third light-receiving section that receives reflected light of a portion adjacent in one radial direction of the information recording medium with respect to the center section and a fourth light-receiving section that receives reflected light of a portion adjacent, in another radial direction of the information recording medium, with respect to the center section, the first light-receiving section include a fifth light-receiving section adjacent on a side of the center section in a radial direction of the information recording medium with respect to the third light-receiving section and a sixth light-receiving section adjacent on a side of the center section in a radial direction of the information recording medium with respect to the fourth light-receiving section, the second adaptive equalization filter include a third adaptive equalization filter that performs waveform equalization of an output signal from the third light-receiving section and a fourth adaptive equalization filter that performs waveform equalization of an output signal from the fourth light-receiving section, the first adaptive equalization filter include a fifth adaptive equalization filter that performs waveform equalization of an output signal from the fifth light-receiving section and a sixth adaptive equalization filter that performs waveform equalization of an output signal from the sixth light-receiving section, and the data decoder perform binarization processing of an addition result of an output waveform from the third adaptive equalization filter, an output waveform from the fourth adaptive equalization filter, an output waveform from the fifth adaptive equalization filter, and an output waveform from the sixth adaptive equalization filter, the information reproducing apparatus further comprising: an error detector that calculates an error between an equalization target waveform calculated based on a result of binarization processing by the data decoder and the addition result; a first coefficient arithmetic unit that performs operation of a coefficient used in the fifth adaptive equalization filter based on the error calculated by the error detector; a second coefficient arithmetic unit that performs operation of a coefficient used in the sixth adaptive equalization filter based on the error calculated by the error detector; a third coefficient arithmetic unit that performs operation of a coefficient used in the third adaptive equalization filter based on the error calculated by the error detector; and a fourth coefficient arithmetic unit that performs operation of a coefficient used in the fourth adaptive equalization filter based on the error calculated by the error detector.

In this configuration, the second light-receiving section includes the third light-receiving section that receives reflected light of the portion adjacent in one radial direction of the information recording medium with respect to the center section and the fourth light-receiving section that receives reflected light of the portion adjacent in the other radial direction of the information recording medium with respect to the center section. The first light-receiving section includes the fifth light-receiving section adjacent on the center section side in the radial direction of the information recording medium with respect to the third light-receiving section and the sixth light-receiving section adjacent on the center section side in the radial direction of the information recording medium with respect to the fourth light-receiving section. The second adaptive equalization filter includes the third adaptive equalization filter that performs waveform equalization of the output signal from the third light-receiving section and the fourth adaptive equalization filter that performs waveform equalization of the output signal from the fourth light-receiving section. The first adaptive equalization filter includes the fifth adaptive equalization filter that performs waveform equalization of the output signal from the fifth light-receiving section and the sixth adaptive equalization filter that performs waveform equalization of the output signal from the sixth light-receiving section. The data decoder performs binarization processing of the addition result of the output waveform from the third adaptive equalization filter, the output waveform from the fourth adaptive equalization filter, the output waveform from the fifth adaptive equalization filter, and the output waveform from the sixth adaptive equalization filter. The error detector calculates the error between the equalization target waveform calculated based on the result of binarization processing by the data decoder and the addition result. The first coefficient arithmetic unit performs operation of the coefficient used in the fifth adaptive equalization filter based on the error calculated by the error detector. The second coefficient arithmetic unit performs operation of the coefficient used in the sixth adaptive equalization filter based on the error calculated by the error detector. The third coefficient arithmetic unit performs operation of the coefficient used in the third adaptive equalization filter based on the error calculated by the error detector. The fourth coefficient arithmetic unit performs operation of the coefficient used in the fourth adaptive equalization filter based on the error calculated by the error detector.

Thus, using an output signal from the four light-receiving sections, a crosstalk component from an adjacent track can be removed.

In the information reproducing apparatus described above, it is preferable that a wobble detection unit that detects a wobble signal from a difference between a first addition signal in which an output signal from the third light-receiving section and an output signal from the fifth light-receiving section are added and a second addition signal in which an output signal from the fourth light-receiving section and an output signal from the sixth light-receiving section are added and an address demodulator that demodulates an address from the wobble signal detected by the wobble detection unit be further provided.

In this configuration, the wobble detection unit detects the wobble signal from the difference of the first addition signal in which the output signal from the third light-receiving section and the output signal from the fifth light-receiving section are added and the second addition signal in which the output signal from the fourth light-receiving section and the output signal from the sixth light-receiving section are added. The address demodulator demodulates an address from the wobble signal detected by the wobble detection unit.

Thus, using an output signal from the four light-receiving sections, address information can be reproduced stably from a wobble signal while removing a crosstalk component from an adjacent track.

An information reproducing apparatus according to another aspect of the present invention is an information reproducing apparatus in which one optical laser spot is formed on one recording track with respect to an information recording medium recording data on a plurality of adjacent recording tracks and the data is reproduced based on reflected light from the optical laser spot, wherein address information showing position information within a recording surface of the information recording medium is recorded with a predetermined pattern of wobble in the recording track, an integral multiple of a cycle of wobble in a portion other than the address information of the recording track matches a length of one circumference of the recording track, and an integral multiple of a cycle of the address information matches a length of one circumference of the recording track, the information reproducing apparatus comprising: an address demodulator that demodulates the address information of the information recording medium; a timing controller that generates, based on the address information demodulated by the address demodulator, a timing signal of which a phase is matched in a radial direction; a memory that holds, based on the timing signal, a reproduction waveform of data recorded in a first recording track for which reproduction of the data is intended and a reproduction waveform of data recorded in a second recording track adjacent to the first recording track; a first adaptive equalization filter that performs waveform equalization of the reproduction waveform from the first recording track held in the memory; a second adaptive equalization filter that performs waveform equalization of the reproduction waveform from the second recording track held in the memory; a data decoder that performs binarization processing of an addition result of an output waveform from the first adaptive equalization filter and an output waveform from the second adaptive equalization filter; an error detector that calculates an error between an equalization target waveform calculated based on a result of binarization processing by the data decoder and the addition result; a first coefficient arithmetic unit that performs operation of a coefficient used in the first adaptive equalization filter based on the error calculated by the error detector; and a second coefficient arithmetic unit that performs operation of a coefficient used in the second adaptive equalization filter based on the error calculated by the error detector.

In this configuration, the address information showing the position information within the recording surface of the information recording medium is recorded with the predetermined pattern of wobble in the recording track. An integral multiple of the cycle of wobble in the portion other than the address information of the recording track matches the length of one circumference of the recording track. Further, an integral multiple of the cycle of the address information matches the length of one circumference of the recording track. The address demodulator demodulates the address information of the information recording medium. The timing controller generates the timing signal of which the phase is matched in the radial direction, based on the address information demodulated by the address demodulator. The memory holds the reproduction waveform of data recorded in the first recording track for which reproduction of the data is intended and the reproduction waveform of data recorded in the second recording track adjacent to the first recording track, based on the timing signal. The first adaptive equalization filter performs waveform equalization of the reproduction waveform from the first recording track held in the memory. The second adaptive equalization filter performs waveform equalization of the reproduction waveform from the second recording track held in the memory. The data decoder performs binarization processing of the addition result of the output waveform from the first adaptive equalization filter and the output waveform from the second adaptive equalization filter. The error detector calculates the error between the equalization target waveform calculated based on the result of binarization processing by the data decoder and the addition result. The first coefficient arithmetic unit performs operation of the coefficient used in the first adaptive equalization filter based on the error calculated by the error detector. The second coefficient arithmetic unit performs operation of the coefficient used in the second adaptive equalization filter based on the error calculated by the error detector.

Thus, since the reproduction waveform can be held in a state where the phase is matched in the radial direction, a large correction in the phase is not necessary, a phase correction circuit that corrects the phase is unnecessary, and a signal processing circuit that removes a crosstalk component can be configured with a small scale.

An information reproducing method according to another aspect of the present invention is an information reproducing method in which one optical laser spot is formed on one recording track with respect to an information recording medium recording data on a plurality of adjacent recording tracks and the data is reproduced based on reflected light from the optical laser spot, including a first light-receiving step of receiving reflected light of a center section of the recording track, a second light-receiving step of receiving reflected light of a portion adjacent, in a radial direction of the information recording medium, with respect to the center section, a first adaptive equalization filter processing step of performing waveform equalization of an output signal in the first light-receiving step, a second adaptive equalization filter processing step of performing waveform equalization of an output signal in the second light-receiving step, and a data decoding step of decoding reproduction data based on an output waveform in the first adaptive equalization filter processing step and an output waveform in the second adaptive equalization filter processing step.

In the first light-receiving step in this configuration, reflected light of the center section of the recording track is received. In the second light-receiving step, reflected light of the portion adjacent in the radial direction of the information recording medium with respect to the center section is received. In the first adaptive equalization filter processing step, waveform equalization of the output signal in the first light-receiving step is performed. In the second adaptive equalization filter processing step, waveform equalization of the output signal in the second light-receiving step is performed. In the data decoding step, the reproduction data is decoded based on the output waveform in the first adaptive equalization filter processing step and the output waveform in the second adaptive equalization filter processing step.

Thus, a signal component of a self track that is scanned by the center of the optical laser spot and a crosstalk component from a track adjacent to the self track are detected from one optical laser spot, and equalization for intended PR characteristics is possible while removing a crosstalk component having a predetermined frequency without mounting a large-scale circuit. Therefore, the error rate of reproduction data can be reduced, and the reproduction performance can be improved.

The specific embodiments or modes in the section of the Description of Embodiments is solely for clarification of the technical content of the present invention, should not be interpreted narrowly to be limited only to such specific embodiments, and may be carried out with various changes within the sprit and scope of claims of the present invention.

Industrial Applicability

The present invention is useful for an information reproducing apparatus and an information reproducing method that can improve the reproduction performance and in which one optical laser spot is formed on one recording track with respect to an information recording medium recording data on a plurality of adjacent recording tracks and the data is reproduced based on reflected light from the optical laser spot.

The invention claimed is:

1. An information reproducing apparatus in which one optical laser spot is formed on one recording track with respect to an information recording medium recording data on a plurality of adjacent recording tracks and the data is reproduced based on reflected light from the optical laser spot, the information reproducing apparatus comprising:
a photodetector divided by a dividing line parallel to a recording track scanning direction into a first light-receiving section that receives reflected light of a center section of the recording track and a second light-receiving section that receives reflected light of a portion adjacent, in a radial direction of the information recording medium, with respect to the center section;
a first adaptive equalization filter that performs waveform equalization of an output signal from the first light-receiving section;
a second adaptive equalization filter that performs waveform equalization of an output signal from the second light-receiving section; and
a data decoder that decodes reproduction data based on an output waveform from the first adaptive equalization filter and an output waveform from the second adaptive equalization filter, wherein the first adaptive equalization filter performs waveform equalization of an addition result of a waveform of an output signal from the first light-receiving section and an output waveform from the second adaptive equalization filter, and the data decoder performs binarization processing of an output waveform from the first adaptive equalization filter, and the information reproducing apparatus further comprising:

a third adaptive equalization filter that outputs an ideal reproduction waveform based on a result of binarization processing by the data decoder and an addition result of a waveform of an output signal from the first light-receiving section and an output waveform from the second adaptive equalization filter;

a first coefficient arithmetic unit that performs operation of a coefficient used in the first adaptive equalization filter based on a signal of error between an equalization target waveform obtained based on a result of binarization processing by the data decoder and an output waveform from the first adaptive equalization filter; and a second coefficient arithmetic unit that performs operation of a coefficient used in the second adaptive equalization filter based on a signal of error between an addition result of a waveform of an output signal from the first light-receiving section, and an output waveform from the second adaptive equalization filter and an output waveform from the third adaptive equalization filter.

2. The information reproducing apparatus according to claim 1, wherein a value of a width of the first light-receiving section in a radial direction divided by a width of the second light-receiving section in a radial direction is in a range of 0.75 to 2.25.

3. An information reproducing apparatus in which one optical laser spot is formed on one recording track with respect to an information recording medium recording data on a plurality of adjacent recording tracks and the data is reproduced based on reflected light from the optical laser spot, wherein address information showing position information within a recording surface of the information recording medium is recorded with a predetermined pattern of wobble in the recording track, an integral multiple of a cycle of wobble in a portion other than the address information of the recording track matches a length of one circumference of the recording track, and an integral multiple of a cycle of the address information matches a length of one circumference of the recording track, the information reproducing apparatus comprising:

an address demodulator that demodulates the address information of the information recording medium;

a timing controller that generates, based on the address information demodulated by the address demodulator, a timing signal of which a phase is matched in a radial direction;

a memory that holds, based on the timing signal, a reproduction waveform of data recorded in a first recording track for which reproduction of the data is intended and a reproduction waveform of data recorded in a second recording track adjacent to the first recording track;

a first adaptive equalization filter that performs waveform equalization of the reproduction waveform from the first recording track held in the memory;

a second adaptive equalization filter that performs waveform equalization of the reproduction waveform from the second recording track held in the memory;

a data decoder that performs binarization processing of an addition result of an output waveform from the first adaptive equalization filter and an output waveform from the second adaptive equalization filter;

an error detector that calculates an error between an equalization target waveform calculated based on a result of binarization processing by the data decoder and the addition result;

a first coefficient arithmetic unit that performs operation of a coefficient used in the first adaptive equalization filter based on the error calculated by the error detector; and a second coefficient arithmetic unit that performs operation of a coefficient used in the second adaptive equalization filter based on the error calculated by the error detector.

4. An information reproducing method in which one optical laser spot is formed on one recording track with respect to an information recording medium recording data on a plurality of adjacent recording tracks and the data is reproduced based on reflected light from the optical laser spot, the information reproducing method comprising:

a first light-receiving step of receiving reflected light of a center section of the recording track;

a second light-receiving step of receiving reflected light of a portion adjacent, in a radial direction of the information recording medium, with respect to the center section;

a first adaptive equalization filter processing step of performing waveform equalization of an output signal in the first light-receiving step;

a second adaptive equalization filter processing step of performing waveform equalization of an output signal in the second light-receiving step; and a data decoding step of decoding reproduction data based on an output waveform in the first adaptive equalization filter processing step and an output waveform in the second adaptive equalization filter processing step, wherein waveform equalization of an addition result of a waveform of an output signal in the first light-receiving step and an output waveform in the second adaptive equalization filter processing step is performed in the first adaptive equalization filter processing step, and binarization processing of an output waveform in the first adaptive equalization filter processing step is performed in the data decoding step, the method further comprising:

a third adaptive equalization filter processing step of outputting an ideal reproduction waveform based on a result of binarization processing in the data decoding step and an addition result of a waveform of an output signal in the first light-receiving step and an output waveform in the second adaptive equalization filter processing step;

a first coefficient arithmetic step of performing operation of a coefficient used in the first adaptive equalization filter processing step based on a signal of error between an equalization target waveform obtained based on a result of binarization processing in the data decoding step and an output waveform in the first adaptive equalization filter processing step; and a second coefficient arithmetic step of performing operation of a coefficient used in the second adaptive equalization filter processing step based on a signal of error between an addition result of a waveform of an output signal in the first light-receiving step and an output waveform in the second adaptive equalization filter processing step and an output waveform in the third adaptive equalization filter processing step.

5. An information reproducing method in which one optical laser spot is formed on one recording track with respect to an information recording medium recording data on a plurality of adjacent recording tracks and the data is reproduced based on reflected light from the optical laser spot, wherein address information showing position information within a recording surface of the information recording medium is recorded with a predetermined pattern of wobble in the recording track, an integral multiple of a cycle of wobble in a portion other than the address information of the recording track matches a length of one circumference of the recording track, and an integral multiple of a cycle of the address information matches a length of one circumference of the recording track, the method comprising:

an address demodulating step of demodulating the address information of the information recording medium;

a timing controlling step of generating, based on the address information demodulated in the address demodulating step, a timing signal of which a phase is matched in a radial direction;

a holding step of holding in a memory, based on the timing signal, a reproduction waveform of data recorded in a first recording track for which reproduction of the data is intended and a reproduction waveform of data recorded in a second recording track adjacent to the first recording track;

a first adaptive equalization filter processing step of performing waveform equalization of the reproduction waveform from the first recording track held in the memory;

a second adaptive equalization filter processing step of performing waveform equalization of the reproduction waveform from the second recording track held in the memory;

a data decoding step of performing binarization processing of an addition result of an output waveform in the first adaptive equalization filter processing step and an output waveform in the second adaptive equalization filter processing step;

an error detecting step of calculating an error between an equalization target waveform calculated based on a result of binarization processing in the data decoding step and the addition result;

a first coefficient arithmetic step of performing operation of a coefficient used in the first adaptive equalization filter processing step based on the error calculated in the error detecting step; and a second coefficient arithmetic step of performing operation of a coefficient used in the second adaptive equalization filter processing step based on the error calculated in the error detecting step.

* * * * *